(12) United States Patent
Mano

(10) Patent No.: US 11,669,534 B2
(45) Date of Patent: Jun. 6, 2023

(54) INFORMATION PROCESSING APPARATUS, SYSTEM, DISPLAY CONTROL METHOD, AND RECORDING MEDIUM

(71) Applicant: Takuro Mano, Kanagawa (JP)

(72) Inventor: Takuro Mano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 13 days.

(21) Appl. No.: 16/388,868

(22) Filed: Apr. 19, 2019

(65) Prior Publication Data

US 2019/0324963 A1 Oct. 24, 2019

(30) Foreign Application Priority Data

Apr. 20, 2018 (JP) .............................. JP2018-081617
Apr. 11, 2019 (JP) .............................. JP2019-075767

(51) Int. Cl.

| G06F 3/048 | (2013.01) |
|---|---|
| G06F 16/2458 | (2019.01) |
| G06F 16/44 | (2019.01) |
| G06F 3/04812 | (2022.01) |
| H04N 21/472 | (2011.01) |

(52) U.S. Cl.
CPC ...... *G06F 16/2477* (2019.01); *G06F 3/04812* (2013.01); *G06F 16/447* (2019.01); *H04N 21/47217* (2013.01)

(58) Field of Classification Search
CPC .. G06F 11/3438; G06F 11/34; G06F 2201/86; G06F 16/2477; G06F 16/447; G06F 3/04812; G06F 16/4393; H04L 67/22; H04N 21/47217

USPC ....................................................... 715/704
See application file for complete search history.

(56) References Cited

U.S. PATENT DOCUMENTS

| 8,639,032 B1* | 1/2014 | Voorhees .............. G06F 16/739 382/176 |
|---|---|---|
| 2004/0095376 A1* | 5/2004 | Graham ................. G06F 16/40 715/716 |
| 2006/0284981 A1 | 12/2006 | Erol et al. |
| 2014/0157113 A1 | 6/2014 | Krishna et al. |
| 2015/0149540 A1* | 5/2015 | Barker ............... H04L 12/1827 709/204 |

(Continued)

FOREIGN PATENT DOCUMENTS

| EP | 3197139 A1 | 7/2017 |
|---|---|---|
| JP | 2006-252519 A | 9/2006 |

(Continued)

OTHER PUBLICATIONS

European Search Report dated Jun. 18, 2019, issued in corresponding European Application No. 19170183.8, 8 pages.

(Continued)

*Primary Examiner* — Aleksey Olshannikov
(74) *Attorney, Agent, or Firm* — Xsensus LLP

(57) ABSTRACT

An information processing apparatus includes: a network interface to communicate with a server for managing content data generated during an event, the content data including at least text data converted from audio data collected during the event and screenshot data of a screen captured during the event; and circuitry to control a display to display one or more items of text data, and one or more images of screenshot data, side by side, in a temporal order.

11 Claims, 40 Drawing Sheets

(56) References Cited

U.S. PATENT DOCUMENTS

| | | | |
|---|---|---|---|
| 2016/0283586 A1* | 9/2016 | Thapliyal | G06Q 10/10 |
| 2016/0349928 A1* | 12/2016 | Li | G06K 9/00463 |
| 2017/0236517 A1* | 8/2017 | Yu | G06Q 10/00 |
| | | | 704/235 |
| 2017/0249294 A1 | 8/2017 | Emori | |

FOREIGN PATENT DOCUMENTS

| | | |
|---|---|---|
| JP | 2012-043046 A | 3/2012 |
| JP | 2016-105241 | 6/2016 |
| JP | 2017-129720 | 7/2017 |

OTHER PUBLICATIONS

Office Action dated Dec. 13, 2022 in Japanese Patent Application No. 2019-075767, 8 pages.

* cited by examiner

FIG. 7A

USER AUTHENTICATION MANAGEMENT TABLE

| USER ID | USER NAME | ORIGINATION ID | PASSWORD |
|---|---|---|---|
| u0001 | Taro Ricoh | o1001 | p9991 |
| u0002 | Goro Kondo | o1002 | p9992 |
| ... | ... | ... | ... |

FIG. 7B

ACCESS MANAGEMENT TABLE

| ORIGINATION ID | ACCESS ID | ACCESS PASSWORD |
|---|---|---|
| o1001 | a1001 | p1001 |
| ... | ... | ... |

FIG. 7C

SCHEDULE MANAGEMENT TABLE

SCHEDULED EVENT ID: pe0001, CONDUCTED EVENT ID: ee0001

| ORGAN- IZATION ID | USER ID OF RESER- VATION HOLDER | PAR- TICIPA- TION | NAME OF RESER- VATION HOLDER | SCHED- ULED START TIME | SCHED- ULED END TIME | EVENT NAME | USER ID OF OTHER PARTIC- IPANT | PAR- TICIPA- TION | USER NAME OF OTHER PARTICIPANT |
|---|---|---|---|---|---|---|---|---|---|
| o1001 | u0001 | ✓ | Taro Ricoh | 9:00 | 10:00 | Meeting on strategic plan | u0000 | ✓ | Electronic Whiteboard |
| | | | | | | | u0002 | ✓ | Goro Kondo |
| | | | | | | | u0003 | ✓ | Yoshio Yamashita |

FIG. 8A
CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 8B
CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ·Voice data URL; http://··· | 2018/1/15 9:00 | 2018/1/15 9:15 |
| c0002 | Screenshot | ·Image data URL; http://··· | 2018/1/15 9:00 | 2018/1/15 9:00 |
| c0003 | Voice text reception | ·Text data URL; http://··· | 2018/1/15 9:00 | 2018/1/15 9:00 |
| ... | ... | ... | ... | ... |
| c0101 | Action item | ·User ID of owner of action item; u0003<br>·Due: 2018/1/30<br>·Image data URL; http://··· | 2018/1/15 9:39 | 2018/1/15 9:39 |
| c0102 | Screenshot | ·Image data URL; http://··· | 2018/1/15 9:40 | 2018/1/15 9:40 |
| c0103 | Voice text reception | ·Text data URL; http://··· | 2018/1/15 9:40 | 2018/1/15 9:40 |
| c0104 | Recording | ·Voice data URL; http://··· | 2018/1/15 9:45 | 2018/1/15 10:00 |
| ... | ... | ... | ... | ... |
| c0201 | File transmission | ·Data file URL; http://··· | 2018/1/15 10:00 | 2018/1/15 10:00 |

FIG. 9A USER AUTHENTICATION MANAGEMENT TABLE

| USER ID | ORGANIZATION ID | PASSWORD |
|---|---|---|
| u0001 | o1001 | p9991 |
| u0002 | o1002 | p9992 |
| ... | ... | ... |

FIG. 9B USER MANAGEMENT TABLE

ORIGINATION ID: o1001

| USER ID | USER NAME |
|---|---|
| u0001 | Taro Ricoh |
| u0002 | Goro Kondo |
| u0003 | Yoshio Yamashita |
| u0004 | Jim Berger |
| ... | ... |

FIG. 9C RESOURCE MANAGEMENT TABLE

ORIGINATION ID: o1001

| RESOURCE ID | RESOURCE NAME |
|---|---|
| s1001 | Conference room X |
| s1002 | Conference room Y |
| ... | ... |

FIG. 10A
RESOURCE RESERVATION MANAGEMENT TABLE

ORIGINATION ID: o1001

| RE-SOURCE ID | RESOURCE NAME | USER ID OF COMMUNI-CATION TERMINAL | USER ID OF RESER-VATION HOLDER | SCHEDULED EVENT START DATE/TIME | SCHEDULED EVENT END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 10B
EVENT MANAGEMENT TABLE

SCHEDULED EVENT ID: pe0001

| ORGAN-IZATION ID | USER ID | USER NAME | SCHEDULED EVENT START DATE/TIME | SCHEDULED EVENT END DATE/TIME | EVENT NAME | MEMO |
|---|---|---|---|---|---|---|
| o1001 | u0000 | Electronic Whiteboard | 2018/1/15 9:00 | 2018/1/15 10:00 | Meeting on strategic plan | ... |
| o1001 | u0001 | Taro Ricoh | 2018/1/15 9:00 | 2018/1/15 10:00 | Meeting on strategic plan | ... |
| o1001 | u0002 | Goro Kondo | 2018/1/15 9:00 | 2018/1/15 10:00 | Meeting on strategic plan | ... |
| o1001 | u0003 | Yoshio Yamashita | 2018/1/15 9:00 | 2018/1/15 10:00 | Meeting on strategic plan | ... |

FIG. 11A

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 11B

PROJECT MEMBER MANAGEMENT TABLE

ORGANIZATION ID: o1001

| PROJECT ID | PROJECT NAME | USER ID OF PROJECT MEMBER |
|---|---|---|
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 12A

CONDUCTED EVENT RECORD MANAGEMENT TABLE

PROJECT ID: p0001, CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ▪ Voice data URL; c://・・・ | 2018/1/15 9:00 | 2018/1/15 9:15 |
| c0002 | Screenshot | ▪ Image data URL; c://・・・ | 2018/1/15 9:00 | 2018/1/15 9:00 |
| c0003 | Voice text reception | ▪ Text data URL; c://・・・ | 2018/1/15 9:00 | 2018/1/15 9:00 |
| ・・・ | | ・・・ | ・・・ | ・・・ |
| c0101 | Action item | ▪ User ID of owner of action item; u0003<br>▪ Due: 2018/1/30<br>▪ Image data URL; c://・・・ | 2018/1/15 9:39 | 2018/1/15 9:39 |
| c0102 | Screenshot | ▪ Image data URL; c://・・・ | 2018/1/15 9:40 | 2018/1/15 9:40 |
| c0103 | Voice text reception | ▪ Text data URL; c://・・・ | 2018/1/15 9:40 | 2018/1/15 9:40 |
| c0104 | Recording | ▪ Voice data URL; c://・・・ | 2018/1/15 9:45 | 2018/1/15 10:00 |
| ・・・ | ・・・ | ・・・ | ・・・ | ・・・ |
| c0201 | File transmission | ▪ Data file URL; c://・・・ | 2018/1/15 10:00 | 2018/1/15 10:00 |

FIG. 12B

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ・・・ | | ・・・ | ・・・ |

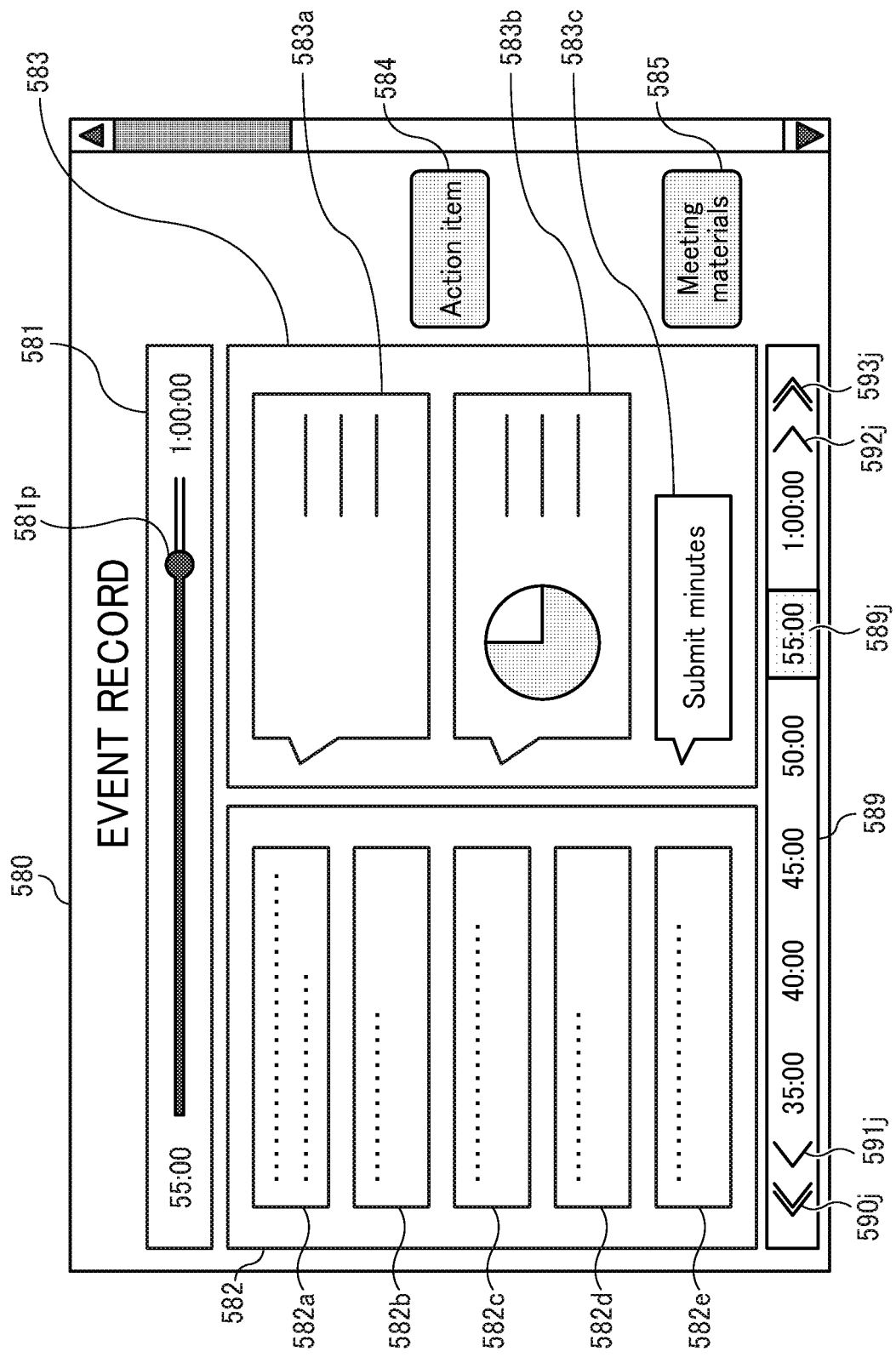

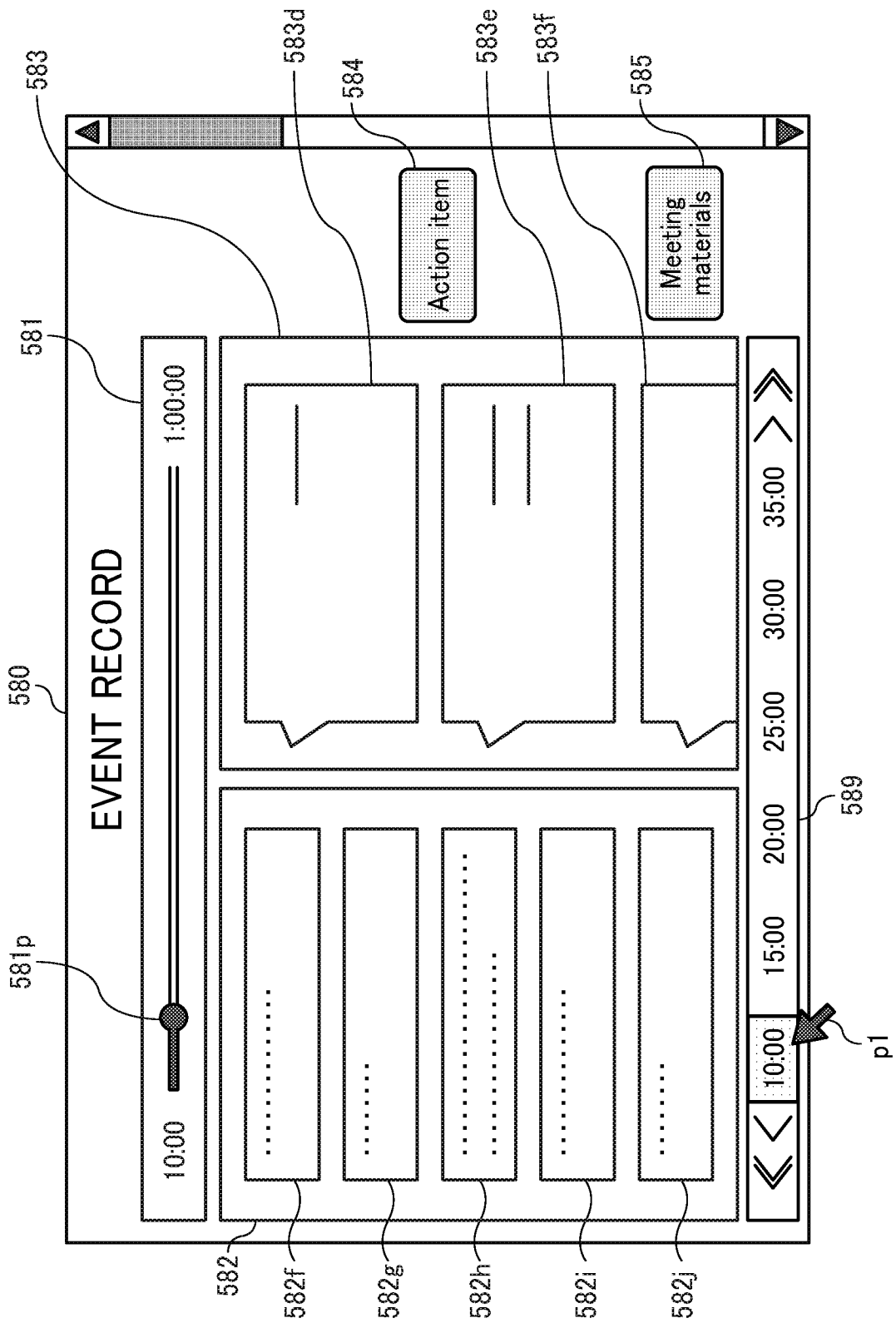

FIG. 39

RELATED INFORMATION MANAGEMENT TABLE

PROJECT ID: p0001, CONDUCTED EVENT ID: ee0001

| CONTENT GENERA-TION TIME | VOICE DATA | | | VOICE TEXT DATA | | | IMAGE DATA | |
|---|---|---|---|---|---|---|---|---|
| | CONTENT PROCESS-ING ID | CONTENT PROCESS-ING TYPE | CONTENT ID | CONTENT PROCESSING TYPE | SEQUENCE NO. | CONTENT PROCESS-ING ID | CONTENT PROCESSING TYPE | SEQUENCE NO. |
| 00:00 | c0001 | Recording | c0002 | Voice text reception | 1 | — | — | — |
| 00:30 | c0004 | Recording | c0005 | Voice text reception | 2 | c0003 | Screenshot | 1 |
| 01:00 | c0007 | Recording | c0008 | Voice text reception | 3 | c0006 | Screenshot | 2 |
| ... | ... | ... | ... | ... | ... | ... | ... | ... |
| 24:30 | c0202 | Recording | c0203 | Voice text reception | 61 | c0199 | Screenshot | 60 |
| ... | ... | ... | ... | ... | ... | ... | ... | ... |
| 59:30 | c0298 | Recording | c0299 | Voice text reception | 93 | c0297 | Screenshot | 92 |

INFORMATION PROCESSING APPARATUS, SYSTEM, DISPLAY CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-081617, filed on Apr. 20, 2018, and 2019-075767, filed on Apr. 11, 2019, in the Japan Patent Office, the entire disclosure of which is hereby incorporated by reference herein.

BACKGROUND

Technical Field

The present invention relates to an information processing apparatus, system, display control method, and recording medium.

Description of the Related Art

The electronic whiteboards are widely used in companies or institutions to conduct events such as meetings. In recent years, a meeting minutes generating system is provided, which converts voice collected during the meeting into text data to be displayed for a later time. While the text data converted from voice is displayed in order, it has been cumbersome for a user to find out desired information, as the user often needs to read the texts from the beginning.

SUMMARY

Example embodiments of the present invention include an information processing apparatus that communicates with a server for managing content data generated during an event. The content data includes at least text data converted from audio data collected during the event, and screenshot data of a screen captured during the event. The information processing apparatus displays, on a display, one or more items of text data, and one or more images of screenshot data, side by side, in a temporal order.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is a conceptual diagram illustrating a user authentication management table, according to an embodiment;

FIG. 7B is a conceptual diagram illustrating an access management table, according to an embodiment;

FIG. 7C is a conceptual diagram illustrating a schedule management table, according to an embodiment;

FIG. 8A is a conceptual diagram illustrating a conducted event management table, according to an embodiment;

FIG. 8B is a conceptual diagram illustrating a content management table, according to an embodiment;

FIG. 9A is a conceptual diagram illustrating a user authentication management table, according to an embodiment;

FIG. 9B is a conceptual diagram illustrating a user management table, according to an embodiment;

FIG. 9C is a conceptual diagram illustrating a resource management table, according to an embodiment;

FIG. 10A is a conceptual diagram illustrating a resource reservation management table, according to an embodiment;

FIG. 10B is a conceptual diagram illustrating an event management table, according to an embodiment;

FIG. 11A is a conceptual diagram illustrating a server authentication management table, according to an embodiment;

FIG. 11B is a conceptual diagram illustrating a project member management table, according to an embodiment;

FIG. 12A is a conceptual diagram of a conducted event record management table, according to an embodiment;

FIG. 12B is a conceptual diagram of a conducted event management table, according to an embodiment;

FIG. 37 is an illustration of an example event record screen;

FIG. 38 is an illustration of an example event record screen; and

FIG. 39 is an illustration of an example related information management table.

Figure 1:
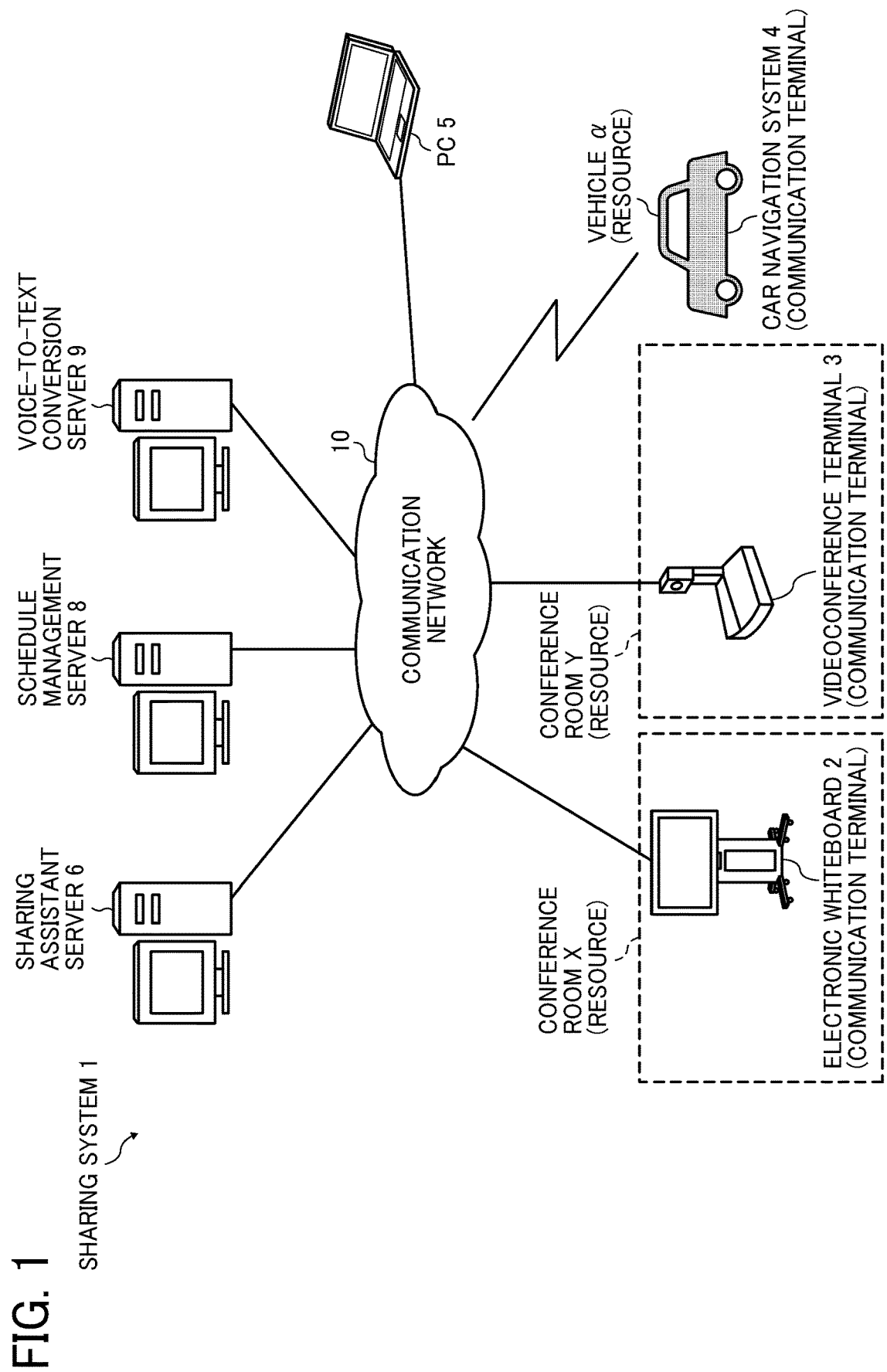
FIG. 1 is a schematic diagram illustrating an overview of a sharing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a system for sharing one or more resources ("sharing system") is described according to one or more embodiments.

<Overview of System Configuration>

First, an overview of a configuration of a sharing system 1 is described. FIG. 1 is a schematic diagram illustrating an overview of the sharing system 1 according to one or more embodiments. Referring to the drawings, a system for sharing one or more resources ("sharing system") is described according to one or more embodiments.

<Overview of System Configuration>

First, an overview of a configuration of a sharing system 1 is described. FIG. 1 is a schematic diagram illustrating an overview of the sharing system 1 according to one or more embodiments. As illustrated in FIG. 1, the sharing system 1 of the embodiments includes an electronic whiteboard 2, a videoconference terminal 3, a car navigation system 4, a personal computer (PC) 5, a sharing assistant server 6, a schedule management server 8, and a voice-to-text conversion server (conversion server) 9. The electronic whiteboard 2, videoconference terminal 3, car navigation system 4, PC 5, sharing assistant server 6, schedule management server 8, and conversion server 9 are communicable with one another via a communication network 10. The communication network 10 is implemented by the Internet, mobile communication network, local area network (LAN), etc. The communication network 10 may include, in addition to a wired network, a wireless network in compliance with such as 3rd Generation (3G), Worldwide Interoperability for Microwave Access (WiMAX), Long Term Evolution (LTE), etc.

In this example, the electronic whiteboard 2 is provided in a conference room X. The videoconference terminal 3 is provided in a conference room Y. Further, in this disclosure, a resource may be shared among a plurality of users, such that any user is able to reserve any resource. Accordingly, the resource can be a target for reservation by each user. The car navigation system 4 is provided in a vehicle α. In this case, the vehicle α is a vehicle shared among a plurality of users, such as a vehicle used for car sharing. Further, the vehicle could be any means capable of transporting the human-being from one location to another location. Examples of vehicle include, but not limited to, cars, motorcycles, bicycles, and wheelchairs, Examples of the resource include, but not limited to, any object, service, space or place (room, or a part of room), information (data), which can be shared among a plurality of users. In the sharing system 1 illustrated in FIG. 1, the conference room X, the conference room Y, and the vehicle α are examples of a resource shared among a plurality of users. Examples of information as a resource include, but not limited to, information on an account assigned to the user, with the user being more than one individual person. For example, the organization may only be assigned with one account that allows any user in the organization to use a specific service provided on the Internet. In such case, information on such account, such as a user name and a password, is assumed to be a resource that can be shared among a plurality of users in that organization. In one example, the teleconference or videoconference service may be provided via the Internet, which may be provided to a user who has logged in with a specific account.

The electronic whiteboard 2, videoconference terminal 3, and car navigation system 4, are each an example of a communication terminal. The communication terminal is any device capable of communicating with such as the sharing assistant server 6 and the schedule management server 8, and providing information obtained from the server to the user of the resource. For example, as described below referring to S32 of FIG. 22, the communication terminal is any terminal that the user uses to sign in to use services provided by the sharing system 1. Further, in case the resource is any conference room, the communication terminal may be any device provided in the conference room, such that information on the communication terminal may be associated with the conference room as a resource. Examples of the communication terminal provided in the vehicle α may not only include the car navigation system 4, but also a smart phone or a smart watch installed with such as a car navigation application.

The PC 5 is an example of an information processing apparatus. Specifically, the PC 5 registers, to the schedule management server 8, reservations made by each user to use each resource, or any event scheduled by each user. Examples of the event include, but not limited to, a conference, meeting, gathering, counseling, presentation, driving, ride, and transporting.

The sharing assistant server 6, which is implemented by one or more computers, assists in sharing of a resource among the users, for example, via the communication terminal.

The schedule management server 8, which is implemented by one or more computers, manages reservations for using each resource and schedules of each user.

The voice-to-text conversion server 9, which is implemented by one or more computers, converts voice data (example of audio data) received from an external computer (for example, the sharing assistant server 6), into text data.

In this disclosure, the sharing assistant server 6 and the schedule management server 8, or any part of the sharing assistant server 6 and the schedule management server 8 that relates to content management, may be collectively referred to as a server.

<Hardware Configuration>

Referring to FIGS. 2 to 5, a hardware configuration of the apparatus or terminal in the sharing system 1 is described according to the embodiment.

<Hardware Configuration of Electronic Whiteboard>

Figure 2:
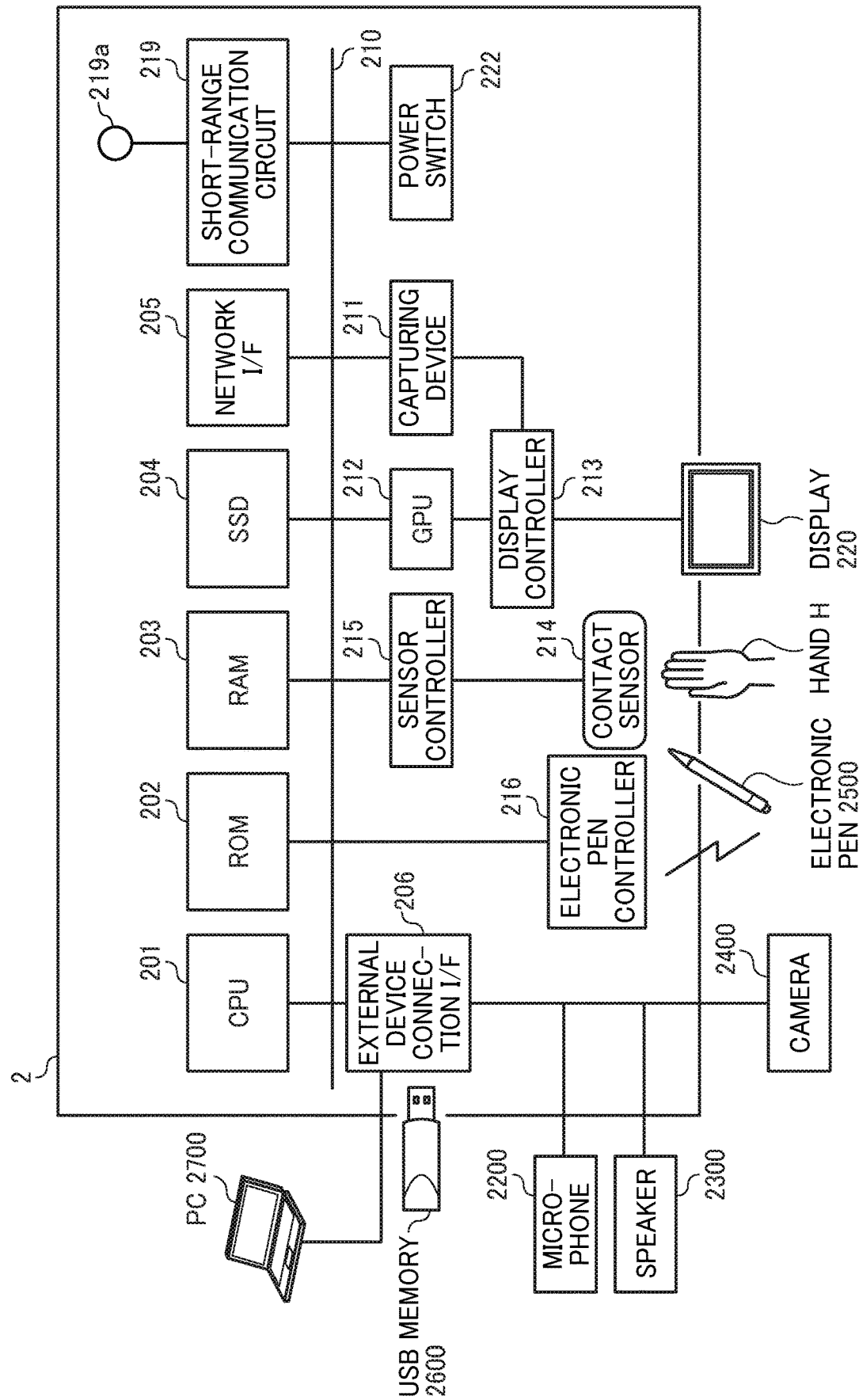
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (IX) 205, and an external device connection interface (I/F) 206.

The CPU 201 controls entire operation of the electronic whiteboard 2. The ROM 202 stores a control program for operating the CPU 201 such as an initial Program Loader (IPL). The RAM 203 is used as a work area for the CPU 201. The SSD 204 stores various data such as the control program for the electronic whiteboard 2. The network I/F 205 controls communication with an external device through the communication network 10. The external device connection I/F 206 controls communication with an external resource such as a PC 2700, a USB memory 2600, a microphone 2200, a speaker 2300, and a camera 2400.

The electronic whiteboard 2 further includes a capturing device 211, a graphics processing unit (GPU) 212, a display controller 213, a contact sensor 214, a sensor controller 215, an electronic pen controller 216, a short-range communication circuit 219, an antenna 219*a* for the short-range communication circuit 219, and a power switch 222.

The capturing device 211 acquires image data of an image displayed on a display 220 under control of the display controller 213, and stores the image data in the RAM 203 or the like. The GPU 212 is a semiconductor chip dedicated to processing of a graphical image. The display controller 213 controls display of an image processed at the capturing device 211 or the GPU 212 for output through the display 220 provided with the electronic whiteboard 2. The contact sensor 214 detects a touch onto the display 220 with an electronic pen (stylus pen) 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame surrounding the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The short-range communication circuit 219 is a communication circuit that communicates in compliance with the near field communication (NFC) (Registered Trademark), the Bluetooth (Registered Trademark), and the like. The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of Videoconference Terminal>

Figure 3:
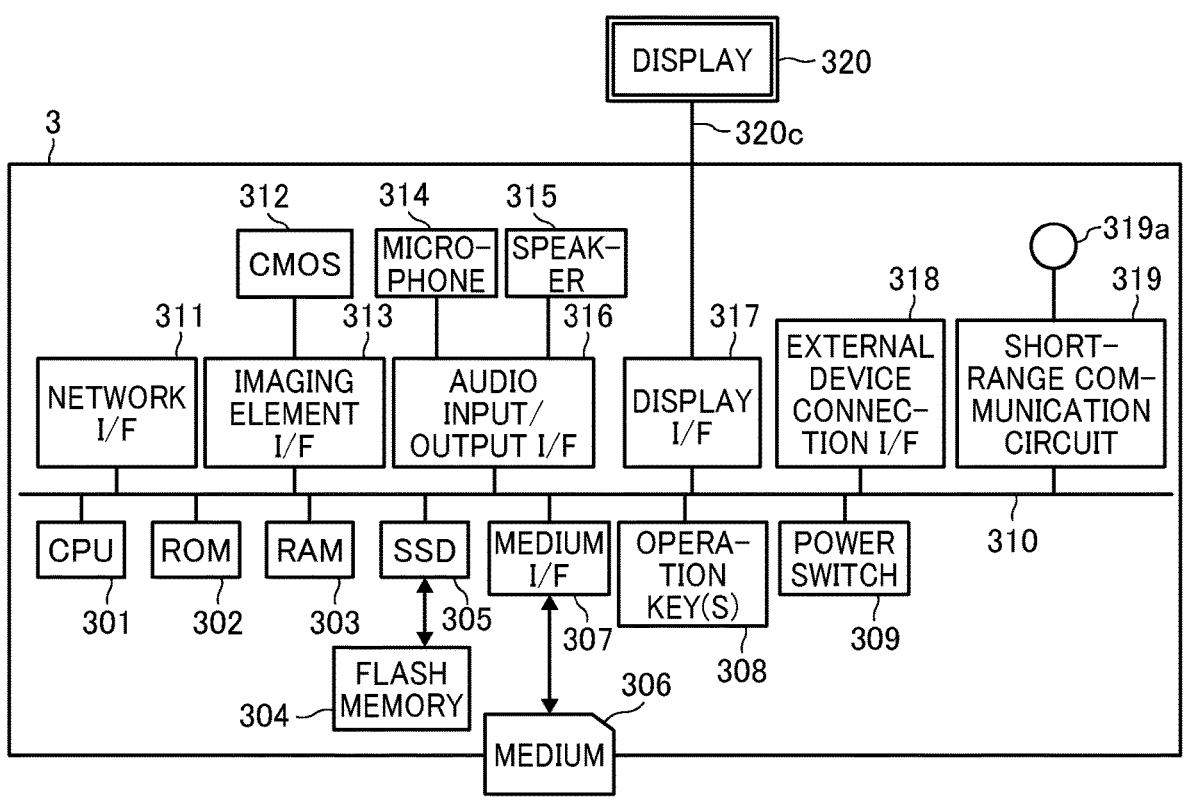
FIG. 3 is a schematic block diagram illustrating a hardware configuration of a videoconference terminal, according to an embodiment.

FIG. 3 is a diagram illustrating a hardware configuration of the videoconference terminal 3 according to the embodiment. As illustrated in FIG. 3, the videoconference terminal 3 includes a CPU 301, a ROM 302, a RAM 303, a flash memory 304, a SSD 305, a medium I/F 307, an operation key 308, a power switch 309, a bus line 310, a network I/F 311, a CMOS sensor 312, an imaging element I/F 313, a microphone 314, a speaker 315, an audio input/output I/F 316, a display I/F 317, an external device connection I/F 318, a short-range communication circuit 319, and an antenna 319*a* for the short-range communication circuit 319. The CPU 301 controls entire operation of the videoconference terminal 3. The ROM 302 stores a control program for operating the CPU 301. The RAM 303 is used as a work area for the CPU 301. The flash memory 304 stores various data such as a communication control program, image data, and audio data. The SSD 305 controls reading or writing of various data with respect to the flash memory 304 under control of the CPU 301. In alternative to the SSD, a hard disk drive (HDD) may be used. The medium I/F 307 controls reading or writing of data with respect to a recording medium 306 such as a flash memory. The operation key (keys) 308 is operated by a user to input a user instruction such as a user selection of a communication destination of the videoconference terminal 3. The power switch 309 is a switch that receives an instruction to turn on or off the power of the videoconference terminal 3.

The network I/F 311 allows communication of data with an external device through the communication network 10 such as the Internet. The CMOS sensor 312 is an example of a built-in imaging device capable of capturing a subject under control of the CPU 301. The imaging element I/F 313 is a circuit that controls driving of the CMOS sensor 312. The microphone 314 is an example of built-in audio collecting device capable of inputting audio under control of the CPU 301. The audio I/O I/F 316 is a circuit for inputting or outputting an audio signal to the microphone 314 or from the speaker 315 under control of the CPU 301. The display I/F 317 is a circuit for transmitting display data to an external display 320 under control of the CPU 301. The external device connection I/F 318 is an interface circuit that connects the videoconference terminal 3 to various external devices. The short-range communication circuit 319 is a communication circuit that communicates in compliance with the NFC, the Bluetooth, and the like.

The bus line 310 is an address bus or a data bus, which electrically connects the elements in FIG. 3 such as the CPU 301.

The display 320 may be a liquid crystal or organic electroluminescence (EL) display that displays an image of a subject, an operation icon, or the like. The display 320 is connected to the display I/F 317 by a cable 320c. The cable 320c may be an analog red green blue (RGB) (video graphic array (VGA)) signal cable, a component video cable, a high-definition multimedia interface (HDMI) (Registered Trademark) signal cable, or a digital video interactive (DVI) signal cable.

In alternative to the CMOS sensor 312, an imaging element such as a CCD (Charge Coupled Device) sensor may be used. The external device connection I/F 318 is capable of connecting an external device such as an external camera, an external microphone, or an external speaker through a USB cable or the like. In the case where an external camera is connected, the external camera is driven in preference to the built-in camera under control of the CPU 301. Similarly, in the case where an external microphone is connected or an external speaker is connected, the external microphone or the external speaker is driven in preference to the built-in microphone 314 or the built-in speaker 315 under control of the CPU 301.

The recording medium 306 is removable from the videoconference terminal 3. The recording medium 306 can be any non-volatile memory that reads or writes data under control of the CPU 301, such that any memory such as an EEPROM may be used instead of the flash memory 304.

<Hardware Configuration of Car Navigation System>

Figure 4:
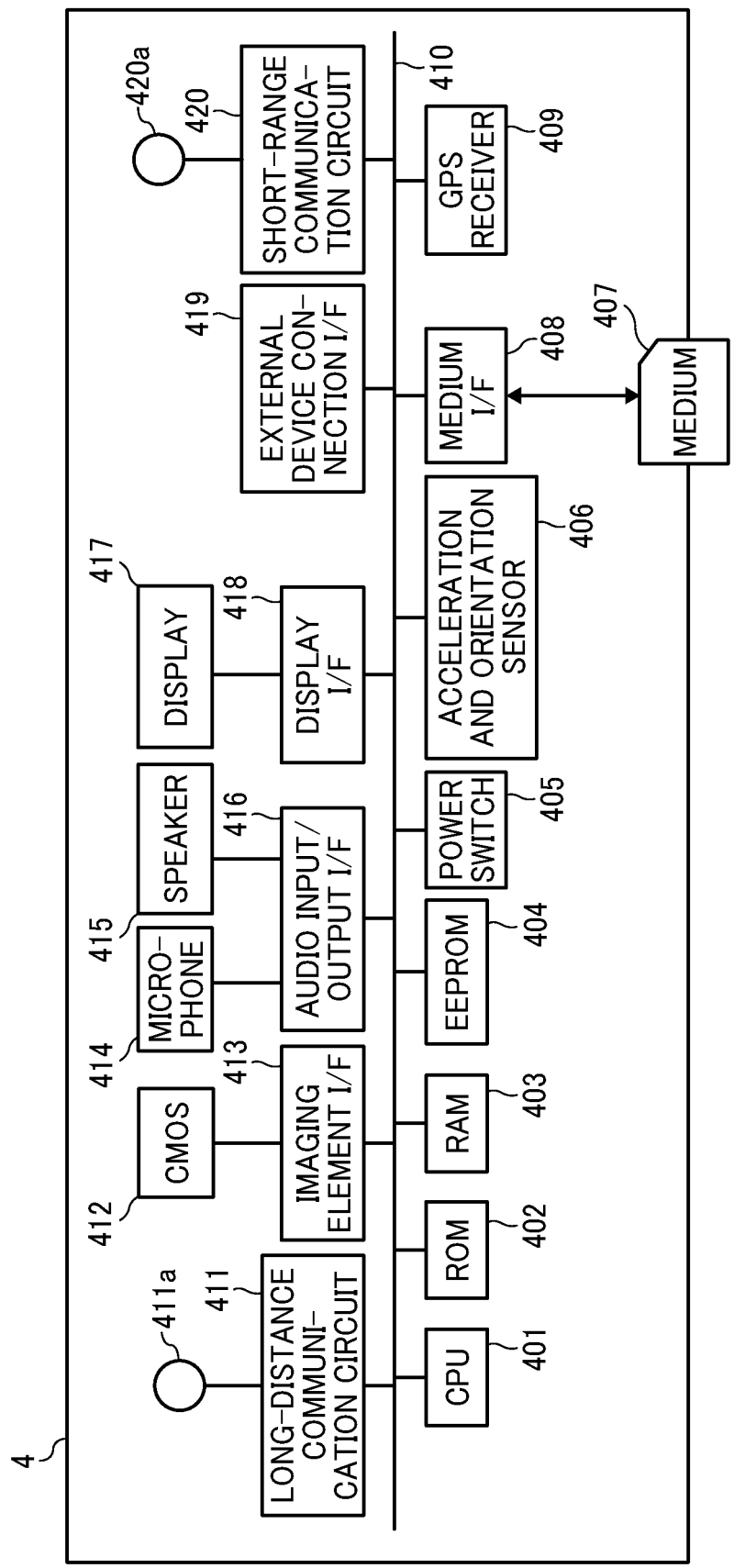
FIG. 4 is a schematic block diagram illustrating a hardware configuration of a car navigation system, according to an embodiment.

FIG. 4 is a diagram illustrating a hardware configuration of the car navigation system 4 according to the embodiment. As illustrated in FIG. 4, the car navigation system 4 includes a CPU 401, a ROM 402, a RAM 403, an EEPROM 404, a power switch 405, an acceleration and orientation sensor 406, a medium I/F 408, and a GPS receiver 409.

The CPU 401 controls entire operation of the car navigation system 4. The ROM 402 stores a control program for controlling the CPU 401 such as an IPL. The RAM 403 is used as a work area for the CPU 401. The EEPROM 404 reads or writes various data such as a control program for the car navigation system 4 under control of the CPU 401. The power switch 405 turns on or off the power of the car navigation system 4. The acceleration and orientation sensor 406 includes various sensors such as an electromagnetic compass or gyrocompass for detecting geomagnetism, and an acceleration sensor. The medium 11F 408 controls reading or writing of data with respect to a recording medium 407 such as a flash memory. The GPS receiver 409 receives a GPS signal from a GPS satellite.

The car navigation system 4 further includes a long-range communication circuit 411, an antenna 411a for the long-range communication circuit 411, a CMOS sensor 412, an imaging element I/F 413, a microphone 414, a speaker 415, an audio input/output I/F 416, a display 417, a display I/F 418, an external device connection I/F 419, a short-range communication circuit 420, and an antenna 420a for the short-range communication circuit 420.

The long-range communication circuit 411 is a circuit, which receives traffic jam information, road construction information, traffic accident information and the like provided from an infrastructure system external to the vehicle, and transmits information on the location of the vehicle, life-saving signals, etc. back to the infrastructure system in the case of emergency. Examples of such infrastructure include, but not limited to, a road information guidance system such as a Vehicle Information and Communication System (VICS) system.

The CMOS sensor 412 is an example of a built-in imaging device capable of capturing a subject under control of the CPU 401. The imaging element I/F 413 is a circuit that controls driving of the CMOS sensor 412. The microphone 414 is an example of audio collecting device, which is a built-in type, capable of inputting audio under control of the CPU 401. The audio I/O I/F 416 is a circuit for inputting or outputting an audio signal between the microphone 414 and the speaker 415 under control of the CPU 401.

The display 417 may be a liquid crystal or organic electro luminescence (EL) display that displays an image of a subject, an operation icon, or the like. The display 417 has a function of a touch panel. The touch panel is an example of input device that enables the user to input a user instruction for operating the car navigation system 4 through touching a screen of the display 417.

The display I/F 418 is a circuit for transmitting display data to the display 417 under control of the CPU 401.

The external device connection I/F 419 is an interface circuit that connects the car navigation system 4 to various external devices.

The short-range communication circuit 420 is a communication circuit that communicates in compliance with the NFC, the Bluetooth, and the like.

The car navigation system 4 further includes a bus line 410. The bus line 410 is an address bus or a data bus, which electrically connects the elements in FIG. 4 such as the CPU 401.

<Hardware Configuration of Server and PC>

Figure 5:
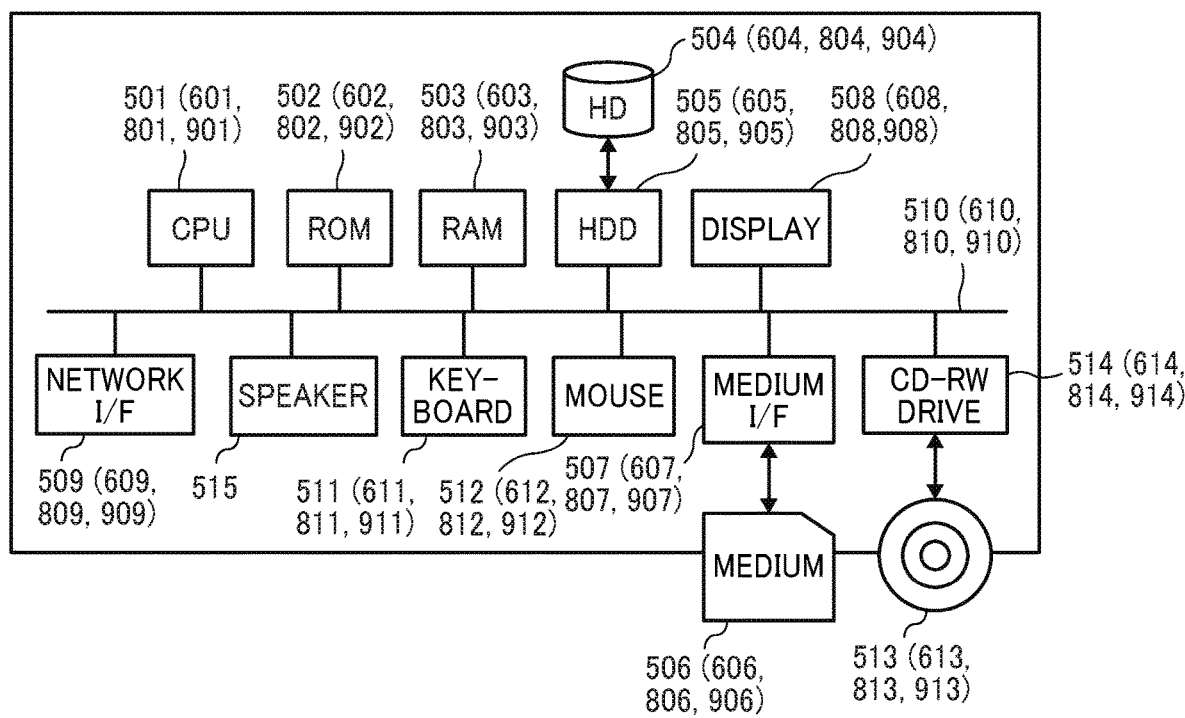
FIG. 5 is a schematic block diagram illustrating a hardware configuration of a computer, such as a personal computer (PC), and a server, according to an embodiment.

FIG. 5 is a diagram illustrating a hardware configuration of the server (such as the sharing assistant server 6 and the schedule management server 8) and the PC 5, according to the embodiment. As illustrated in FIG. 5, the PC 5 includes a CPU 501, a ROM 502, a RAM 503, a hard disk (HD) 504, a hard disk drive (HDD) 505, a medium I/F 507, a display 508, a network I/F 509, a keyboard 511, a mouse 512, a CD-RW drive 514, and a bus line 510.

The CPU 501 controls entire operation of the PC 5. The ROM 502 stores a control program for controlling the CPU 501 such as an IPL. The RAM 503 is used as a work area for the CPU 501. The HD 504 stores various data such as a control program.

The HDD 505, which may also referred to as a hard disk drive controller, controls reading or writing of various data to or from the HD 504 under control of the CPU 501.

The medium I/F 507 controls reading or writing of data with respect to a recording medium 506 such as a flash memory.

The display 508 displays various information such as a cursor, menu, window, characters, or image.

The network I/F 509 is an interface that controls communication of data with an external device through the communication network 10.

The keyboard 511 is one example of input device provided with a plurality of keys for allowing a user to input characters, numerals, or various instructions.

The mouse 512 is one example of input device for allowing the user to select a specific instruction or execution, select a target for processing, or move a curser being displayed.

The CD-RW drive 514 reads or writes various data with respect to a Compact Disc ReWritable (CD-RW) 513, which is one example of removable recording medium.

The speaker 515 outputs a sound signal under control of the CPU 501.

The PC 5 further includes a bus line 510. The bus line 510 may be an address bus or a data bus, which electrically connects various elements such as the CPU 501 of FIG. 5.

Referring to FIG. 5, the sharing assistant server 6, which is implemented by the general-purpose computer, includes a CPU 601, a ROM 602, a RAM 603, a hard disk (HD) 604, a hard disk drive (HDD) 605, a medium I/F 607, a display 608, a network I/F 609, a keyboard 611, a mouse 612, a CD-RW drive 614, and a bus line 610. The sharing assistant server 6 may be provided with a recording medium 606 or a CD-RW 613. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

Referring to FIG. 5, the schedule management server 8, which is implemented by the general-purpose computer, includes a CPU 801, a ROM 802, a RAM 803, a HD 804, a HDD 805, a medium I/F 807, a display 808, a network I/F 809, a keyboard 811, a mouse 812, a CD-RW drive 814, and a bus line 810. The schedule management server 8 may be provided with a recording medium 806 or a CD-RW 813. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

As illustrated in FIG. 5, the PC 5, which is implemented by the general-purpose computer, includes a CPU 901, a ROM 902, a RAM 903, a hard disk (HD) 904, a hard disk drive (HDD) 905, a medium I/F 907, a display 908, a network I/F 909, a keyboard 911, a mouse 912, a CD-RW drive 914, and a bus line 910. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

Further, any one of the above-described control programs may be recorded in a file in a format installable or executable on a computer-readable recording medium for distribution. Examples of the recording medium include, but not limited to, Compact Disc Recordable (CD-R), Digital Versatile Disc (DVD), blue-ray disc, and SD card. In addition, such recording medium may be provided in the form of a program product to users within a certain country or outside that country.

The sharing assistant server 6 may be configured by a single computer or a plurality of computers to which divided portions (functions, means, or storages) are arbitrarily allocated. This also applies to the schedule management server 8 and the conversion server 9.

<Functional Configuration of Sharing System>

Figure 6A:
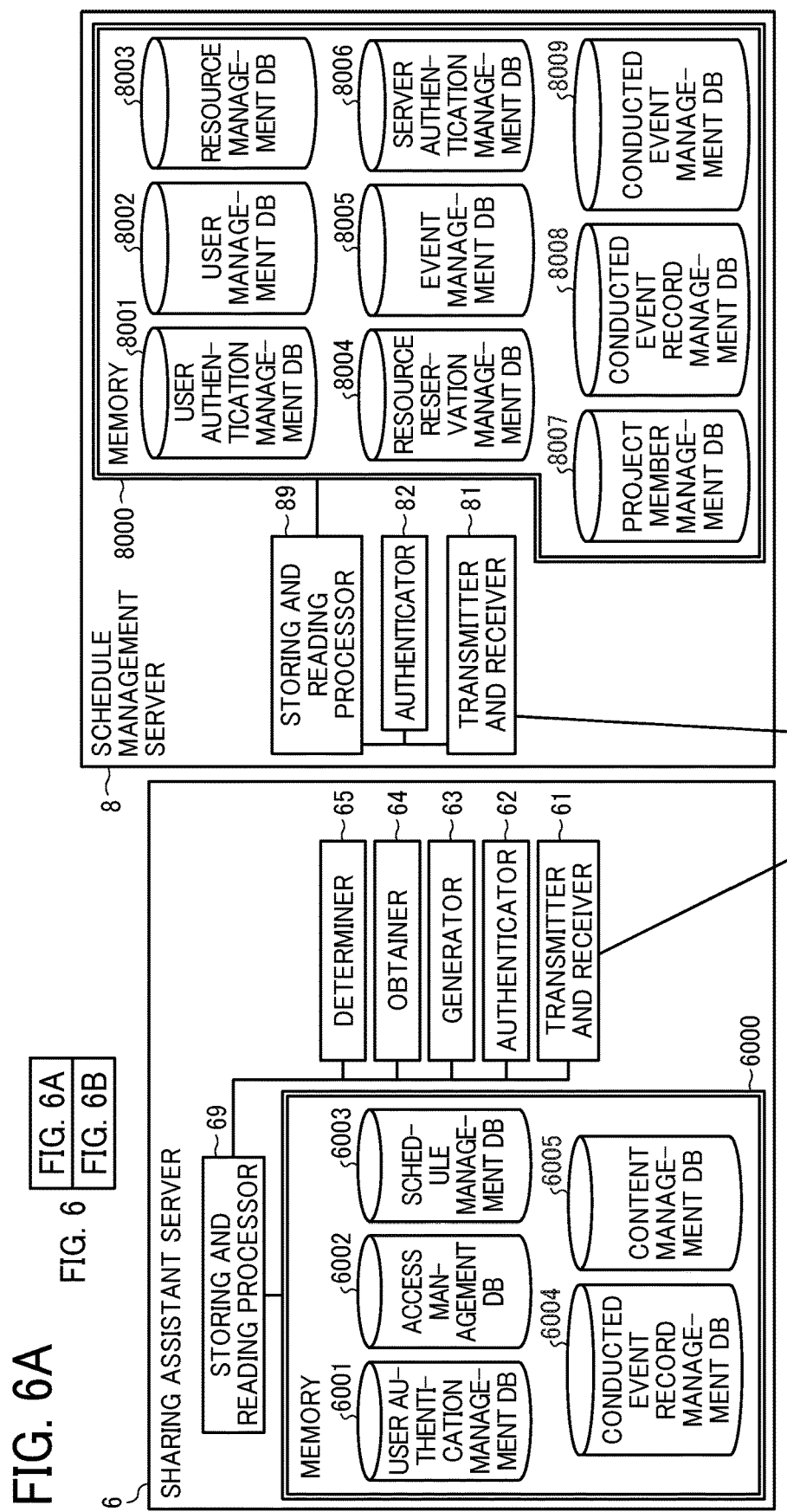
FIGS. 6A and 6B (FIG. 6) are a schematic block diagram illustrating a functional configuration of a part of the sharing system illustrated in FIG. 1, according to an embodiment.
Figure 6B:
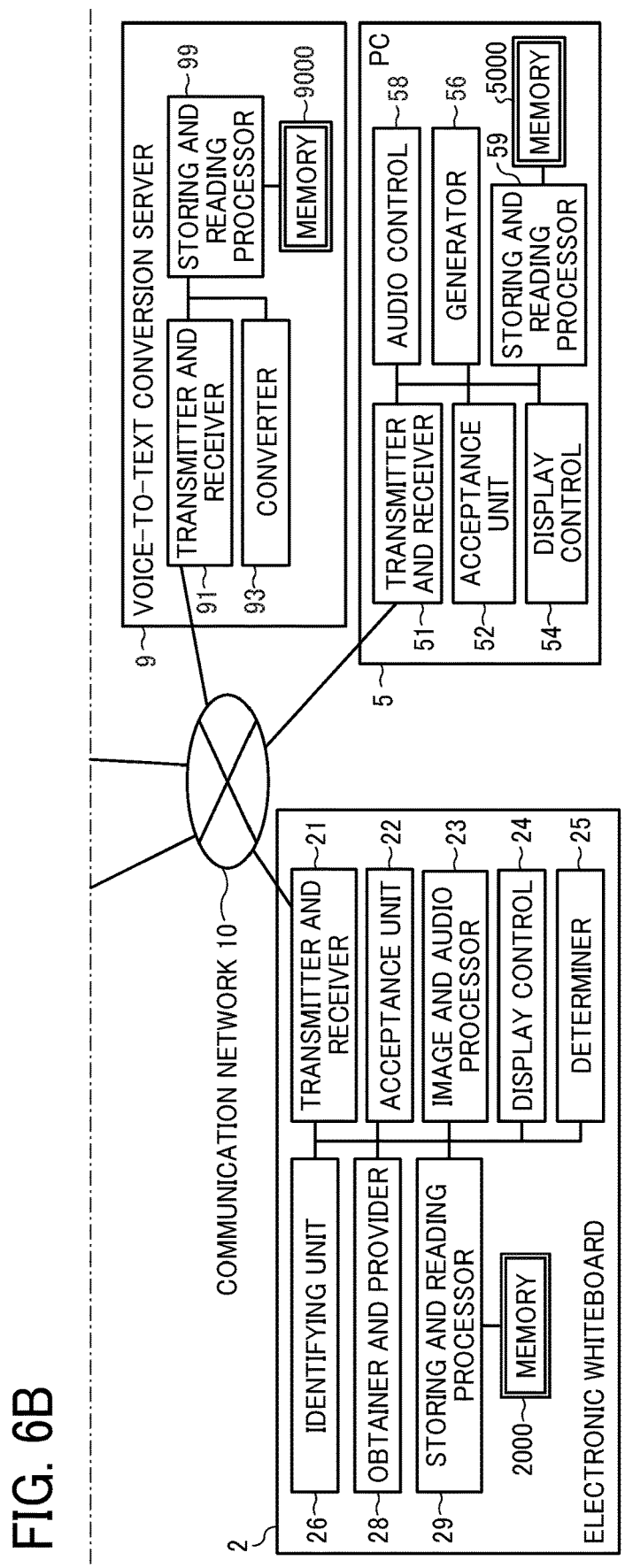

Referring to FIGS. 6 to 10B, a functional configuration of the sharing system 1 is described according to the embodiment. FIG. 6 is a diagram illustrating a functional configuration of the sharing system 1. In FIG. 6, only a part of those terminals, devices, and servers illustrated in FIG. 1 is illustrated, which relates to processing or operation to be described below. More specifically, the following illustrates an example case in which the user uses the conference room X as a resource, in which the electronic whiteboard 2 is provided. In other words, the videoconference terminal 3 and the car navigation system 4 do not have to be provided in the following embodiment.

<Functional Configuration of Electronic Whiteboard>

As illustrated in FIG. 6, the electronic whiteboard 2 includes a transmitter and receiver 21, an acceptance unit 22, an image and audio processor 23, a display control 24, a determiner 25, an identifying unit 26, an obtainer and provider 28, and a storing and reading processor 29. These units are functions that are implemented by or that are caused to function by operating any of the elements illustrated in FIG. 8 in cooperation with the instructions of the CPU 201 according to the electronic whiteboard control program read from the SSD 204 to the RAM 203. The electronic whiteboard 2 further includes a memory 2000, which is implemented by the RAM 203, SSD 204, or USB memory 2600 illustrated in FIG. 2. The memory 2000 may be provided in or outside the electronic whiteboard 2, as the memory 2000 may be implemented by the USB memory 2600 that is removable.

(Functional Unit of Electronic Whiteboard)

Next, a functional unit of the electronic whiteboard 2 is described according to the embodiment. The transmitter and receiver 21, which may be implemented by the instructions of the CPU 201, the network LT 205, and the external device connection I/F 206, illustrated in FIG. 2, transmits or receives various data (or information) to or from other terminal, apparatus, or system through the communication network 10.

The acceptance unit 22, which is implemented by the instructions of the CPU 201, the contact sensor 214, and the electronic pen controller 216, illustrated in FIG. 2, accepts various inputs from the user.

In example operation, the image and audio processor 23, which may be implemented by the instructions of the CPU 201 and the capturing device 211 illustrated in FIG. 2, captures and stores image data displayed on the display 220.

In other operation, the image and audio processor 23, which may be implemented by the instructions of the CPU 201 and the GPU 212 illustrated in FIG. 2, performs processing on data to be displayed on the display 220. For example, the image and audio processor 23 applies image processing to an image of a subject that has been captured by the camera 2400.

Further, after the audio, such as voice of the user, is converted to an audio signal by the microphone 2200, the image and audio processor 23 applies processing to audio data based on this audio signal. The image and audio processor 23 then outputs the audio signal according to the audio data to the speaker 2300, and the speaker 2300 outputs audio.

In another example, the image and audio processor 23 obtains drawing image data, drawn by the user with the electronic pen 2500 or the user's hand H onto the display 220, and converts the drawing image data to coordinate data. For example, when the electronic whiteboard 2 transmits the coordinate data to an electronic whiteboard 2 at another site, the electronic whiteboard 2 at the another site controls the display 220 to display a drawing image having the same content based on the received coordinate data.

The display control 24 is implemented by the instructions of the CPU 201 and the display controller 213, illustrated in FIG. 2. The display control 24 controls the display 220 to display a drawing image, or accesses the sharing assistant server 6 using the web browser to display various screen data Specifically, the display control 24 activates and executes Launcher and the external application, which operates on OS, to display various screens on the display 220, under control of an API (Application Programming Interface) of the OS. The external application is any application that executes processing independently of the Launcher to execute a service or a function under control of the OS.

The determiner 25, which may be implemented by the instructions of the CPU 201 illustrated in FIG. 2, outputs a determination result.

The identifying unit 26, which may be implemented by the instructions of the CPU 201 illustrated in FIG. 2, identifies a designated area 262 on a screen of the display 220.

The obtainer and provider 28, which is implemented by the instructions of the CPU 201 and the short-range communication circuit 219 with the antenna 219a, illustrated in FIG. 2, communicates with a terminal device carried by the user, such as an IC card or a smart phone to obtain or provide data from or to the IC card or the smart phone by short-range communication.

The storing and reading processor 29, which is implemented by the instructions of the CPU 201 illustrated in FIG. 2, performs processing to store various types of data in the memory 2000 or read various types of data stored in the memory 2000. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten.

Even if the videoconference terminal 3 or the car navigation system 4 is used as the communication terminal, the videoconference terminal 3 and car navigation system 4 are substantially similar in function to the electronic whiteboard 2, such that description thereof is omitted.

<Functional Configuration of PC>

As illustrated in FIG. 6, the PC 5 includes a transmitter and receiver 51, an acceptance unit 52, a display control 54, a generator 56, an audio control 58, and a storing and reading processor 59. These units are functions that are implemented by or that are caused to function by operating any of the elements illustrated in FIG. 6 in cooperation with the instructions of the CPU 501 according to the control program expanded from the HD 504 to the RAM 503. The PC 5 further includes a memory 5000 implemented by the HD 504 illustrated in FIG. 5.

(Functional Unit of PC)

Next, a functional configuration of the PC 5 is described in detail. The transmitter and receiver 51, which is implemented by the instructions from the CPU 501 and by the network I/F 509 illustrated in FIG. 5, transmits or receives various types of data (or information) to or from another terminal, device, apparatus, or system via the communication network 10.

The acceptance unit 52, which is implemented by the instructions of the CPU 501, keyboard 511, and mouse 512, illustrated in FIG. 5, accepts various inputs from the user.

The display control 54, which is implemented by the instructions of the CPU 501, controls the display 508 to display an image, for example, using web browser based on various screen data that is obtained through accessing the sharing assistant server 6. Specifically, the display control 54 activates and executes meeting minutes application or browser, which operates on OS, to access the sharing assistant server 6 or the schedule management server 8. Then, the display control 54 downloads, for example, WebAPP (Web Application), which includes at least HTML (Hyper Text Markup Language), and further includes CSS (Cascading Style Sheets) or JAVASCRIPT (Registered Trademark). The display control 54 further controls the display 508 to display various image data generated using the WebAPP. For example, the display control 54 controls the display 508 to display image data generated by HTML 5, which includes data in XML (Extensible Markup Language), JSON (JavaScript Object Notation), or SOAP (Simple Object Access Protocol).

The generator 56, which is implemented by the instructions from the CPU 501 illustrated in FIG. 5, generates various types of image data for display on the display 508. For example, the generator 56 generates various image data using content data received at the transmitter and receiver 51. In one example, the generator 56 renders text data as an example of content data, and generates image data for display based on the text data that has been rendered. In this example, rendering is a set of processes to interpret data described in language for Web page (HTML, CSS, XML, etc.) and calculate the arrangement of characters or images to be displayed on a screen.

The audio control 58, which is implemented by instructions from the CPU 501 illustrated in FIG. 5, controls the speaker 515 to output an audio signal. The audio control 58 sets audio data to be output from the speaker 515, such that the speaker 515 outputs the audio signal based on the set audio data to reproduce audio. The storing and reading processor 59, which may be implemented by the instructions of the CPU 501 and the HDD 505, illustrated in FIG. 5, performs processing to store various types of data in the memory 5000 or read various types of data stored in the memory 5000.

<Functional Configuration of Sharing Assistant Server>

The sharing assistant server 6 includes a transmitter and receiver 61, an authenticator 62, a generator 63, an obtainer 64, a determiner 65, and a storing and reading processor 69. These units are functions that are implemented by or that are caused to function by operating any of the hardware elements illustrated in FIG. 6 in cooperation with the instructions of the CPU 601 according to a sharing assistant program read from the HD 604 to the RAM 603. The sharing assistant server 6 includes a memory 6000 implemented by the HD 604 illustrated in FIG. 5.

(User Authentication Management Table)

FIG. 7A is an illustration of an example data structure of a user authentication management table. The memory 6000 stores a user authentication management DB 6001 such as the user authentication management table illustrated in FIG. 7A. The user authentication data management table stores, for each user being managed, a user ID for identifying the user, a user name of the user, an organization ID for identifying an organization to which the user belongs, and a password, in association. The organization ID may be represented as a domain name assigned to an organization such as a group for managing a plurality of computers on the communication network.

(Access Management Table)

FIG. 7B is an illustration of an example data structure of an access management table. The memory 6000 stores an access management DB 6002, such as the access management table illustrated in FIG. 7B. The access management table stores an organization ID, and an access ID and an access password for authenticating a user in accessing a corresponding scheduler managed by the schedule management server 8, in association. The access ID and the access password are needed for the sharing assistant server 6 to use a service (function) provided by the schedule management server 8 via such as the Web API (Application Programming Interface), using a protocol such as HTTP or HTTPS. Since the schedule management server 8 manages a plurality of schedulers, which may differ among the organizations, the access management table is provided to manage schedulers.

(Schedule Management Table)

FIG. 7C is an illustration of an example data structure of a schedule management table. The memory 6000 stores a schedule management DB 6003, which is implemented by the schedule management table illustrated in FIG. 7C. The schedule management table stores, for each set of a scheduled event ID and a conducted event ID of an event, an organization ID and a user ID of a user as a reservation holder, participation of the reservation holder, a name of the reservation holder, a scheduled start time of the event, a scheduled end time of the event, a name of the event, a user ID(s) of one or more other users (other participants) in the event, participation of each other participant, and names of one or more other users, in association.

The scheduled event ID is identification information for identifying an event that has been scheduled. The scheduled event ID is an example of scheduled event identification information for identifying an event to be conducted.

The conducted event ID is identification information for identifying an event that has been conducted, from among one or more scheduled events. The conducted event ID is an example of conducted event identification information (conducted event ID) for identifying an event that has been conducted or being conducted. That is, as described below, the conducted event ID is assigned to any event that has started.

The name of the reservation holder is a name of the user who has reserved to use a particular resource. For example, assuming that the resource is a conference room, a name of the user who made the reservation is a name of an organizer who has organized a meeting (an example of event) to be held in that conference room. In case where the resource is a vehicle, a name of the user who made the reservation is a name of a driver who will drive the vehicle.

The scheduled start time indicates a time when the user plans to start using the reserved resource. The scheduled end time indicates a time when the user plans to end using the reserved resource. That is, with the scheduled start time and the scheduled end time, a scheduled time period for the event is defined.

The event name is a name of the event to be held by the user who has reserved the resource, using the reserved resource.

The user ID of other participant is identification information for identifying any participant other than the reservation holder. As a participant other than the reservation holder, any resource to be used for the event may be included, such as the communication terminal. That is, the user scheduled to attend the event, managed by the schedule management table, includes a user as a reservation holder, other user as a participant of the event, and the resource reserved by the reservation holder such as the communication terminal. The user ID of the communication terminal is an identifier that is previously assigned to the communication terminal, and is stored in its internal memory.

(Conducted Event Management Table)

FIG. 8A is an illustration of an example data structure of a conducted event management table. The memory 6000 stores a conducted event management DB 6004, which is implemented by the conducted event management table as illustrated in FIG. 8A.

The conducted event management table stores, for each project, a project ID of the project and a conducted event ID of each of one or more events that have been performed in relation to the project, in association.

Figure 20:
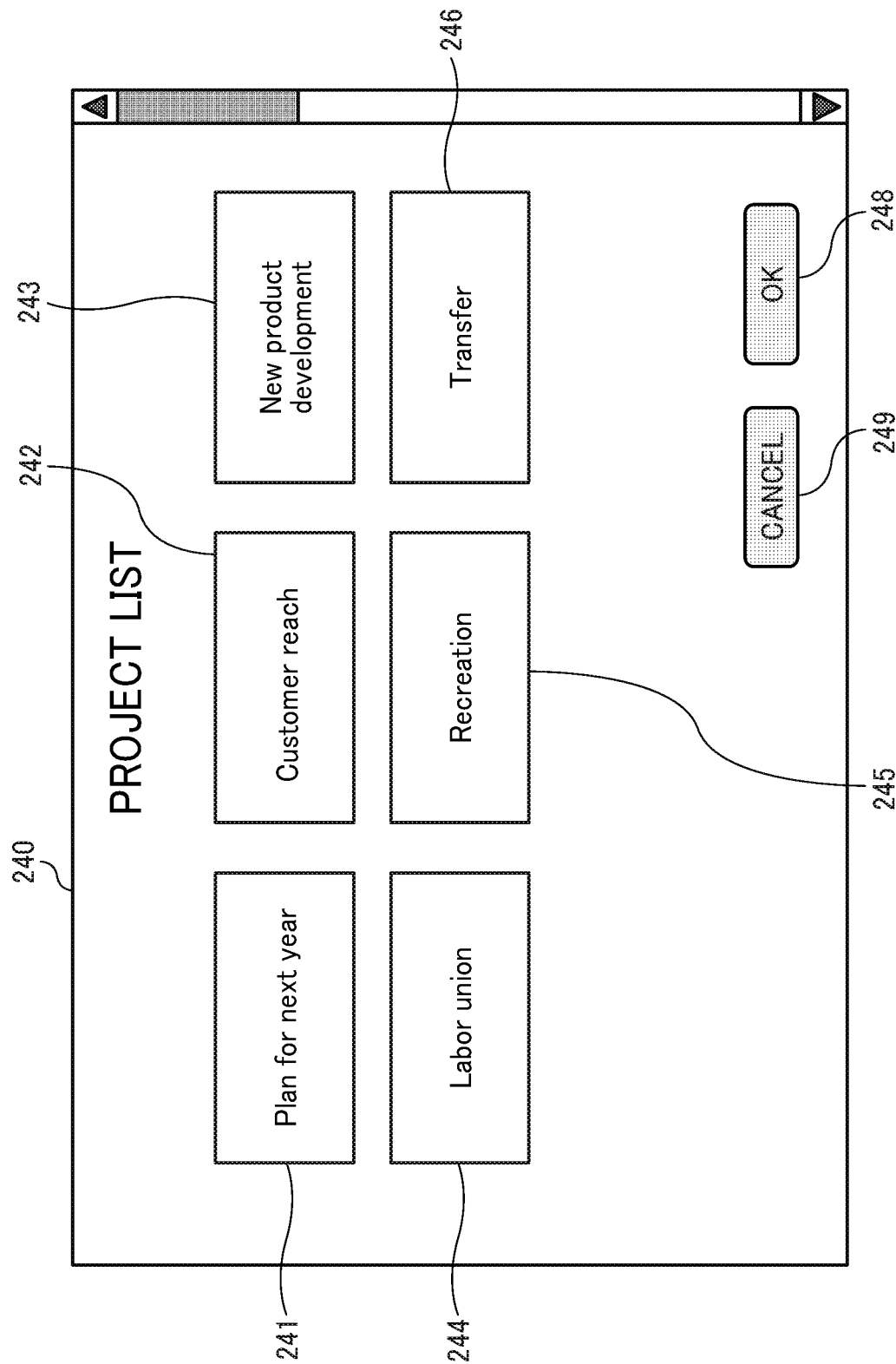
FIG. 20 is an illustration of an example project list screen.

The project ID is an example of identification information for identifying a project. The project is any undertaking, possibly involving research or design, that is planned to achieve a particular aim. The project is carried out by a team or a group of members, called project members. In this embodiment, the project members of a particular project can share event records such as minutes of an event for the particular project. As illustrated in FIG. 20, a project ID is assigned to each project, such as to the project "Plan for next year" and the project "Customer reach". The project ID may be alternatively referred to as a group ID or a team ID, for identifying a group or team of project members.

(Content Management Table)

FIG. 8B is an illustration of an example data structure of a content management table. The memory 6000 stores a content management DB 6005, which is implemented by a content management table illustrated in FIG. 8B. The content management table stores, for each conducted event ID, a content processing ID, a type of content processing, content data, start date and time of content processing, and end date and time of content processing, in association.

The content is any data or information that has been generated or that has been referred to, during the event held in relation to a particular project. For example, in case the event is a meeting, content being referred to may be any meeting materials such as data of presentation slides. Examples of type of content processing ("content processing type") include audio recording ("recording"), taking screenshots ("screenshot"), reception of voice text data ("voice text reception"), generation of action item ("action item"), and transmission of a data file ("file transmission"). The content processing ID is identification information for identifying processing to be performed in relation to content generated or used during the event.

Examples of content data include information or data ("record information") that helps to describe how the event has been progressed, and information or data that has been generated as the event is being held.

In case the event is a meeting, the record information could be recorded voice data, screenshots, text data converted from voice, and meeting materials. The information or data generated during the meeting could be an action item.

Screenshot is processing to capture a screen of the resource (such as the communication terminal), at any time during when the event is being held, to record as screen data. The screenshot may be alternatively referred to as capturing or image detection.

When the content processing type is "recording", the "content data" field includes a URL of a storage destination of voice data that has been recorded.

When the content processing type is "screenshot", the "content data" field includes a URL of a storage destination of image data generated by capturing a screen of the communication terminal. In this disclosure, capturing is processing to store an image being displayed on the display 220 of the electronic whiteboard 2 in a memory, as image data.

When the content processing type is "voice text reception", the "content data" field includes a URL of a storage destination of voice text data (text data) that has been converted from voice data of the user.

One or more action items may occur during the event, such as the meeting, in relation to a particular project. The action item indicates an action to be taken by a person related to the event or the particular project. When the content processing type is "action item", the "content data" field includes a user ID of an owner of the action item, a due date of such action item, and a URL indicating a storage destination of image data describing the action item.

When the content processing type is "file transmission", the "content data" field includes a URI, indicating a storage destination of a data file that is stored, in relation to the event or the particular project.

(Functional Unit of Sharing Assistant Server)

Next, a functional unit of the sharing assistant server 6 is described in detail according to the embodiment. In the following description of the functional configuration of the sharing assistant server 6, relationships of one or more hardware elements in FIG. 5 with each functional unit of the sharing assistant server 6 in FIG. 6 will also be described.

The transmitter and receiver 61 of the sharing assistant server 6 illustrated in FIG. 6, which is implemented by the instructions of the CPU 601 illustrated in FIG. 5 and by the network I/F 609 illustrated in FIG. 5, transmits or receives various types of data (or information) to or from another terminal, device, or system via the communication network 10.

The authenticator 62, which is implemented by the instructions of the CPU 601 illustrated in FIG. 5, determines whether data (user ID, organization ID, and password) transmitted from the communication terminal matches any data previously registered in the user authentication management DB 6001. As described above, the communication terminal is any device that the user uses for login.

Figure 18:
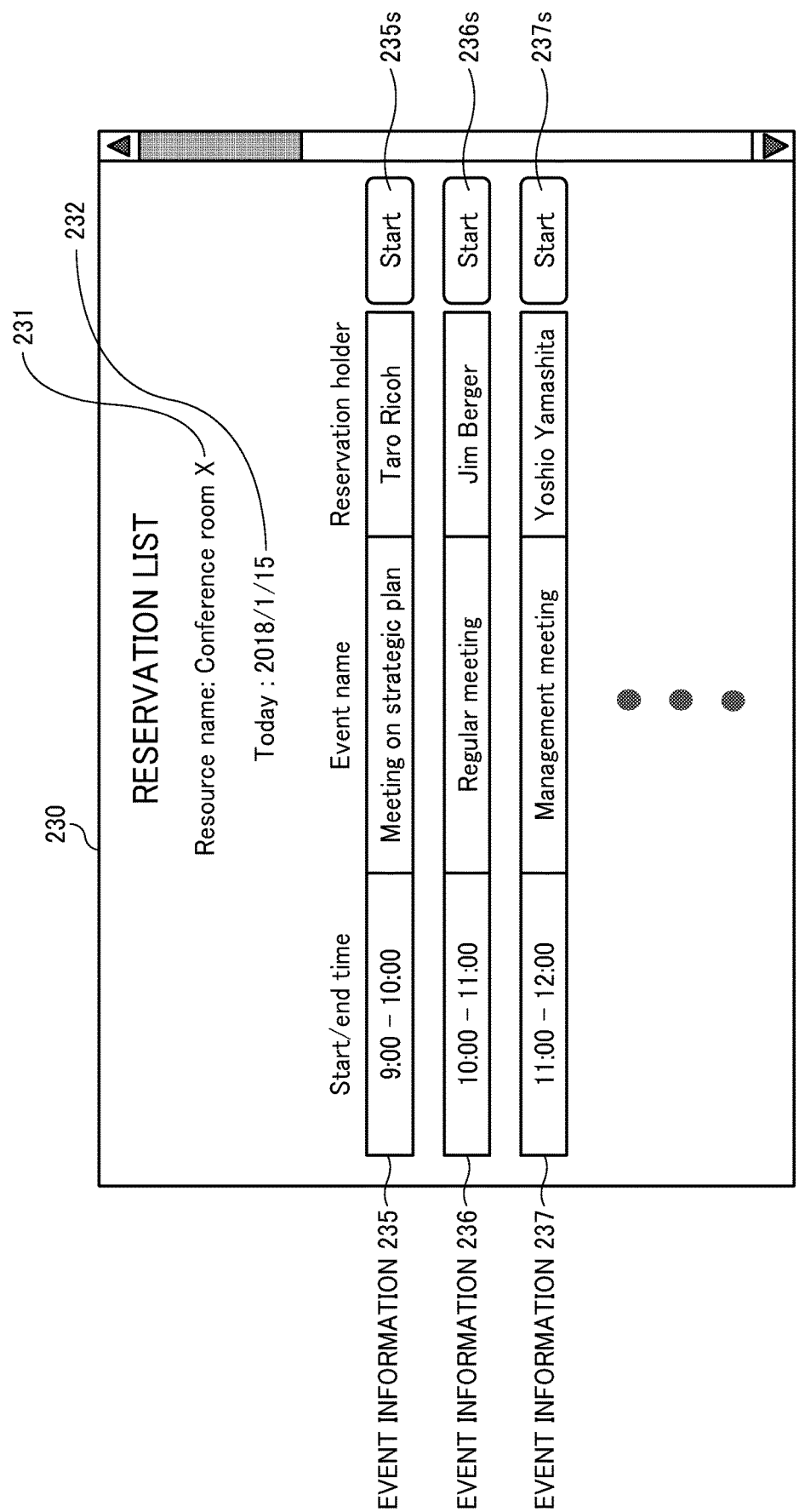
FIG. 18 is an illustration of an example resource reservation list screen.

The generator 63, which is implemented by the instructions of the CPU 601 as illustrated in FIG. 5, generates a reservation list screen 230 as illustrated in FIG. 18, based on reservation information and schedule information transmitted from the schedule management server 8.

The obtainer 64, which is implemented by the instructions of the CPU 601 illustrated in FIG. 5, generates, or obtains, a conducted event ID, a content processing ID, and a URL of a storage destination of content. For ID, the obtainer 64 may assign any number or letter to uniquely identify each event.

The determiner 66, which is implemented by the instructions of the CPU 601 illustrated in FIG. 5, makes various determinations.

The storing and reading processor 69, which is implemented by the instructions of the CPU 601 illustrated in FIG. 5 and the HDD 605 illustrated in FIG. 5, performs processing to store various types of data in the memory 6000 or read various types of data stored in the memory 6000.

<Functional Configuration of Schedule Management Server>

The schedule management server 8 includes a transmitter and receiver 81, an authenticator 82, and a storing and reading processor 89. These units are functions that are implemented by or that are caused to function by operating any of the elements illustrated in FIG. 6 in cooperation with the instructions of the CPU 801 according to the schedule management program expanded from the HD 804 to the RAM 803. The schedule management server 8 includes a memory 8000 implemented by the HD 804 illustrated in FIG. 5.

(User Authentication Management Table)

FIG. 9A is an illustration of an example data structure of a user authentication management table. The memory 8000 stores the user authentication management DB 8001 such as the user authentication management table illustrated in FIG. 9A. The user authentication management table of FIG. 9A stores, for each user being managed, a user ID for identifying the user, an organization ID for identifying an organization to which the user belongs, and a password, in association.

(User Management Table)

FIG. 9B is an illustration of an example data structure of a user management table. The memory 8000 stores a user management DB 8002, which is implemented by the user management table illustrated in FIG. 9B. The user management table stores, for each organization ID, one or more user IDs each identifying the user belonging to that organization, and names of the one or more users.

(Resource Management Table)

FIG. 9C is an illustration of an example data structure of a resource management table. The memory 8000 stores a resource management DB 8003, which is implemented by the resource management table illustrated in FIG. 9C. The resource management table stores, for each organization ID, one or more resource IDs each identifying the resource managed by that organization, and names of the one or more resources, in association.

(Resource Reservation Management Table)

FIG. 10A is an illustration of an example data structure of a resource reservation management table. The memory 8000 stores a resource reservation management DB 8004, which is implemented by the resource reservation management table illustrated in FIG. 10A. The resource reservation management table manages, for each organization, reservation information in which various data items relating to a reserved resource are associated. The reservation information includes, for each organization ID, a resource ID and a resource name of a reserved resource, a user ID of a communication terminal, a user ID of a reservation holder who made reservation, a scheduled start date and time and a scheduled end date and time of an event in which the reserved resource is to be used, and an event name of such event.

The scheduled start date and time indicates a date and time when the user plans to start using the reserved resource. The scheduled end date and time indicates a date and time when the user plans to end using the reserved resource. In this example, while the date and time is expressed in terms of year, month, date, hour, minute, second, and time zone, FIG. 10A only shows year, month, date, hour, and minute for simplicity.

(Event Management Table)

FIG. 10B is an illustration of an example data, structure of the event management table. The memory 8000 stores an event management DB 8005, which is implemented by the event management table as illustrated in FIG. 10B. The event management table manages, for each event, event schedule information in which various data items relating to an event are associated.

Specifically, the event management table stores, for each scheduled event ID, an organization ID, a user ID, and a name of each user who is scheduled to attend the event, a scheduled start date and time of the event, a scheduled end date and time of the event, and a name of the event, in association. As described above, the communication terminal is treated as a user who is scheduled to attend the event.

The scheduled start date and time of the event indicates a date and time of the event that the user plans to participate starts. The scheduled end date and time of the event indicates a date and time of the event that the user plans to participate ends. In this example, while the date and time is expressed in terms of year, month, date, hour, minute, second, and time zone. FIG. 10B only shows year, month, date, hour, and minute for simplicity.

The event management table further stores a memo. The memo corresponds to any data entered during registering the schedule as described below referring to FIG. 16.

(Server Authentication Management Table)

FIG. 11A is an illustration of an example data structure of a server authentication management table. The memory 8000 stores a server authentication management DB 8006, such as the server authentication management table illustrated in FIG. 11A. The server authentication management table stores an access ID and an access password in association.

In authentication, the schedule management server 8 determines whether the access ID and the access password transmitted from the sharing assistant server 6 matches the access ID and the access password stored in the server authentication management DB 8006. That is, data managed by the sharing assistant server 6 using the access management table of FIG. 7B, and data managed by the schedule management server 8 using the server authentication management table of FIG. 11A are to be kept the same.

(Project Member Management Table)

FIG. 11B is an illustration of an example data structure of a project member management table. The memory 8000 stores a project member management DB 8007, which is implemented by the project member management table illustrated in FIG. 11B. The project member management table stores, for each project being managed by each organization having the organization ID, a project ID, a project name, and a user ID of each project member, in association. Information in the project member management table is registered by the user through the project registration process using, for example, the PC 5.

(Conducted Event Record Management Table)

FIG. 12A, is an illustration of an example data structure of a conducted event record management table. The memory 6000 stores a conducted event record management DB 8008, which is implemented by the conducted event record management table as illustrated in FIG. 12A. The conducted event management table stores, for each set of project ID and conducted event ID, a content processing ID, a type of content processing, content data, a start date and time of content processing, and an end date and time of content processing, in association. The conducted event record management DB 8008 is generated based on the content management DB 6005. That is, the conducted event ID, content processing ID, type of content processing, start date and time of content processing, and end date and time of content processing, are the same between these databases 6005 and 8008.

The data in the "content data" field, that is, the storage destination of content, is managed using a different expression format, while the actual storage location is the same. Specifically, the storage destination is described in c://(local drive) for the content management table (FIG. 8B), and in http://for the conducted event record management table (FIG. 12A).

(Conducted Event Management Table)

FIG. 12B is an illustration of a conducted event management table. The memory 8000 stores a conducted event management DB 8009, which is implemented by the conducted event management table illustrated in FIG. 12B. The conducted event management table stores, for each conducted event ID, an event name, an event start date and time, and an event end date and time, in association. From among the schedule information stored in the event management DB 8005, information related to one or more events that have been actually held (called "conducted event") are managed using the conducted event management DB 8009.

(Functional Unit of Schedule Management Server)

Next, a functional unit of the schedule management server 8 is described in detail according to the embodiment. In the following description of the functional configuration of the schedule management server 8, relationships of one or more hardware elements in FIG. 5 with each functional unit of the schedule management server 8 in FIG. 6 will also be described.

The transmitter and receiver 81 of the schedule management server 8 illustrated in FIG. 6, which is implemented by the instructions of the CPU 801 illustrated in FIG. 5 and by the network I/F 809 illustrated in FIG. 5, transmits or receives various types of data (or information) to or from another terminal, device, or system via the communication network 10.

The authenticator 82, which is implemented by the instructions of the CPU 801 illustrated in FIG. 5, determines whether data (user ID, organization ID, and password) transmitted from the resource matches any data previously registered in the user authentication management DB 8001. The authenticator 82 determines whether data (access ID and access password) transmitted from the sharing assistant server 6 matches any data previously registered in the server authentication management DB 8006, to authenticate the sharing assistant server 6.

The storing and reading processor 89, which is implemented by the instructions of the CPU 801 illustrated in FIG. 5 and the HDD 805 illustrated in FIG. 5, performs processing to store various types of data in the memory 8000 or read various types of data stored in the memory 8000.

<Functional Configuration of Voice-to-Text Conversion Server>

The voice-to-text conversion server 9 includes a transmitter and receiver 91, a converter 93, and a storing and reading processor 99. These units are functions that are implemented by or that are caused to function by operating any of the elements illustrated in FIG. 6 in cooperation with the instructions of the CPU 901 according to the control program expanded from the HD 904 to the RAM 903. The voice-to-text conversion server 9 includes a memory 9000, implemented by the HD 904 illustrated in FIG. 5.

(Functional Unit of Voice-to-Text Conversion Server)

Next, a functional unit of the voice-to-text conversion server 9 is described in detail according to the embodiment. In the following description of the functional configuration of the voice-to-text conversion server 9, relationships of one or more hardware elements in FIG. 5 with each functional unit of the conversion server 9 in FIG. 6 will also be described.

The transmitter and receiver 91 of the conversion server 9 illustrated in FIG. 6, which is implemented by the instructions of the CPU 901 illustrated in FIG. 5 and by the network I/F 909 illustrated in FIG. 5, transmits or receives various types of data (or information) to or from another terminal, device, or system via the communication network 10.

The converter 93, which is implemented by the instructions of the CPU 901 illustrated in FIG. 5, converts voice data received at the transmitter and receiver 91 via the communication network 10, into text data (voice text data).

The storing and reading processor 99, which is implemented by the instructions of the CPU 901 illustrated in FIG. 5 and the HDD 905 illustrated in FIG. 5, performs processing to store various types of data in the memory 9000 or read various types of data stored in the memory 9000.

In this disclosure, any one of the IDs described above is an example of identification information identifying the device or terminal, or the user operating the device or terminal. Examples of the organization ID include, but not limited to, a name of a company, a name of a branch, a name of a business unit, a name of a department, a name of a region, etc. In alternative to the user ID identifying a specific user, an employee number, a driver license number, and an individual number called "My Number" under the Japan's Social Security and Tax Number System, may be used as identification information for identifying the user.

<Operation>

The following describes one or more operations to be performed by the sharing system 1.

<Processing to Register Schedule>

Figure 13:
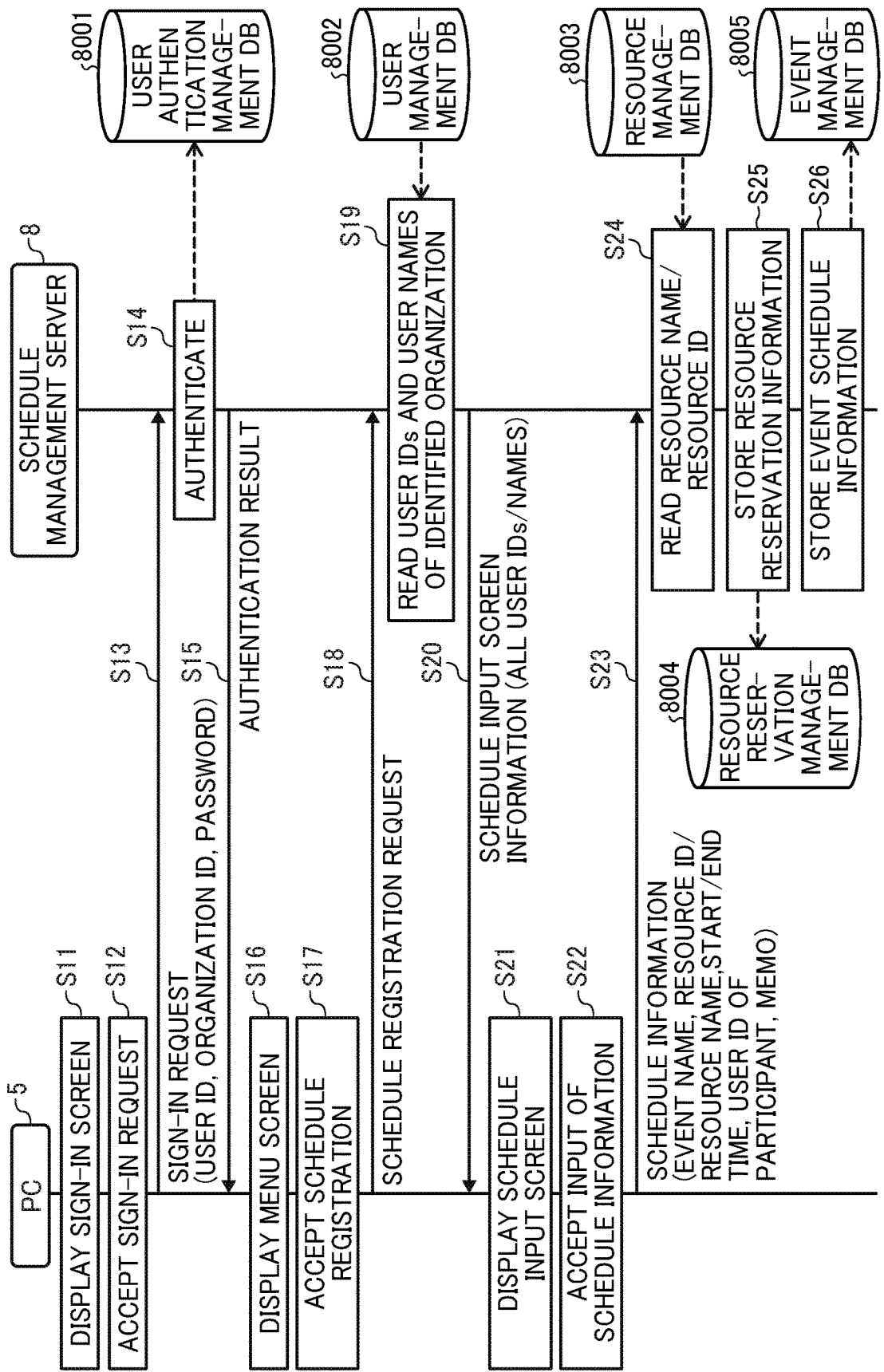
FIG. 13 is a sequence diagram illustrating operation of registering a schedule, according to an embodiment.
Figure 14:
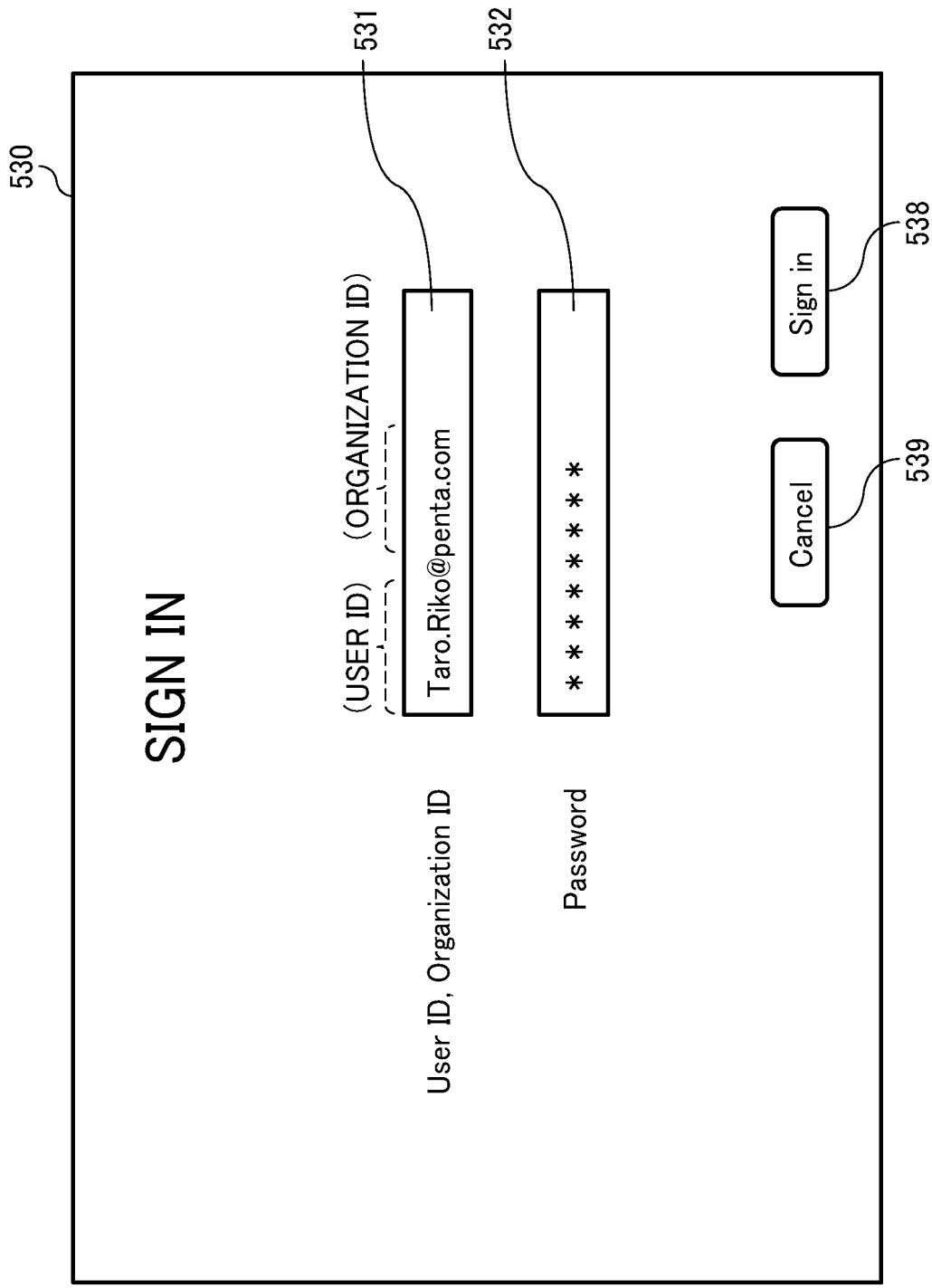
FIG. 14 is an illustration of an example sign-in screen.
Figure 15:
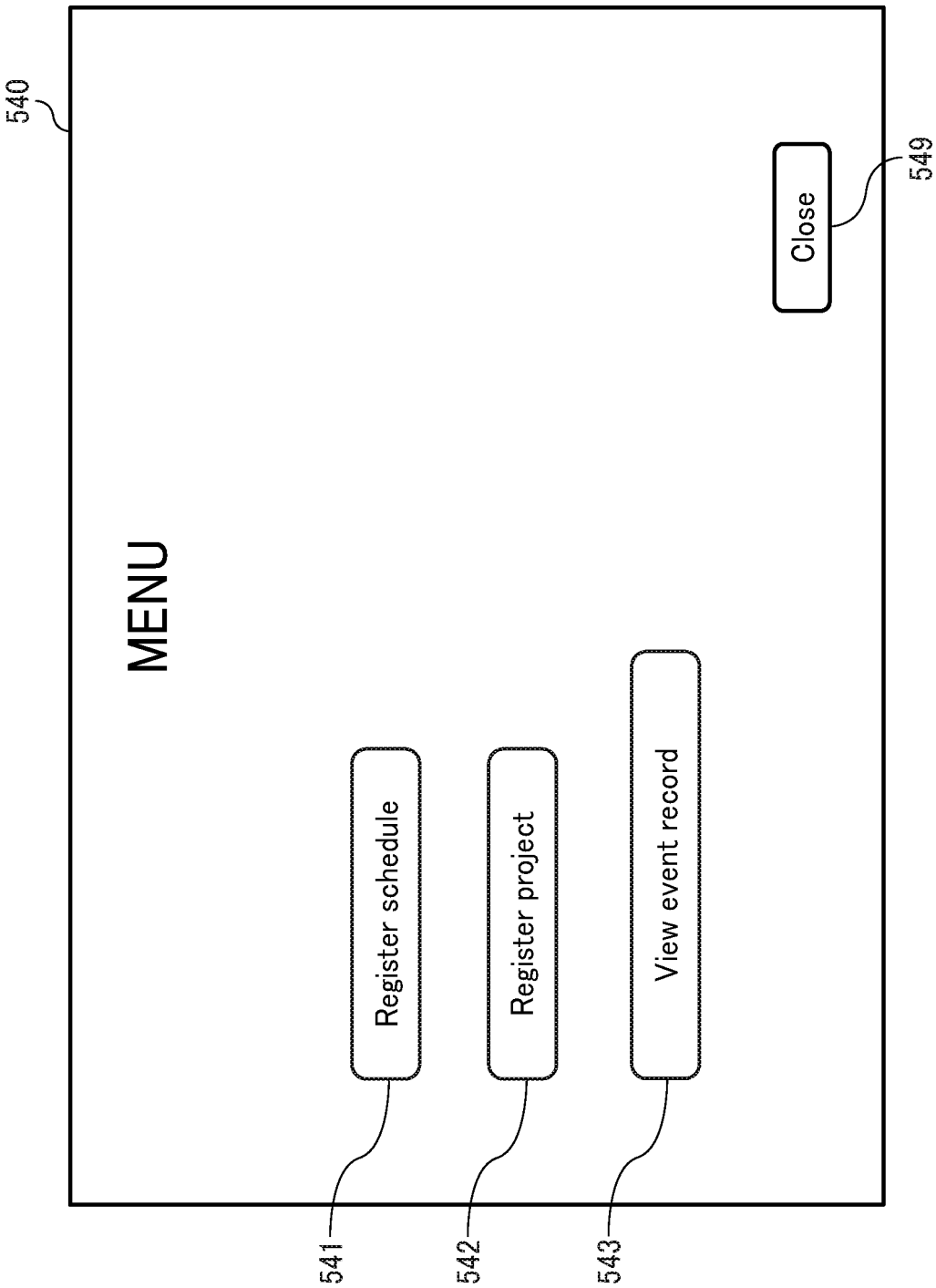
FIG. 15 is an illustration of an example menu screen.
Figure 16:
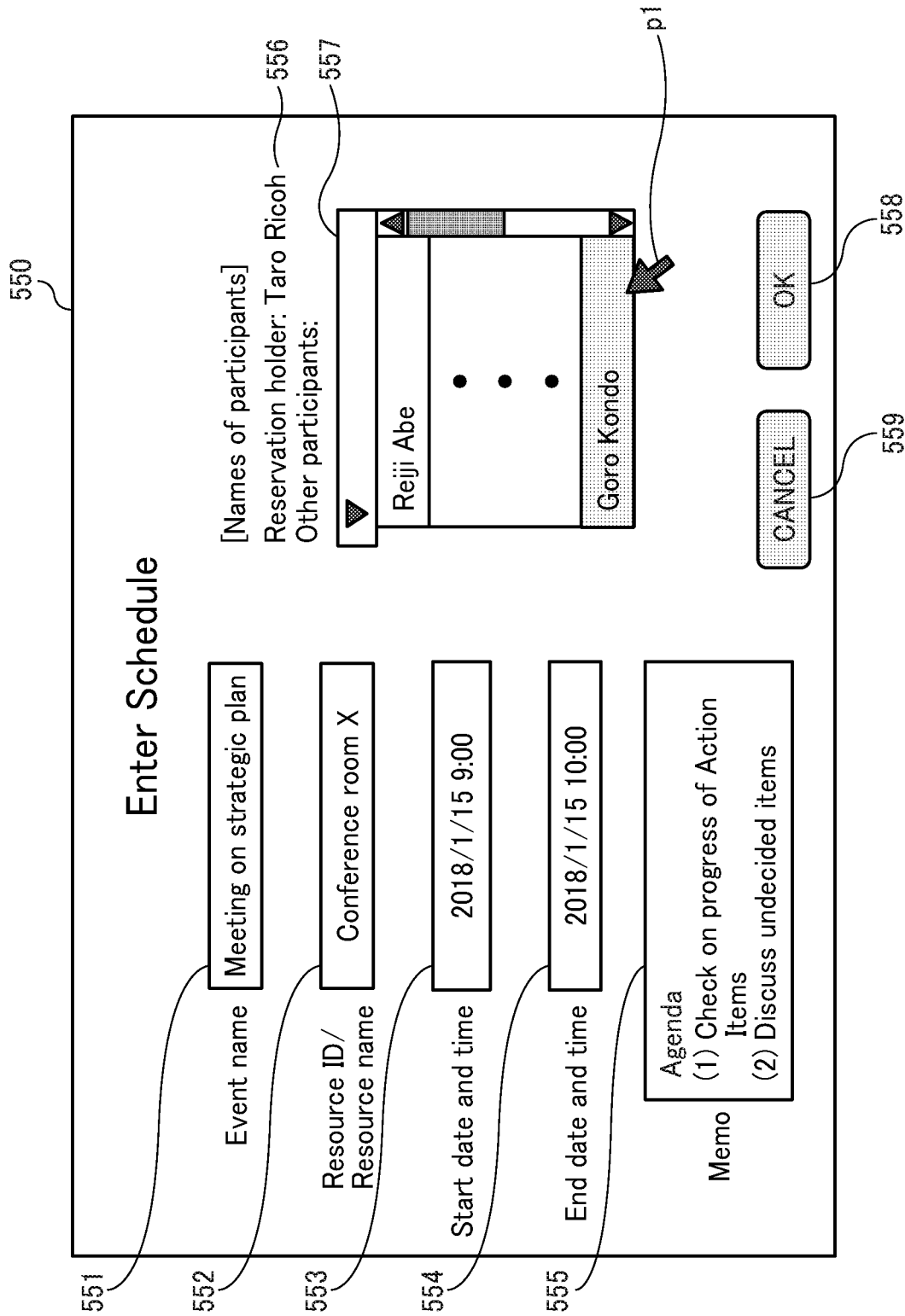
FIG. 16 is an illustration of an example schedule input screen.

Referring to FIGS. 13 to 16, processing of registering a schedule of a user A (Taro Ricoh) to the schedule management server 8, using the PC 5, is described according to an example. FIG. 13 is a sequence diagram illustrating operation of registering a schedule, according to the example. FIG. 14 is an illustration of an example sign-in screen. FIG. 15 is an example menu screen displayed by the PC 5. FIG. 16 is an illustration of an example schedule input screen.

In response to an operation on the keyboard 511 of the PC 5 by the user A, the display control 54 of the PC 5 displays a sign-in screen 530 on the display 508 as illustrated in FIG. 14 (S11). The sign-in screen 530 allows the user to sign (log) into the schedule management server 8. The sign-in screen 530 includes an entry field 531 for entering a user ID and an organization ID of a user, an entry field 532 for entering a password, a sign-in button 538 to be pressed when executing sign-in processing, and a cancel button 539 to be pressed when canceling the sign-in processing. In this case, the user ID and the organization ID are each extracted from an e-mail address of the user A. Specifically, a user name of the email address represents the user ID, and a domain name of the email address represents the organization ID. While only one entry field 531 for entering the email address is illustrated in FIG. 14, an entry field may be provided for each of the users ID and the organization ID.

Through the sign-in screen 530, the user enters the user ID and the organization ID of his/her own into the entry field 531, enters the password of his/her own into the entry field 532, and presses the sign in button 538. In response to such user operation, the acceptance unit 52 of the PC 5 accepts a request for sign-in processing (S12). The transmitter and receiver 51 of the PC 5 transmits sign-in request information to the schedule management server 8 (S13). The sign-in request information includes the user ID, organization ID, and password, which are accepted at S12. Accordingly, the transmitter and receiver 81 of the schedule management server 8 receives the sign-in request information.

Next, the authenticator 82 of the schedule management server 8 authenticates the user A using the user ID, the organization ID, and the password (S14). Specifically, the storing and reading processor 89 determines whether a set of the user ID, the organization ID, and the password, which is obtained from the sign-in request information received at S13, has been registered in the user authentication management DB 8001 (FIG. 9A). When there is the set of the user ID, the organization ID, and the password in the user authentication management DB 8001, the authenticator 82 determines that the user A who has sent the sign-in request is an authorized user. When there is no such set of the user ID, the organization ID, and the password in the user authentication management DB 8001, the authenticator 82 determines that the user A is an unauthorized (illegitimate) user. When it is determined that the user A is an illegitimate user, the transmitter and receiver 81 sends to the PC 5 a notification indicating the illegitimate user. In the following, it is assumed that the user A is determined to be an authorized user.

The transmitter and receiver 81 transmits an authentication result to the PC 5 (S15). The transmitter and receiver 51 of the PC 5 receives the authentication result.

When the authentication result indicating successful authentication is received at S15, the generator 56 of the PC 5 generates data of a menu screen 540 for display as illustrated in FIG. 15. The display control 54 of the PC 5 controls the display 508 to display the menu screen 540 as illustrated in FIG. 15 (S16). The menu screen 540 includes a "Register schedule" button 541 for registering a schedule, a "Register project" button 542 for registering a project and a project member, and an "View event record" button 543 for viewing a record related to an event such as action items in case the event is a meeting. Here, the "Register schedule" button 541 may not be provided.

In response to pressing of the "Register schedule" button 541 by the user, the acceptance unit 52 accepts a request for schedule registration (S17). The transmitter and receiver 51 of the PC 5 transmits a schedule registration request to the schedule management server 8 (S18). Accordingly, the transmitter and receiver 81 of the schedule management server 8 receives the schedule registration request.

Next, the storing and reading processor 89 of the schedule management server 8 searches the user management DB 8002 (FIG. 9B), using the organization ID received at S13 as a search key, to obtain all user IDs and all user names that are associated with the received organization ID (S19). The transmitter and receiver 81 transmits schedule input screen information to the PC 5 (S20). The schedule input screen information includes all user IDs and all user names read out at S19. Here, all user names include the name of the user A who has entered various information at S12 to request for sign-in processing to input schedule information. The transmitter and receiver 51 of the PC 5 receives the schedule input screen information.

The generator 56 of the PC 5 generates data of a schedule input screen 550 for display, based on the schedule input screen information received at S20. The display control 54 of the PC 5 controls the display 508 to display the schedule input screen 550 as illustrated in FIG. 16 (S21).

Figure 21:
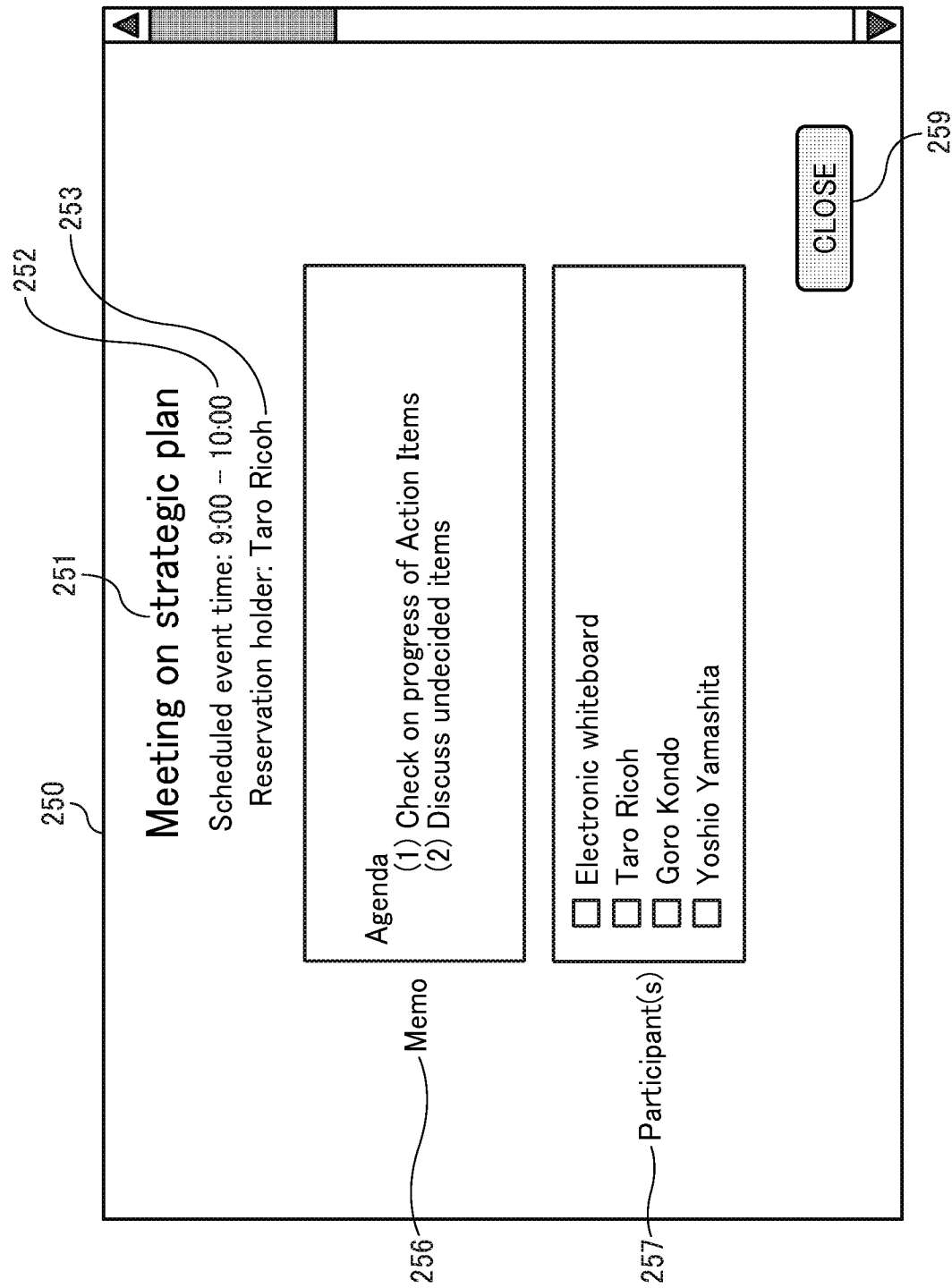
FIG. 21 is an illustration of an example event information screen.

The schedule input screen 550 includes an entry field 551 for an event name, an entry field 552 for a resource ID or a resource name, and an entry field 553 for a scheduled start date and time of the event (use of the resource), an entry field 554 for a scheduled end date and time of the event (use of the resource), an entry field 555 for entering memo such as agenda, a display field 556 for displaying a name of a reservation holder (in this example, the user A) who is making a reservation, a selection menu 557 for selecting one or more participants other than the reservation holder by name, an "OK" button 558 to be pressed when requesting for registration of reservation, and a "CANCEL" button 559 to be pressed when cancelling any content being entered or has been entered. The name of the reservation holder is a name of the user who has entered various information using the PC 5 to request for sign-in processing at S12. FIG. 21 further illustrates a mouse pointer p1.

The user may enter an email address of the resource in the entry field 552, as an identifier of the resource to be reserved. Further, the selection menu 557 may allow the reservation holder to select one or more resources by name. When a name of a particular resource is selected from the selection menu 557, that selected resource is added as one of participants in the event.

The user A enters items as described above in the entry fields 551 to 555, selects the name of each user participating in the event from the selection menu 557 by moving the pointer p1 with the mouse, and presses the "OK" button 558. In response to pressing of the "OK" button 558, the acceptance unit 52 of the PC 5 accepts input of schedule information (S22).

The transmitter and receiver 51 transmits the schedule information, which has been accepted, to the schedule management server 8 (S23). The schedule information includes an event name, a resource ID (or a resource name), a scheduled start date and time, a scheduled end date and time, a user ID of each participant, and information on memo.

When a resource ID is entered in the entry field 552 on the schedule input screen 550, the PC 5 transmits the entered resource ID as part of schedule information. When a resource name is entered in the entry field 552, the PC 5 transmits the entered resource name as part of schedule information. Here, only the user name is selected from the selection menu 557 on the schedule input screen 550. However, since the PC 5 has received the user IDs at S20, the PC 5 transmits the user ID corresponding to each of the user names that have been selected as part of schedule information. Accordingly, the transmitter and receiver 81 of the schedule management server 8 receives the schedule information.

Next, the storing and reading processor 89 of the schedule management server 8 searches the resource management DB 8003 (FIG. 9C) using the resource ID (or resource name) received at S23 as a search key, to obtain the corresponding resource name (or resource ID) (S24). The storing and reading processor 89 stores the reservation information in the resource reservation management DB 8004 (FIG. 10A) (S25). In this case, the storing and reading processor 89 adds one record of reservation information to the resource reservation management table in the resource reservation management DB 8004 managed by a scheduler previously registered (that is, the scheduler managed for a particular organization).

The reservation information is generated based on the schedule information received at S23 and the resource name (or resource ID) read out at S24. The scheduled start date and time in the resource reservation management DB 8004 corresponds to the scheduled start date and time in the schedule information. The scheduled end date and time in the resource reservation management DB 8004 corresponds to the scheduled end date and time in the schedule information.

The storing and reading processor 89 stores the schedule information in the event management DB 8005 (FIG. 10B) (S26). In this case, the storing and reading processor 89 adds one record of schedule information (that is, event schedule information) to the event management table in the event management DB 8005 managed by the scheduler that is previously registered (that is, the scheduler managed for a particular organization).

The event schedule information is generated based on the schedule information received at S23. The event start schedule date and time in the event management DB 8005 corresponds to the scheduled start date and time in the schedule information. The event end schedule date and time in the event management DB 8005 corresponds to the scheduled end date and time in the schedule information.

As described above, the user A registers his or her schedule to the schedule management server 8.

<Processing to Start Event>

Figure 17:
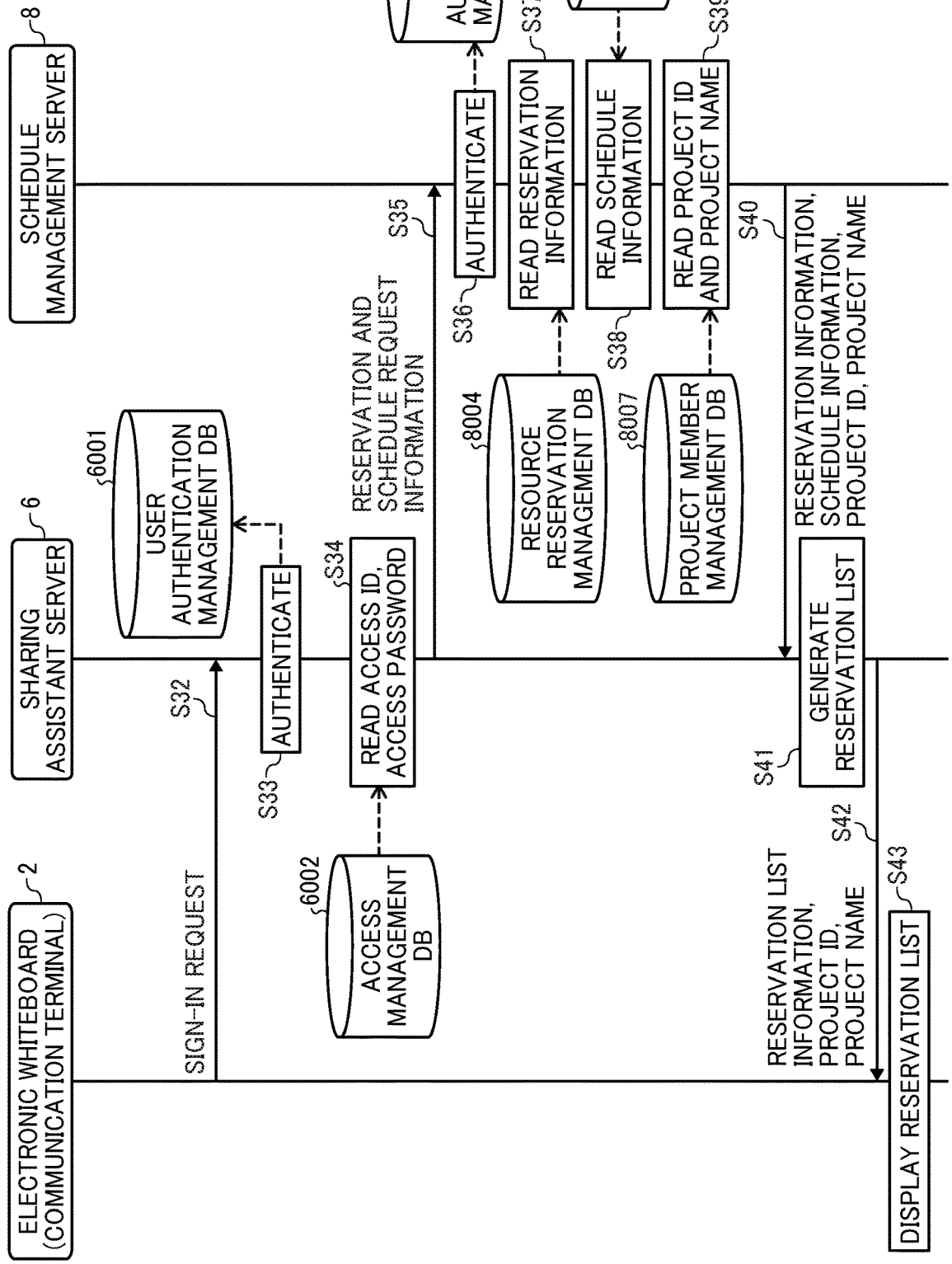
FIG. 17 is a sequence diagram illustrating operation of controlling processing to start an event, according to an embodiment.
Figure 19:
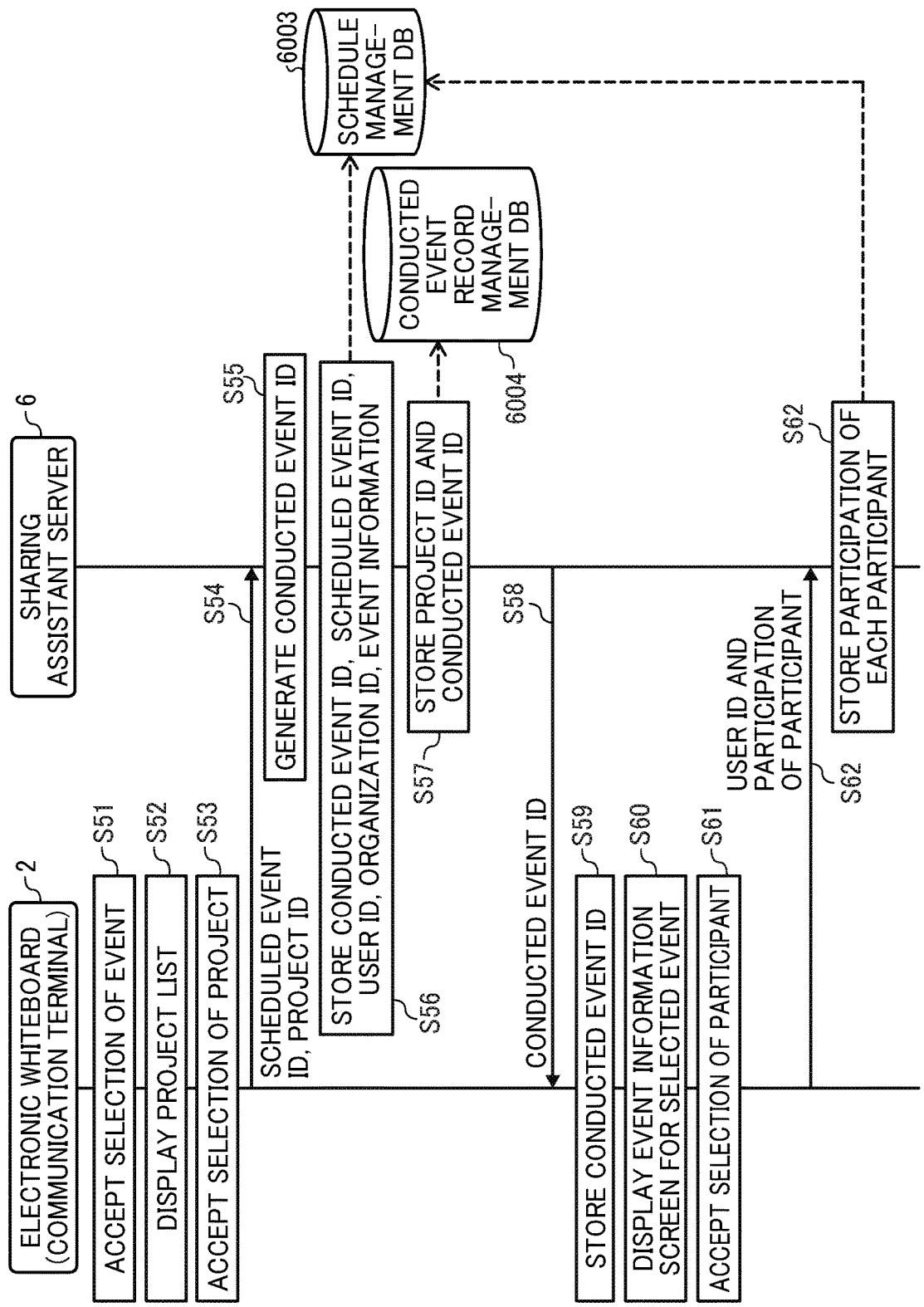
FIG. 19 is a sequence diagram illustrating operation of controlling processing to start an event, performed after operation of FIG. 17, according to an embodiment.
Figure 22:
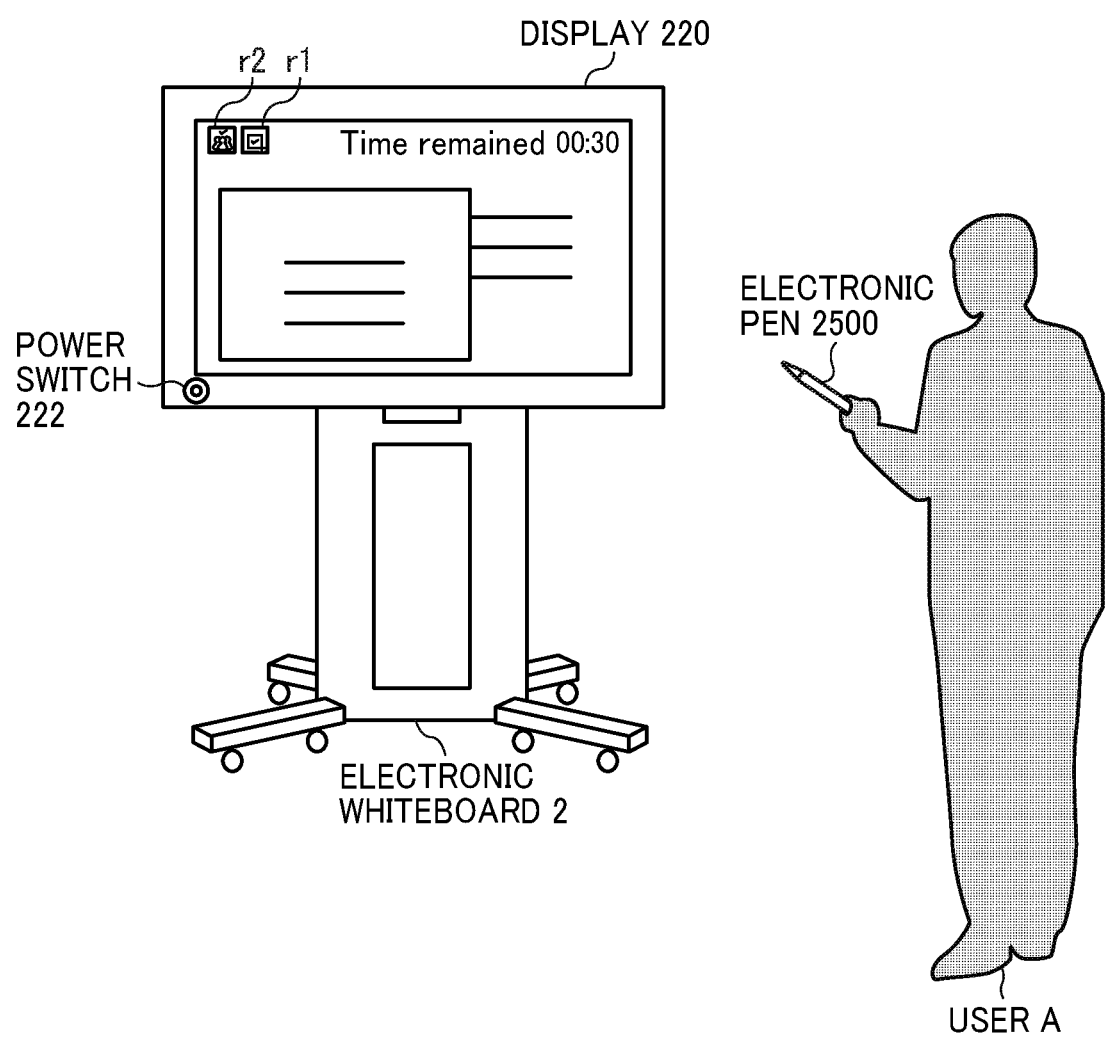
FIG. 22 is an illustration for explaining a use scenario of the electronic whiteboard, according to an embodiment.

Referring to FIGS. 17 to 22, operation of conducting a meeting with meeting participants using the electronic whiteboard 2, in the conference room X that has been reserved by the user A (Taroh Ricoh), is described according to an embodiment. FIGS. 17 and 19 are a sequence diagram illustrating a processing to start an event, such as a meeting, according to the embodiment. FIG. 18 is an illustration of an example resource reservation list screen. FIG. 20 is an illustration of an example project list screen. FIG. 21 is an illustration of an example event information screen. FIG. 22 is an illustration for explaining a use scenario of the electronic whiteboard 2 by a user, according to the embodiment.

Referring to FIG. 17, as the power switch 222 of the electronic whiteboard 2 is turned on by the user, the acceptance unit 22 of the electronic whiteboard 2 accepts a turn-on operation by the user. The acceptance unit 22 then activates the Launcher. The display control 24 of the electronic whiteboard 2 displays a sign-in screen on the display 220. The sign-in screen includes a selection icon to be pressed by the user to request for sign-in using the IC card of the user, and a selection icon to be pressed by the user to request for sign-in using an email address and a password of the user. The power-on icon is further provided, which is pressed to turn off the electronic whiteboard 2, without performing sign-in operation.

In response to pressing of the selection icon, the acceptance unit 22 accepts a request for sign-in. In one example, the user A brings his or her IC card into close contact with the short-range communication circuit 219 (such as a card reader). In another example, the user A enters the email address and password of the user A. The transmitter and receiver 21 of the electronic whiteboard 2 transmits sign-in request information indicating a sign-in request to the sharing assistant server 6 (S32).

The sign-in request information includes information on a time zone of a country or a region where the electronic whiteboard 2 is located, and authentication information. The authentication information includes authentication information of the user A, such as the user ID, organization ID, and password of the user A. The authentication information further includes the user ID and the organization ID of the electronic whiteboard 2, which is one example of the communication terminal that the user uses to conduct the event. The user ID and the organization ID of the electronic whiteboard 2 are previously stored in a memory of the electronic whiteboard 2. Accordingly, the transmitter and receiver 61 of the sharing assistant server 6 receives the sign-in request information.

Alternatively, the sign-in screen may not be displayed in response to a request for turning on. In such case, the authentication information includes the user ID and the organization ID of the electronic whiteboard 2. Further, if the organization ID is common to the electronic whiteboard 2 and the user A, the organization ID does not have to be transmitted twice.

Next, the authenticator 62 of the sharing assistant server 6 authenticates the user A using the authentication information received from the user A, such as the user ID, the organization ID, and the password of the user A (S33).

Specifically, the storing and reading processor 69 determines whether a set of the user ID, the organization ID, and the password, which is obtained from the sign-in request information at S32, has been registered in the user authentication management DB 6001 (FIG. 7A). When there is the set of the user ID, the organization ID, and the password in the user authentication management DB 6001, the authenticator 62 determines that the user A who has sent the sign-in request is an authorized (legitimate) user. When there is no such set of the user ID, the organization ID, and the password in the user authentication management DB 6001, the authenticator 62 determines that the user A is an unauthorized (illegitimate) user. When it is determined that the user A is illegitimate, the transmitter and receiver 61 sends to the electronic whiteboard 2, a notification indicating the illegitimate user. In the following, it is assumed that the user A is determined to be an authorized user.

Next, the storing and reading processor 69 of the sharing assistant server 6 searches the access management DB 6002 (FIG. 7B) using the organization ID received at S32 as a search key to obtain the access ID and access password that correspond to the received organization ID (S34).

The transmitter and receiver 61 of the sharing assistant server 6 transmits, to the schedule management server 8, reservation request information indicating a request for reservation information of a resource, and schedule request information indicating a request for schedule information of a user (S35). The reservation request information and the schedule request information each include the time zone information, and authentication information (in this case, the user ID of the electronic whiteboard 2 as the communication terminal, and the organization ID) received at S32, and the access ID and the password that are read out at S34. Accordingly, the transmitter and receiver 81 of the schedule management server 8 receives the reservation request information and the schedule request information. As the authentication information, the user ID of the login user may be additionally received, or may alternatively received.

Next, the authenticator 82 of the schedule management server 8 authenticates the sharing assistant server 6 using the access ID and the access password (S36). Specifically, the storing and reading processor 89 searches the server authentication management DB 8006 (FIG. 11A) using a set of the access ID and the password received at S35 as a search key, to determine whether the same set of the access ID and the password have been registered. When there is the set of the access ID and the password in the server authentication management DB 8006, the authenticator 82 determines that the sharing assistant server 6 that has sent the request is an authorized entity. When there is no such set of the access ID and the password in the server authentication management DB 8006, the authenticator 82 determines that the sharing assistant server 6 that has sent the request is an unauthorized (illegitimate) entity. When it is determined that the sharing assistant server 6 is illegitimate, the transmitter and receiver 81 sends to the sharing assistant server 6, a notification indicating the illegitimate entity. In the following, it is assumed that the sharing assistant server 6 is determined to be an authorized entity.

The storing and reading processor 89 searches information stored in the resource reservation management DB 8004 (FIG. 10A) that corresponds to the organization ID (that is, information managed by a scheduler of the organization to which the login user belongs), using the user ID of the electronic whiteboard 2 (communication terminal) received at S35 as a search key, to read reservation information having the user ID of the electronic whiteboard 2 in its record (S37). In this case, the storing and reading processor 89 reads the reservation information whose scheduled start date is today. Accordingly, the reservation information related to the electronic whiteboard 2 in the conference room X is obtained for today.

In alternative to using the user ID of the electronic whiteboard 2, the storage and reading processor 89 may search the resource reservation management DB 8004 to obtain reservation information having the user ID of the login user in its record.

Further, the storing and reading processor 89 of the schedule management server 8 searches the event management DB 8005 (FIG. 10B), using the user ID of the electronic whiteboard 2 (communication terminal) received at S35 as a search key, to read schedule information having the user ID of the electronic whiteboard. 2 in its record (S38). In this case, the storing and reading processor 89 reads the schedule information whose scheduled start date and time is today. Accordingly, the schedule information related to the electronic whiteboard 2 in the conference room X is obtained for today.

In alternative to using the user ID of the electronic whiteboard 2, the storage and reading processor 89 may search the event management DB 8005 to obtain reservation information having the user ID of the login user in its record.

When the schedule management server 8 is located in a country or region having a time zone that differs from a time zone applied to the communication terminal such as the electronic whiteboard 2 or the like, the electronic whiteboard 2 adjusts the time zone according to a local time zone applicable to a place where the communication terminal is provided, using the time zone information received at S35. However, if the time zone is the same, time zone information does not have to be used or transmitted.

Next, the storing and reading processor 89 searches the project member management DB 8007 (FIG. 11B) using the user ID of the electronic whiteboard 2 (communication terminal) received at S35, to obtain project IDs and project names of all projects, which are related to the electronic whiteboard 2 (S39). That is, the project IDs and project names are read, for all projects each having the user ID of the electronic whiteboard 2 on its record. Accordingly, the project information related to the electronic whiteboard 2 in the conference room X is obtained.

For example, at the time of project registration, the storing and reading processor 89 of the schedule management server 8 may automatically store, in the project member management table of FIG. 13B, the user ID of the communication terminal that a specific organization manages (in this example, the user ID of the electronic whiteboard 2).

Alternatively, the storing and reading processor 89 may obtain project IDs and project names of all projects using the user ID of the login user as a search key, based on assumption that the user ID of the login user is received from the sharing assistant server 6.

The transmitter and receiver 81 transmits, to the sharing assistant server 6, the reservation information obtained at S37, the schedule information obtained at S38, and project IDs and project names of all projects that are obtained at S39 (S40). Accordingly, the transmitter and receiver 61 of the sharing assistant server 6 receives the reservation information, schedule information, and project IDs and project names, all related to the electronic whiteboard 2 (communication terminal).

Next, the generator 63 of the sharing assistant server 6 generates a reservation list based on the reservation information and the schedule information received at S40 (S41). The transmitter and receiver 61 transmits reservation list information indicating the contents of the reservation list, and project IDs and project names of all projects related to the electronic whiteboard 2, to the electronic whiteboard 2 (S42). Accordingly, the transmitter and receiver 21 of the electronic whiteboard. 2 receives the reservation list information, and the project IDs and project names.

Next, the display control 24 of the electronic whiteboard 2 controls the display 220 to display a reservation list screen 230 as illustrated in FIG. 18 (S43). The reservation list screen 230 includes a display area 231 for displaying a resource name (in this case, a name of a conference room) and a display area 232 for displaying the current (today's) date. The reservation list screen 230 further includes event information 235, 236, 237, etc. each indicating an event in which the target resource (here, in this case, the conference room X) is used. Each item of event information includes a scheduled start time and a scheduled end time for using the target resource, an event name, and a name of a user who has reserved the target resource. Along with the event information 235, 236, and 237, corresponding start buttons 235s, 236s, and 237s are displayed, each of which is pressed by the user when an event is started.

Referring to FIG. 19, when the user A presses the start button 235s with the electronic pen 2500 or the like, the acceptance unit 22 accepts a selection of the event indicated by the event information 235 (S51).

Further, the display control 24 of the electronic whiteboard 2 controls the display 220 to display a project list screen 240 as illustrated in FIG. 20, based on the project IDs and project names that are received at S42 (S52). The project list screen 240 includes a plurality of project icons 241 to 246 each representing a particular project indicated by the project ID or project name that is received. The project list screen 240 further includes an "OK" button 248 to be pressed to confirm the selected project icon, and a "CANCEL" button 249 to be pressed to cancel selection of the project icon.

For example, referring to FIG. 20, when the user A presses the project icon 241 with the electronic pen 2500 or the like, the acceptance unit 22 accepts a selection of the project indicated by the project icon 241 (S53).

The screen of FIG. 18 and the screen of FIG. 20 may be displayed in various ways, for example, in a predetermined order one by one, or together on the same display screen.

Next, the obtainer 64 of the sharing assistant server 6 generates a conducted event ID, which can uniquely identify the conducted event (S55). Next, the storing and reading processor 69 of the sharing assistant server 6 stores, in the schedule management DB 6003 (FIG. 7C), as a record for the conducted event ID generated at S55 and the scheduled event ID received at S54, the user ID and organization ID of the reservation holder, and other data items related to the event in association (S56). The user ID and organization ID of the reservation holder, and the other data items related to the event, are obtained from the reservation information and/or the schedule information received at S40. At this point, there is no entry in the "participation" field in the schedule management table (FIG. 7C).

Next, the storing and reading processor 69 of the sharing assistant server 6 stores, in the conducted event management DB 6004 (FIG. 8A), the project ID received at S54, and the conducted event ID generated at S55, in association (S57).

The transmitter and receiver 61 transmits the conducted event ID generated at S55 to the electronic whiteboard 2 (S58). Accordingly, the transmitter and receiver 21 of the electronic whiteboard 2 receives the conducted event ID.

Next, at the electronic whiteboard 2, the storing and reading processor 29 stores the conducted event ID in the memory 2000 (S59).

The display control 24 of the electronic whiteboard 2 controls the display 220 to display an event information screen 250 for the selected event as illustrated in FIG. 21 (S60). The event information screen 250 includes a display area 251 for an event name, a display area 252 for a scheduled event time (scheduled start time and scheduled event time), and a display area 253 for a reservation holder name. The event information screen 250 further includes a display area 256 for memo, and a display area 257 for names of registered participants.

The display area 257 displays the name of the reservation holder, and the name of each participant, which are entered through the screen of FIG. 16. The display area 257 further displays a check box to be selected to indicate participation of each participant in the event (meeting) The event information screen 250 further includes a "CLOSE" button 259 to be pressed to close the screen 250, at its lower right. While the name of the electronic whiteboard 2 and corresponding checkbox is displayed in FIG. 21, the name or the checkbox does not have to be displayed on the screen.

After each participant is checked for presence (participation) using the checkbox, and the "CLOSE" button 259 is selected by the user, the acceptance unit 22 accepts a selection of each participant (S61). The transmitter and receiver 21 of the electronic whiteboard 2 transmits, to the sharing assistant server 6, the user ID of each participant and participation (presence) of each participant (S62). Accordingly, the transmitter and receiver 61 of the sharing assistant server 6 receives the user ID and participation of each participant.

At the sharing assistant server 6, the storing and reading processor 69 enters information on participation, in the "participation" field in the schedule management table (FIG. 7C) in the schedule management DB 6003 (S63).

As described above, the user A starts an event (a meeting on a strategy) using the resource (the conference room X) and the communication terminal (the electronic whiteboard 2 located in the conference room X). Specifically, as illustrated in FIG. 22, the user A uses the electronic whiteboard 2 to carry out a meeting in the conference room X. The display control 24 displays, at an upper right portion of the display 220, the remaining time during which the resource (the conference room X) can be used. In this embodiment, the display control 24 calculates a time period between the current time and the scheduled end time indicated by the event information of the event selected at S51, and displays the calculated time period as the remaining time.

The display control 24 further displays, on the display 220, an icon r1 to be pressed to register an action item, and an icon r2 to be pressed to view an event record.

<Registration of Event Record>

Figure 23:
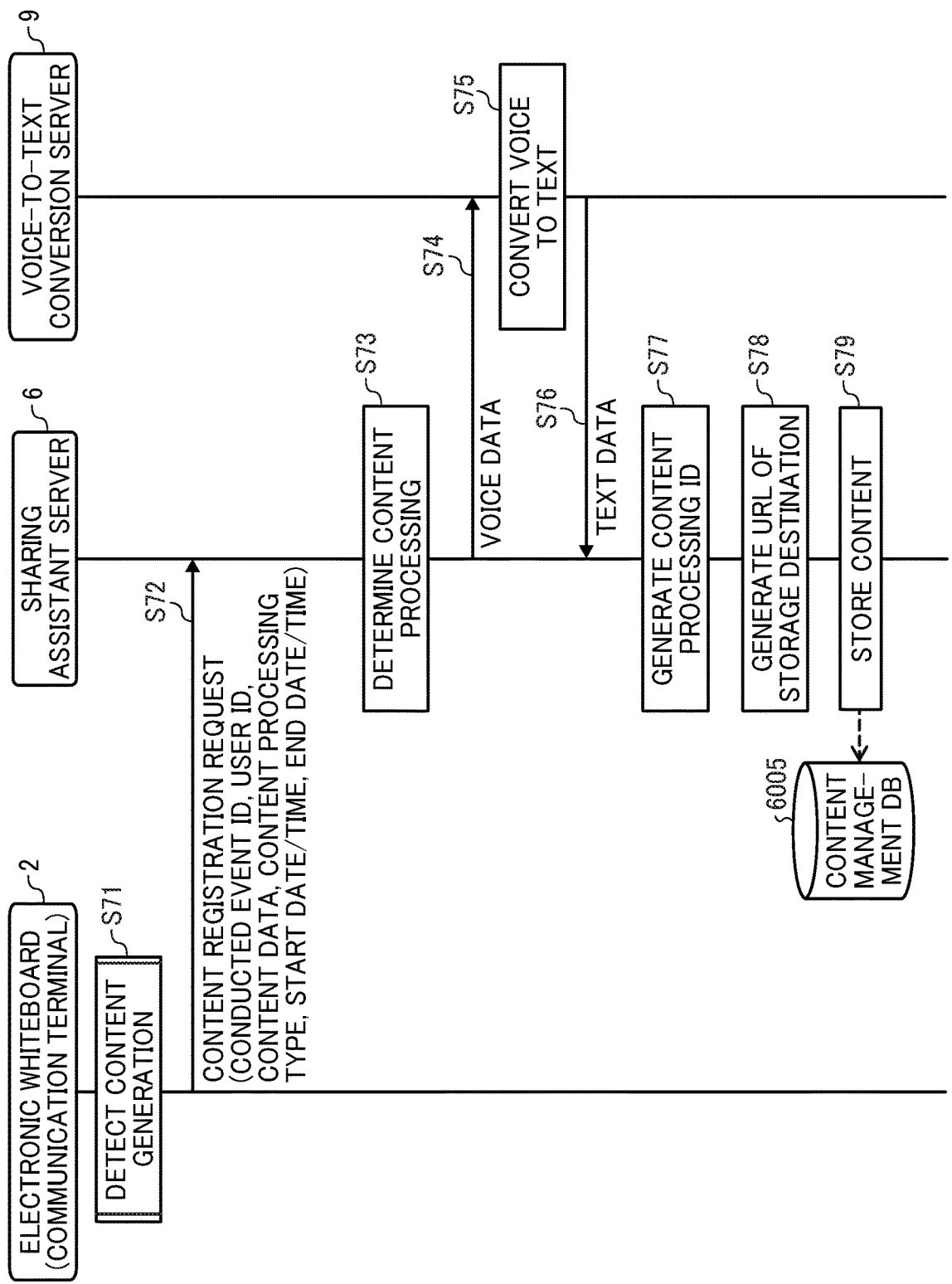
FIG. 23 is a sequence diagram illustrating operation of registering a record of the event that has been started, according to an embodiment.
Figure 24:
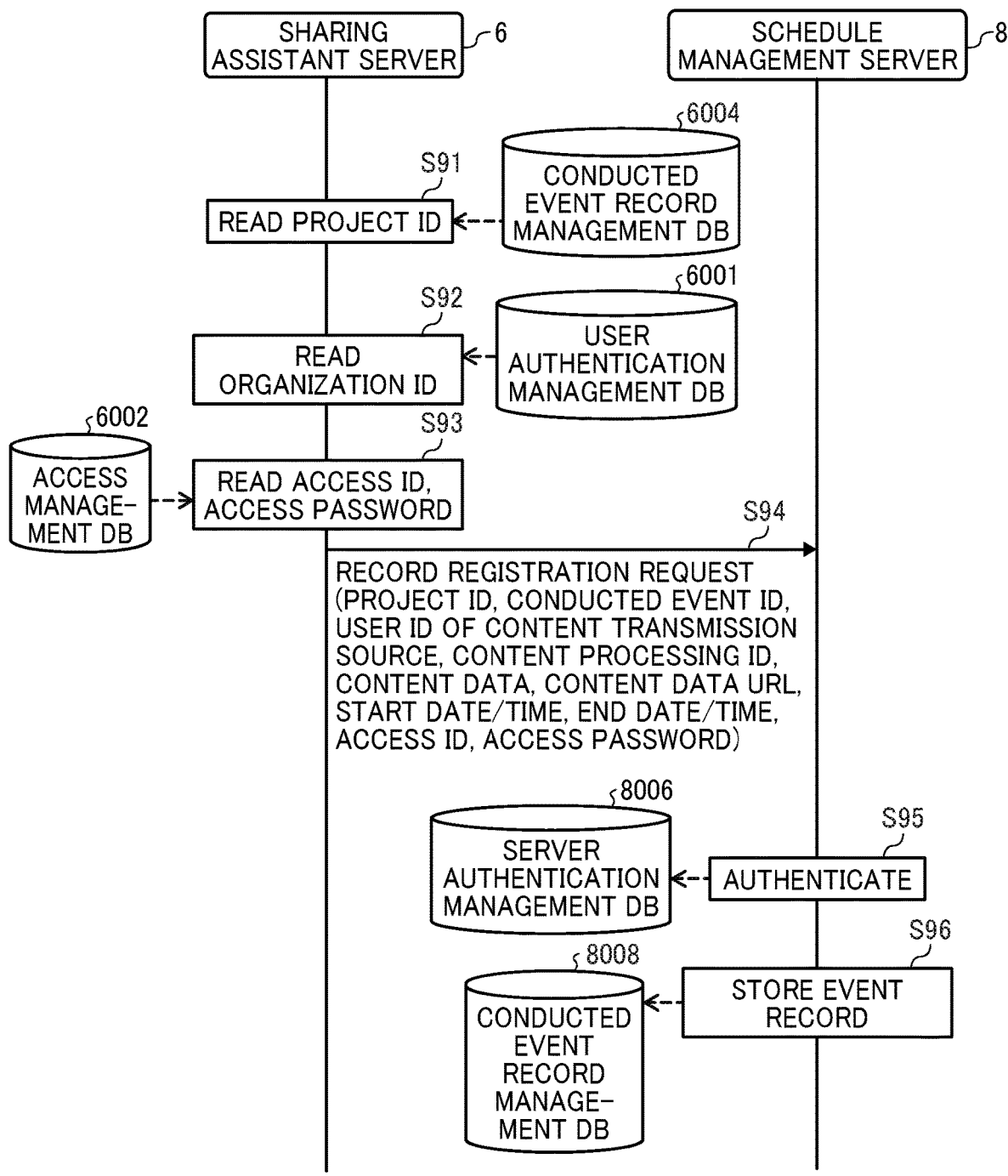
FIG. 24 is a sequence diagram illustrating operation of registering a record of the event that has been started, performed after operation of FIG. 23, according to an embodiment.

Referring now to FIGS. 23 to 28, processing to register an event record is described according to an embodiment. FIGS. 23 and 24 are a sequence diagram illustrating operation of registering a record of the event that has been started, according to an embodiment.

Referring to FIG. 23, the determiner 25 detects content generation. Specifically, the determiner 25 of the electronic whiteboard 2 determines a type of content processing being performed during the event that has been started (S71). For example, when the content is voice data generated through recording by the image and audio processor 23, the determiner 25 determines a type of content processing as "recording". In another example, when the content is image data obtained through screenshot (capturing) by the image and audio processor 23, the determiner 25 determines that a type of content processing is "screenshot". In another example, when the content is a data file (such as data of meeting materials), which is transmitted by the transmitter and receiver 21, the determiner 25 determines a type of content processing is "file transmission".

Next, the transmitter and receiver 21 transmits content registration request information indicating a request for registering the content being generated, to the sharing assistant server 6 (S72). In this example, the transmitter and receiver 21 automatically transmits the content registration request information, every time generation of the content is detected. Alternatively, the transmitter and receiver 21 may transmit the content registration request information, for more than one content that is detected. The content registration request information includes the conducted event ID, the user ID of a transmission source of the content (in this example, the user ID of the electronic whiteboard 2 as the communication terminal), content data, content processing type, and the start date/time and end date/time of content processing (recording, screenshot, file transmission). Accordingly, the transmitter and receiver 61 of the sharing assistant server 6 receives the content registration request information.

The determiner 65 of the sharing assistant server 6 determines a type of content processing, based on the content processing type in the content registration request information that is received at the transmitter and receiver 61 (S73). In one example, when the content processing type is determined to be "recording", the transmitter and receiver 61 of the sharing assistant server 6 transmits the voice data, which is received as content data, to the voice-to-text conversion server 9 (S74). Accordingly, the transmitter and receiver 91 of the conversion server 9 receives the voice data. When the content type processing is other than "recording", the operation proceeds to S77 without performing S74 to S76.

The converter 93 of the conversion server 9 converts the voice data received, to text data (S75). At S74, with the voice data, the converter 93 obtains information indicating date and time when the voice data is received, at the transmitter and receiver 91. For example, the date and the time when the voice data is received may be the date and time when the sharing assistant server 6 receives the voice data at S72, or the date and time when the sharing assistant server 6 sends the voice data at S74.

The transmitter and receiver 91 transmits the text data converted by the converter 93, to the sharing assistant server 6 (S76). With the text data, the transmitter and receiver 91 transmits the information indicating the date and time that the voice data is received, which is obtained at S74, to the sharing assistant server 6. The transmitter and receiver 91 further transmits information indicating the date and time when the text data is generated at the converter 93, to the sharing assistant server 6. The sharing assistant server 6 receives the text data at the transmitter and receiver 61, with information regarding the time.

The obtainer 64 generates a content processing ID for identifying the content processing, which is detected during the event (S77). The obtainer 64 further obtains a URL of content data being generated (S78). The storing and reading processor 69 stores, in the content management DB 6005 (FIG. 8B), the content processing type, the start date and time of content processing, the end date and time of content processing, the content processing ID obtained at S77, and the URL of the content data obtained at S78, for the conducted event ID that is received at S72 (S79). In this embodiment, the start date and time and the end date and time of the content processing may be determined based on information regarding the time, which is received with the text data at S76.

The operation now proceeds to S91 of FIG. 24. The storing and reading processor 69 of the sharing assistant server 6 searches the conducted event management DB 6004 (FIG. 8A) using the conducted event ID received at S72 as a search key, to obtain the corresponding project ID (S91). The storing and reading processor 69 searches the user authentication management DB 6001 (FIG. 7A) using the user ID of the content transmission source as a search key, to obtain the corresponding organization ID (S92).

The storing and reading processor 69 searches the access management DB 6002 (FIG. 7B) using the organization ID read at S92 as a search key to obtain the access ID and access password that correspond to the organization ID obtained at S92 (S93).

Next, the transmitter and receiver 61 transmits record registration request information indicating a request for registering an event record, to the schedule management server 8 (S94). The record registration request includes the project ID read at S91, the conducted event ID, the user ID of the content transmission source, the content data, the start date and time of content processing, and the end date and time of content processing (received at S72), the content processing ID obtained at S77, the URL of data file obtained at S78, and the access ID and password read at S93. The transmitter and receiver 81 of the schedule management server 8 receives the record registration request.

Next, the authenticator 82 of the schedule management server 8 authenticates the sharing assistant server 6 using the access ID and the access password (S95). Since processing of S95 is substantially the same as described above referring to S36, description thereof is omitted. The following describes the case where the authentication result indicates that authentication is successful.

The storing and reading processor 89 stores various types of data or information, received at S94, in the event record management DB 8008 (FIG. 12A) (S96). Specifically, the storing and reading processor 89 stores, in the event record management DB 8008 (FIG. 12A), various data (or information) including information on the data file, in association with a set of the project ID and the conducted event ID received at S94. Accordingly, the schedule management server 8 is able to manage information regarding the content, in a substantially similar manner as the sharing assistant server 6 manages the content, using the project ID and the conducted event ID.

As described above, the electronic whiteboard 2 transmits the conducted event ID of an event related to a particular project, and any content that is generated during the event, to the schedule management server 8. The schedule management server 8 stores, for each conducted event ID, information on the content in the event record management DB 8008. That is, with information indicating the particular event, content data generated during the event can be stored for each event. Further, each conducted event ID is associated with a particular project ID identifying a particular project. Accordingly, content data generated during the event can be classified by each project.

(Registration of Action Item)

Figure 25:
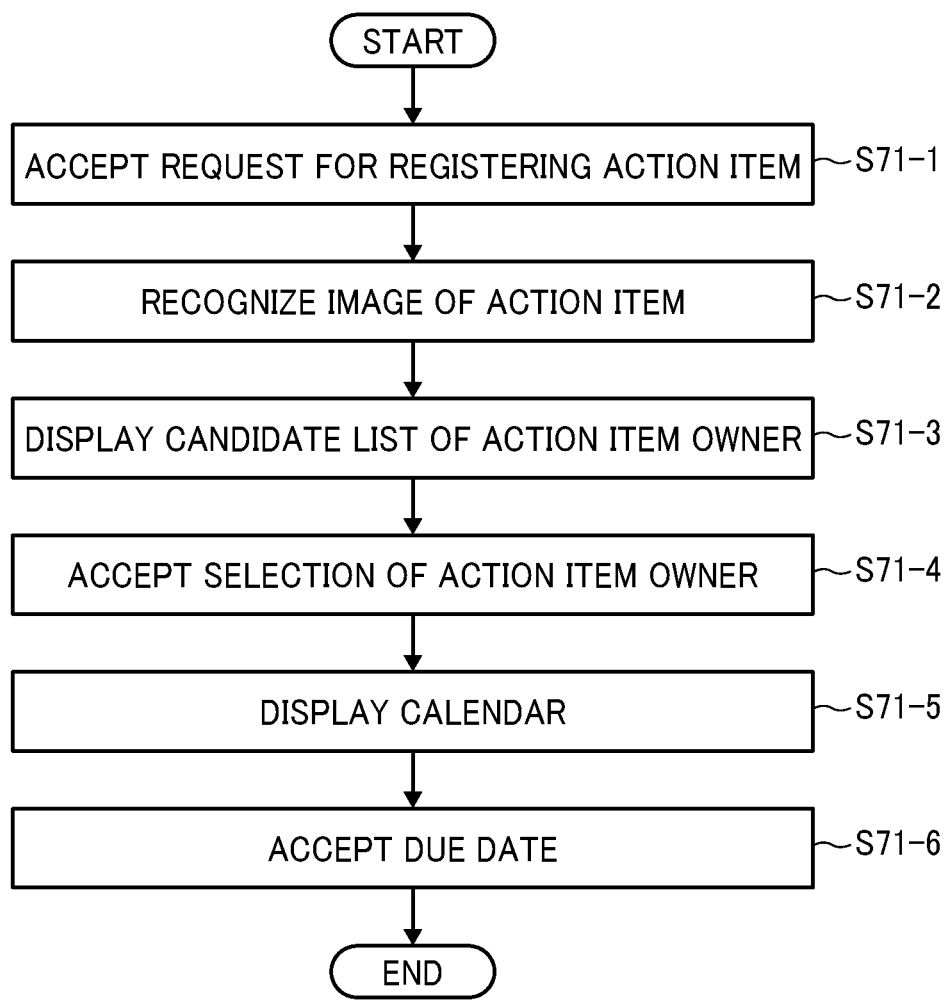
FIG. 25 is a flowchart illustrating operation of registering an action item, according to an embodiment.
Figure 26:
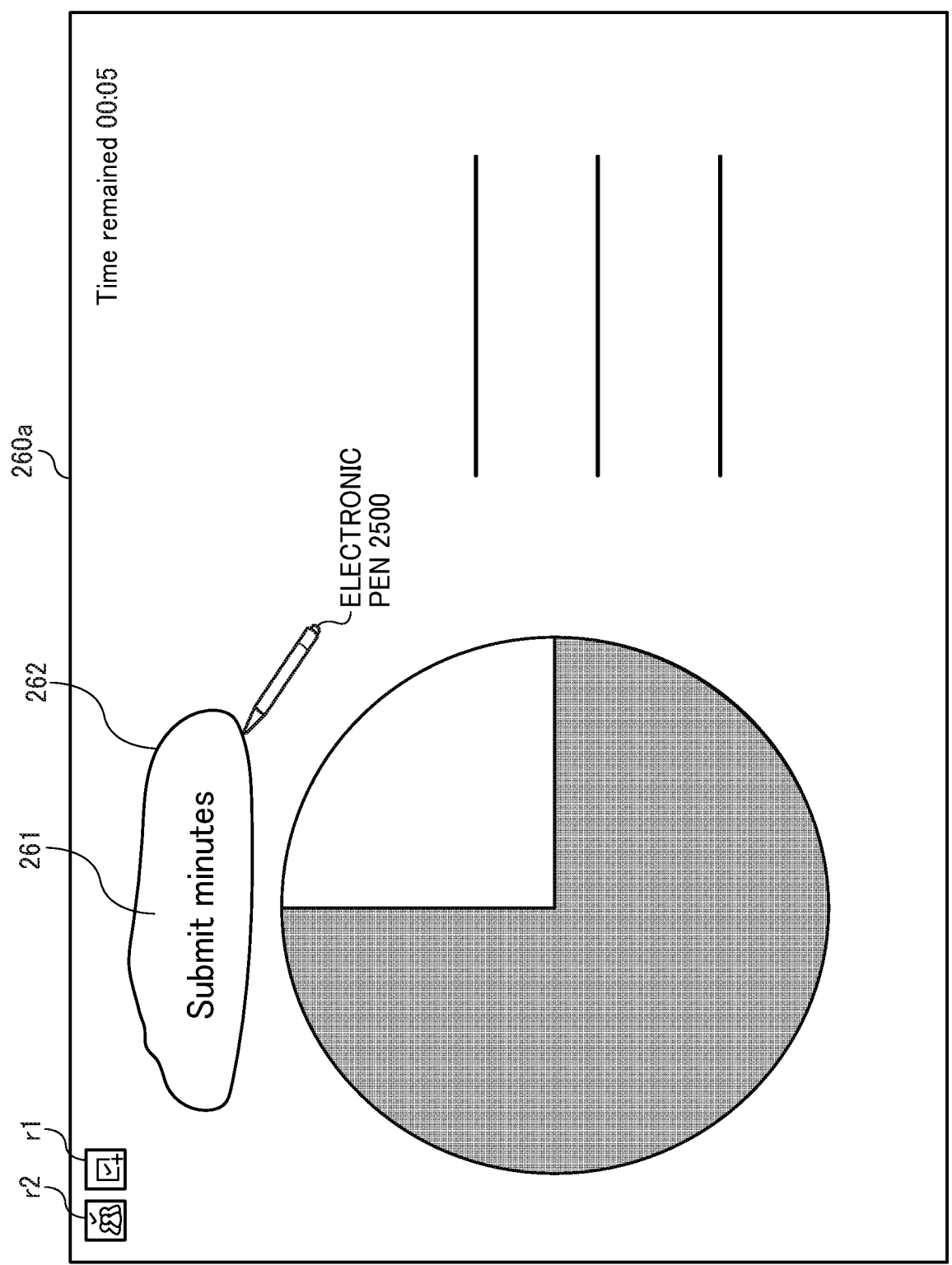
FIG. 26 is an illustration of an example screen in which an action item is designated.
Figure 27:
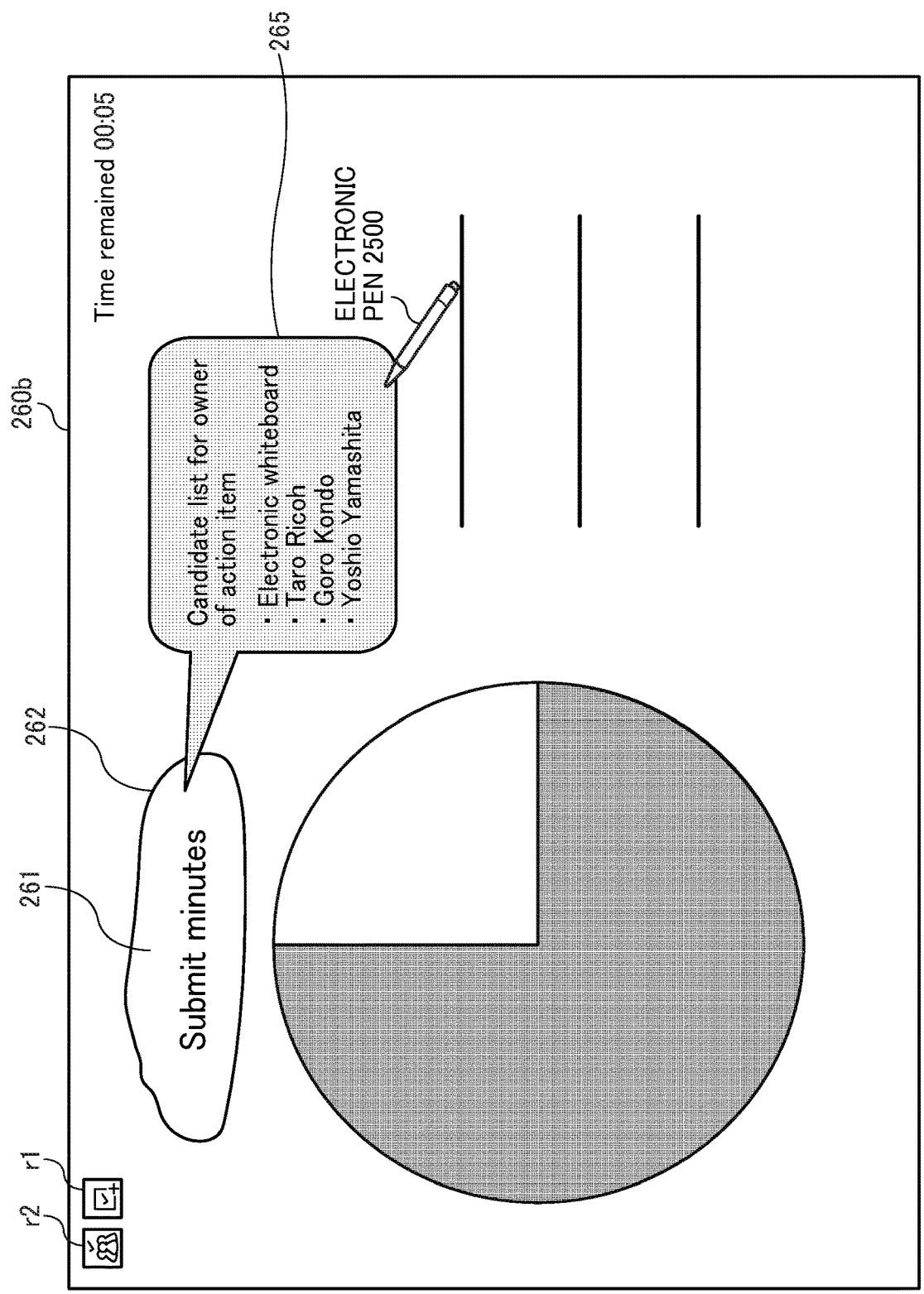
FIG. 27 is an illustration of an example screen with a list of candidates of owner of the action item.
Figure 28:
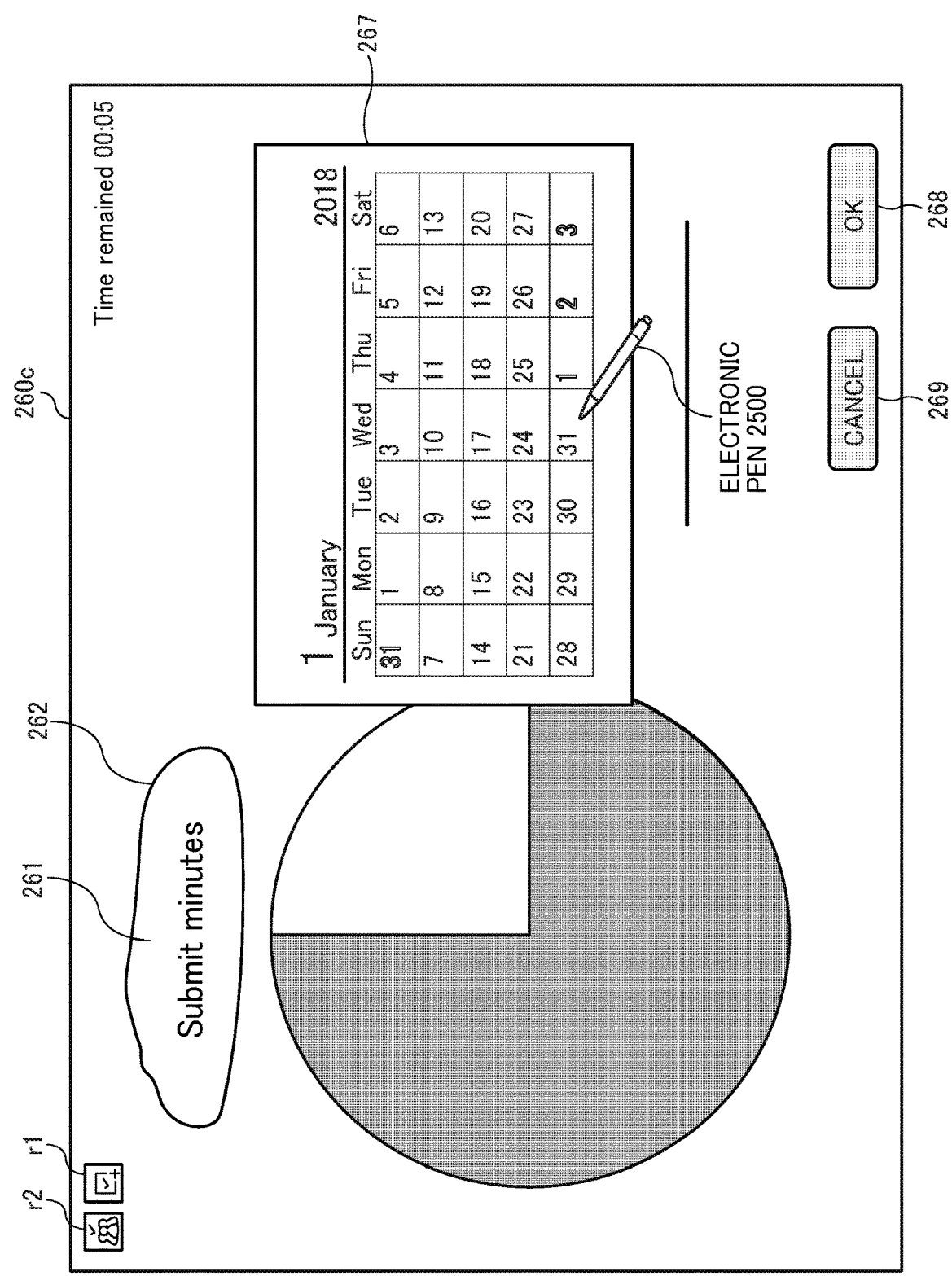
FIG. 28 is an illustration of an example screen with a calendar for selecting the due date of the action item.

Referring now to FIGS. 25 to 28, operation of processing an action item, as an example of content, is described according to an embodiment. FIG. 25 is a flowchart illustrating operation of registering an action item, according to an embodiment. FIG. 26 is an illustration of an example screen in which an action item is designated. FIG. 27 is an illustration of an example screen with a list of candidates of owner of the action item. FIG. 28 is an illustration of an example screen with a calendar for selecting the due date of the action item.

Referring to FIG. 25, as the user presses the icon r1 illustrated in FIG. 22, the acceptance unit 22 receives a request for registering an action item (S71-1). As illustrated in FIG. 26, it is assumed that the user writes an action item ("Submit minutes") on a drawing screen 260a of the electronic whiteboard 2 using the electronic pen 2500, and circles the drawing image 261. In such case, the electronic whiteboard 2 recognizes the circled area as a designated area 262, which includes a drawing image 261. The acceptance unit 22 accepts input of the designated area 262 including the drawing image 261. The identifying unit 26 identifies the drawing image 261, included in the designated area 262, as an image of the action item (S71-2). FIG. 26 describes the example case in which the identifying unit 26 identifies the drawing image 261, which is circled by the line of the designated area 262. Alternatively, the identifying unit 26 may identify the drawing image 261, which is determined by a line that is apart from the designated area 262 at a predetermined distance. As described above, the designated area 262 may be determined based on the user's drawing of a certain figure, such as a circle or a polygon, with the electronic pen 2500.

Next, as illustrated in FIG. 27, the display control 24 displays a candidate list 265, which lists candidates of an owner of the action item, on the drawing screen 260b (S71-3). As the user selects a particular name from the candidate list 265 with the electronic pen 2500, the acceptance unit 22 receives a selection of the owner of the action item (S71-4). The user names to be displayed in the candidate list 265 may be obtained from the names of participants, or from the project members.

Next, as illustrated in FIG. 28, the display control 24 displays, on the drawing image 260c, a calendar 267 for receiving a selection of a particular date (S71-5). As the user selects a particular date from the calendar 267 with the electronic pen 2500, the acceptance unit 22 accepts a selection of the due date for the action item (S71-6). The calendar 267 is an example of a due date input screen. The due date input screen may be a list of dates, without indication of a day.

After the above-described operation, the electronic whiteboard 2 sends a content registration request, which requests to register the action item, to the sharing assistant server 6. The content registration request information includes a conducted event ID for identifying the event in which the action item is generated, a user ID of the owner of the action item that is selected at S71-4, image data of the action item (in this case, "Submit minutes") identified at S71-2, and the due date of the action item input at S71-6.

As an example of content, the transmitter and receiver 21 transmits image data, which is a part of the image being displayed for the currently-held event, as image data representing the action item generated in that event. Accordingly, the transmitter and receiver 61 of the sharing assistant server 6 receives the content registration request information.

The processing after the sharing assistant server 6 receives the content registration request information is substantially the same as the processing described above referring to FIG. 23 and FIG. 24 such that description thereof is omitted.

<Processing to End Event>

Figure 29:
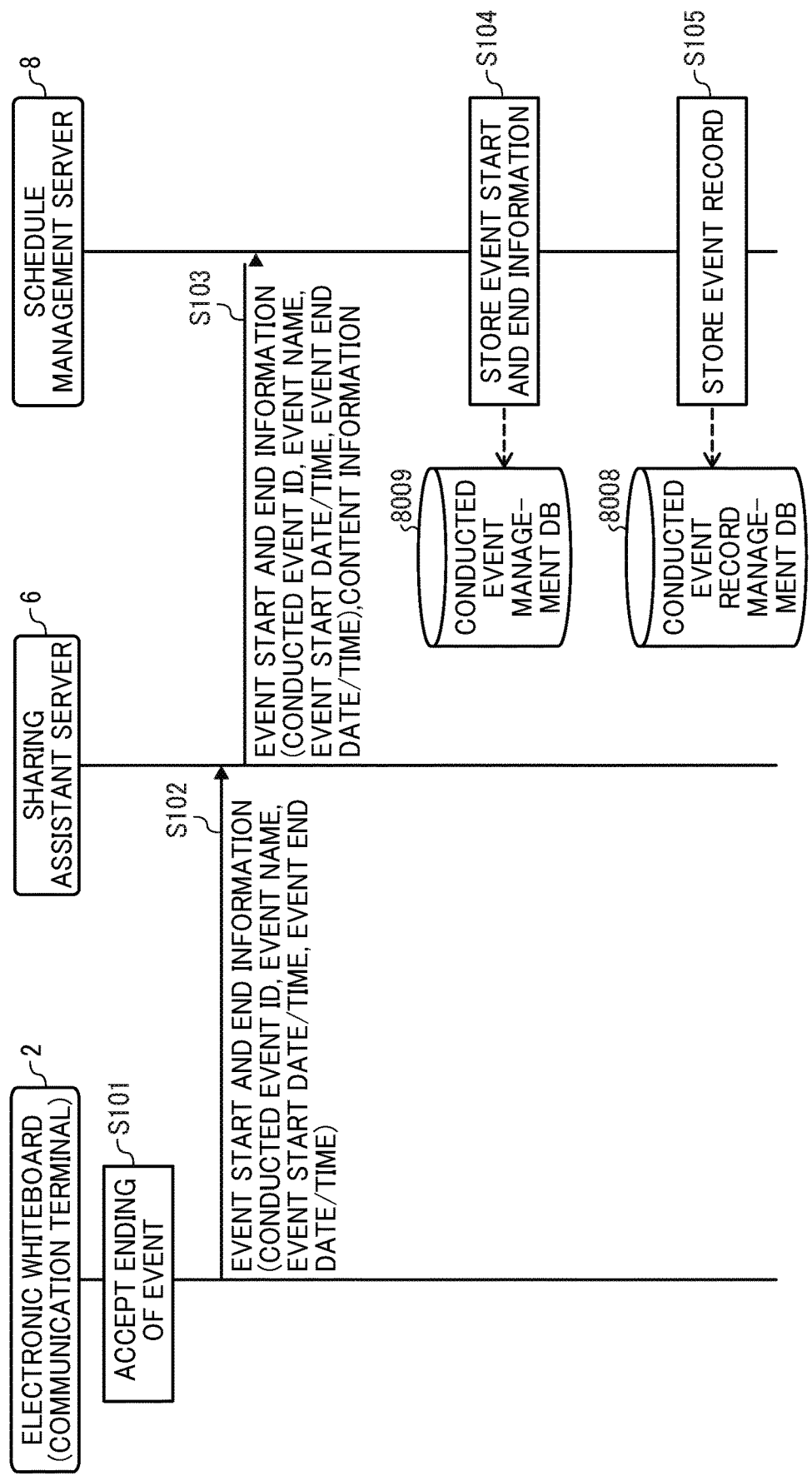
FIG. 29 is a sequence diagram illustrating operation of controlling processing to end an event, according to the embodiment.

Next, referring to FIG. 29, operation of controlling processing to end an event being conducted, is described according to an embodiment. FIG. 29 is a sequence diagram illustrating operation of controlling processing to end an event, according to the embodiment.

Referring to FIG. 29, in response to a user instruction to close the screen being displayed on the display 220 (See FIG. 22), the acceptance unit 22 accepts an instruction to end the event being conducted (S101).

The transmitter and receiver 21 transmits, to the sharing assistant server 6, event start and end information (S102). The event start and end information includes the conducted event ID, the event name, the event start date and time, and the event end date and time. The transmitter and receiver 61 of the sharing assistant server 6 receives the event start and end information.

The transmitter and receiver 61 transmits, to the schedule management server 8, the event start and end information received at S102 (S103). In addition to the event start and end information, the transmitter and receiver 61 sends various information on the content that has been generated during the event, such as content processing ID, start date and time and end date and time of content processing, etc., which have been registered in the content management DB 6005 (FIG. 8B) through operation of FIGS. 23 and 24.

Next, the storing and reading processor 89 of the schedule management server S stores, in the conducted event management DB 8009 (FIG. 1213), the event start and end information received at S103 (S104). Specifically, the storing and reading processor 89 adds one record of event start and end information, to the conducted event management table in the conducted event management DB 8009.

The storing and reading processor 89 further stores various types of data or information on the content generated during the event, received at S103, in the event record management DB 8008 (FIG. 12A) (S105). Specifically, the storing and reading processor 89 stores, in the event record management DB 8008 (FIG. 12A), various data (or information) regarding the content that is generated during the event, in association with the project ID and the conducted event ID received at S103.

Accordingly, the schedule management server 8 is able to manage information regarding the data file, in a substantially similar manner as the sharing assistant server 6 manages the data file, using the project ID and the conducted event ID.

When registration is completed, the transmitter and receiver Si may send a notification indicating completion of registration, to the electronic whiteboard 2 via the sharing assistant server 6.

<Viewing of Event Record>

Figure 30:
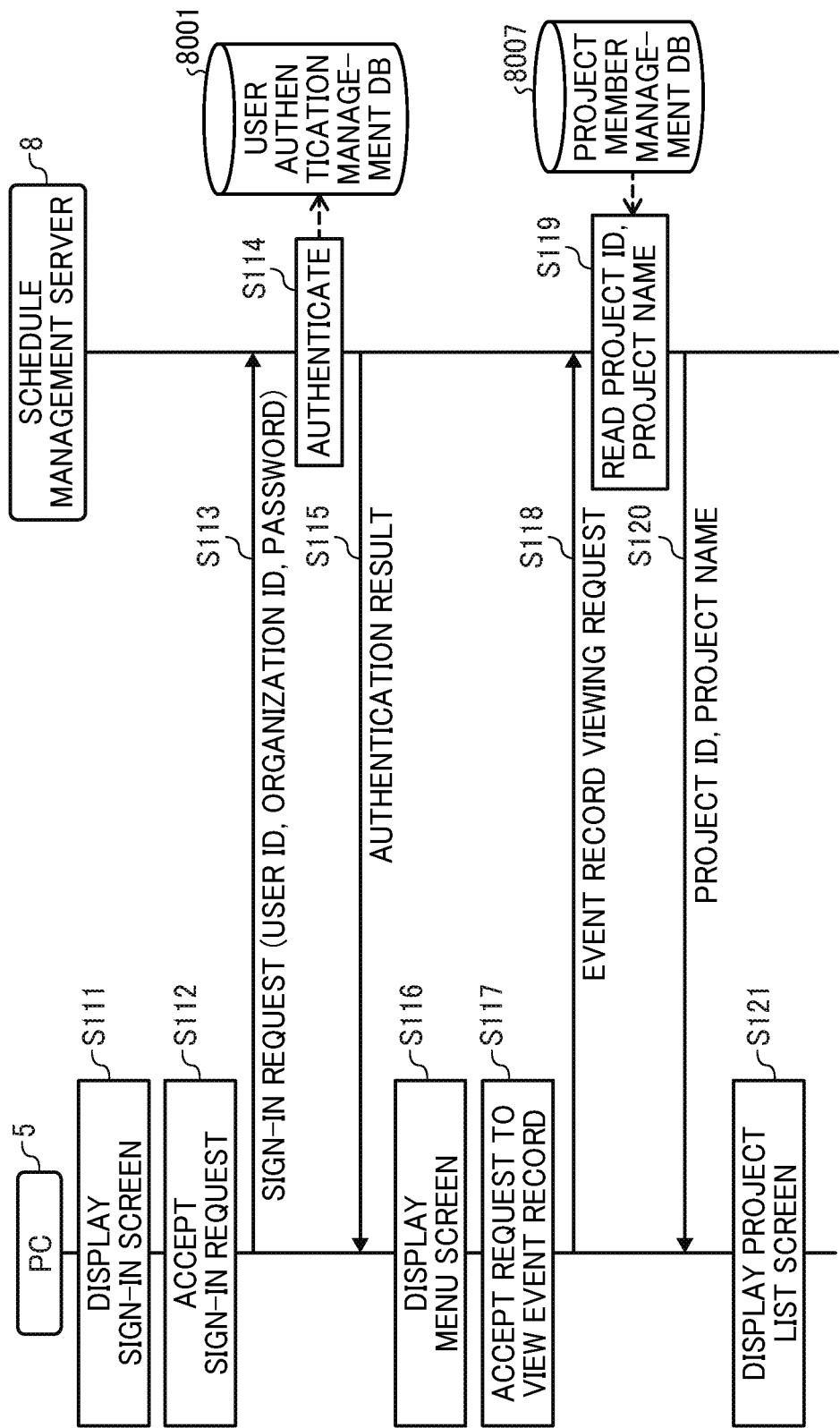
FIG. 30 is a sequence diagram illustrating operation of controlling processing to end an event, performed after operation of FIG. 29, according to an embodiment.
Figure 31:
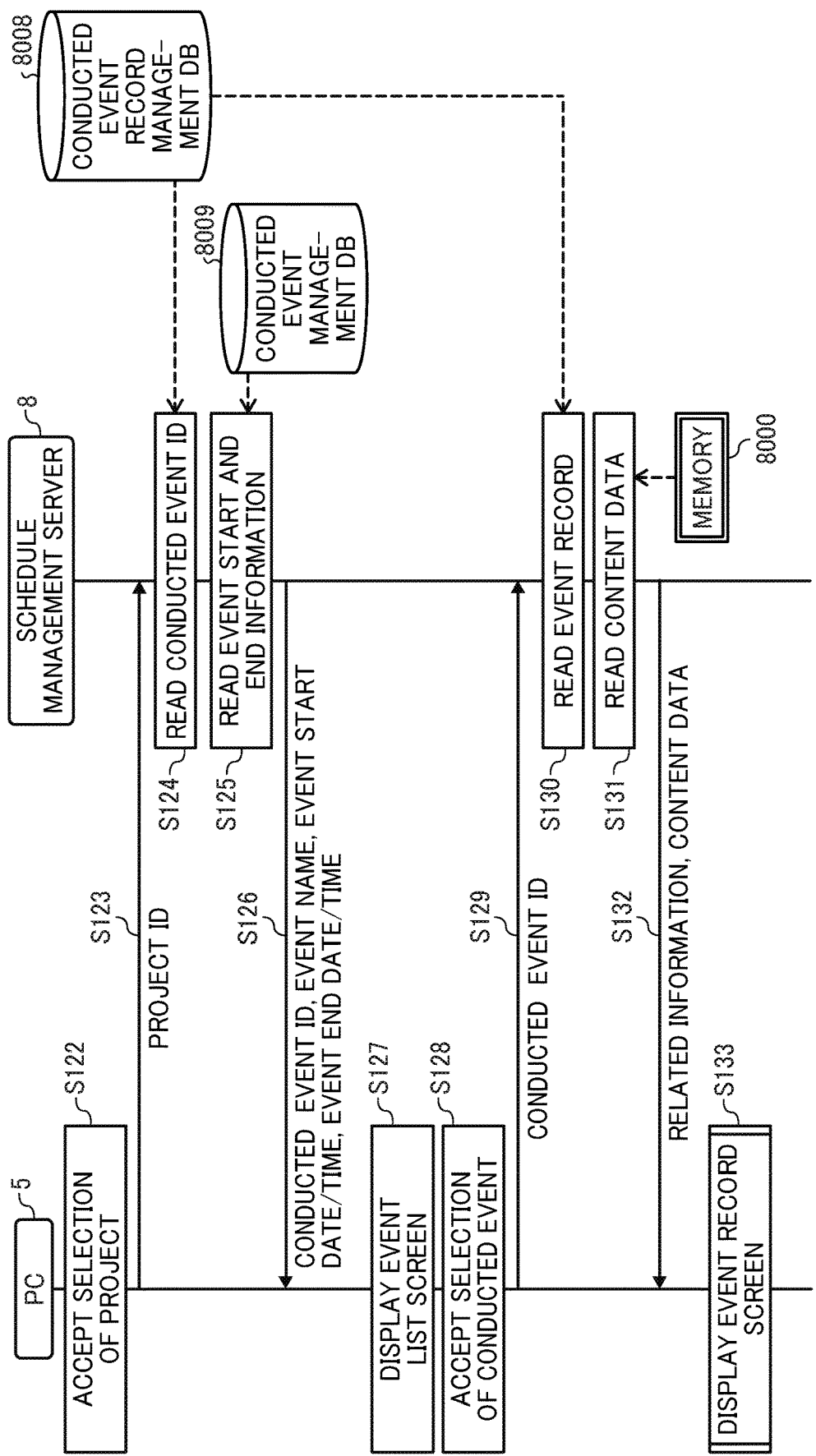
FIG. 31 is a sequence diagram illustrating operation of controlling processing to output a record of the event, according to an embodiment.
Figure 32:
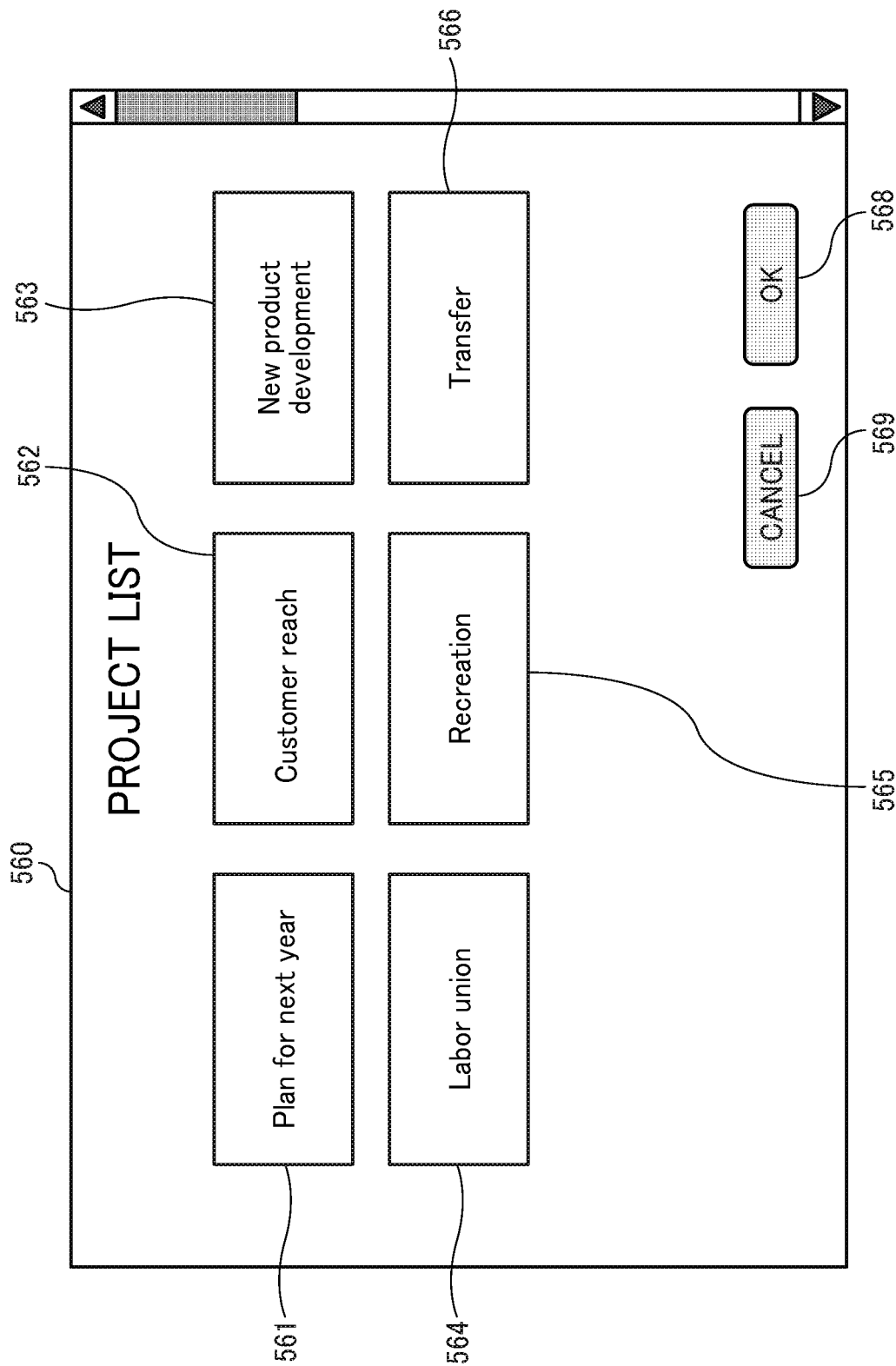
FIG. 32 is an illustration of an example project list screen.
Figure 33:
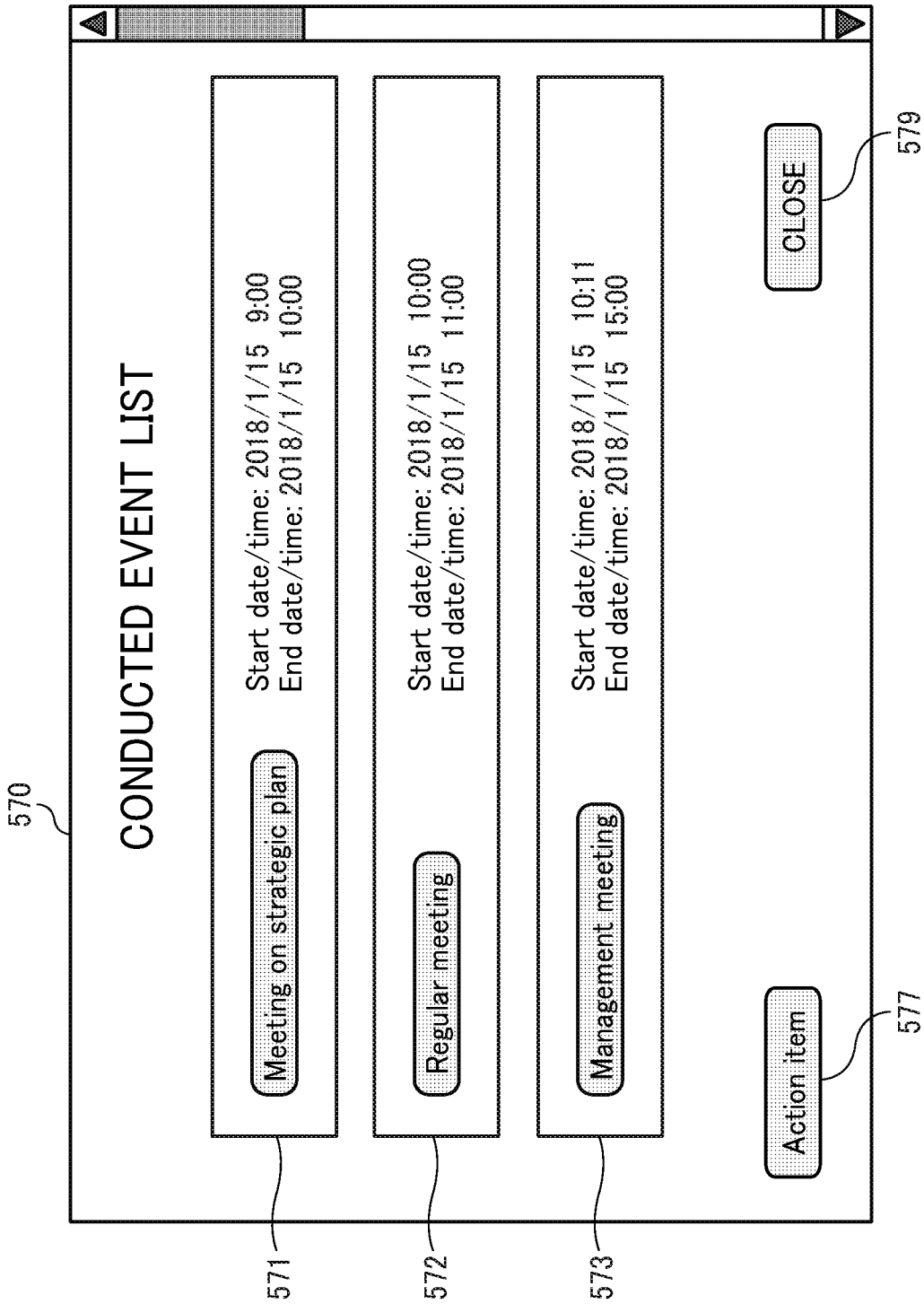
FIG. 33 is an illustration of a conducted event list screen.
Figure 34:
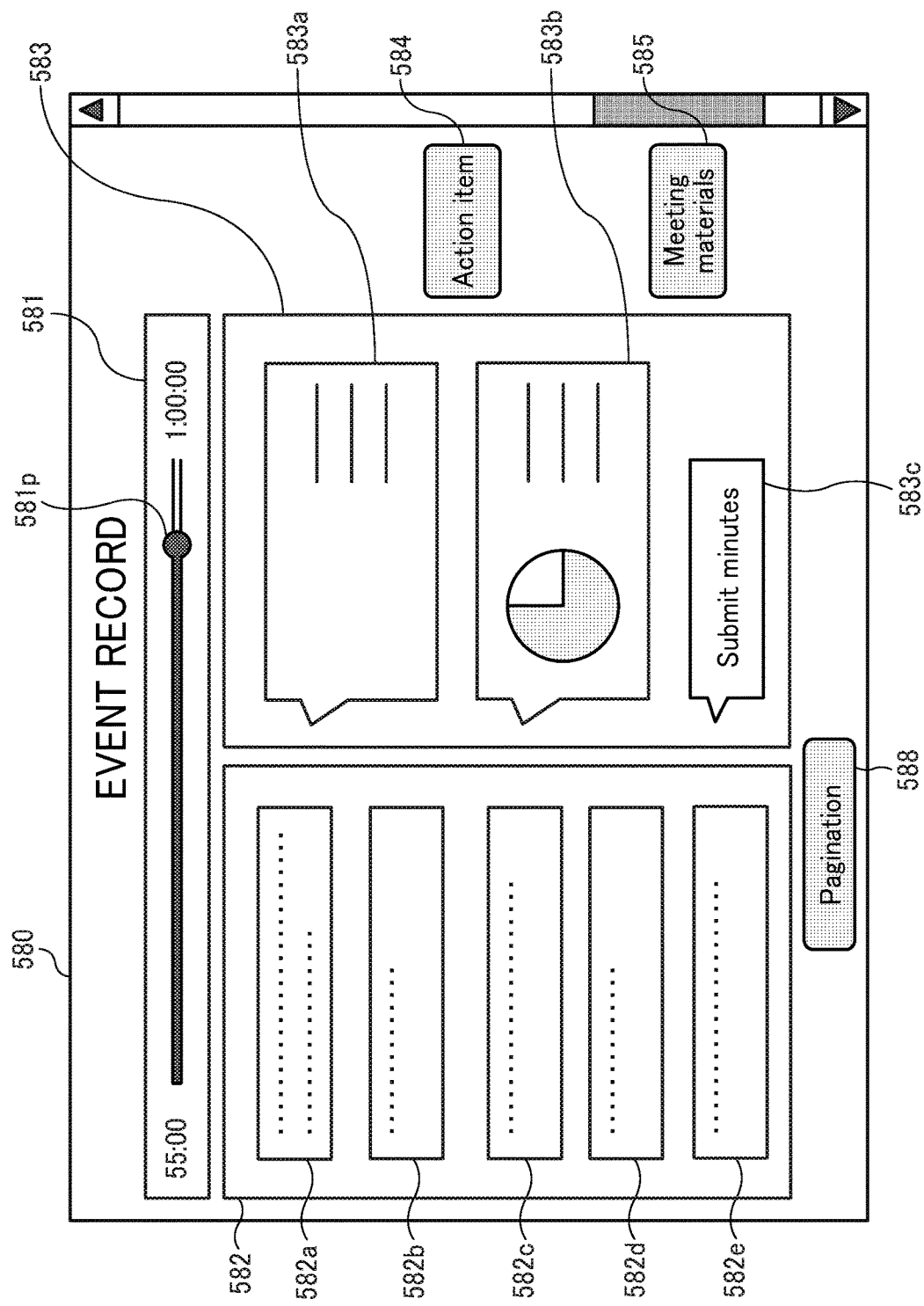
FIG. 34 is an illustration of an example event record screen.
Figure 35:
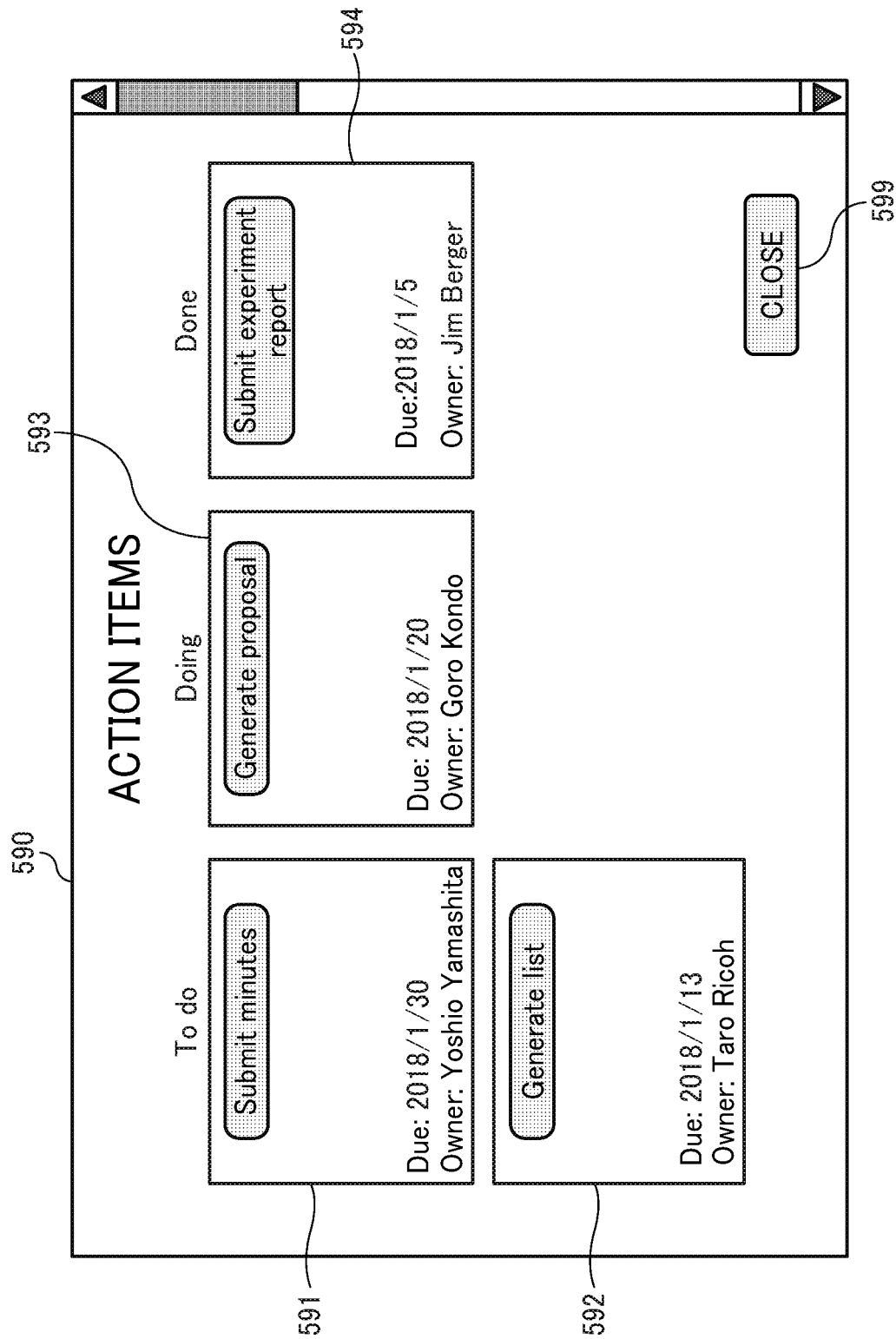
FIG. 35 is an illustration of an action item screen.

Referring to FIGS. 30 to 35, operation of processing viewing of an event record is described according to an embodiment. FIGS. 30 and 31 are a sequence diagram illustrating operation of outputting a record of the event, according to an embodiment. FIG. 32 is an illustration of an example project list screen, displayed by the PC 5. FIG. 33 is an illustration of a conducted event list screen, displayed by the PC 5. FIG. 34 is an illustration of an example event record screen, displayed by the PC 5. FIG. 35 is an illustration of an action item screen, displayed by the PC 5.

Referring now to FIGS. 30 and 31, example operation of outputting a record of the event to be viewed by a user is described, S111 to S116 of FIG. 31 are performed in a substantially similar manner as described above referring to S11 to S16 of FIG. 13, and description thereof is omitted.

In response to pressing of the "View event record" button 543 in the menu screen 540 of FIG. 15, the acceptance unit 52 of the PC 5 accepts a request for viewing the event record (S117).

The transmitter and receiver 51 of the PC 5 transmits an event record viewing request, which indicates a request for viewing the event record, to the schedule management server 8 (S118). Accordingly, the transmitter and receiver 81 of the schedule management server 8 receives the event record viewing request.

Next, the storing and reading processor 89 of the schedule management server 8 searches the project member management DB 8007 (FIG. 11B) using the user ID and the organization ID received at S113 as a search key, to obtain the project ID and the project name of all projects, which correspond to the user ID and the organization ID (S119). The transmitter and receiver 81 transmits the project ID and the project name of each project to the PC 5 (S120).

The display control 54 of the PC 5 controls the display 508 to display a project list screen 560 as illustrated in FIG. 32, based on screen data generated by the generator 56 (S121). The project list screen 560 includes contents that are substantially the same as contents included in the project list screen 240 illustrated in FIG. 20. The project icons 561 to 566 and buttons 568 and 569 in FIG. 32 correspond to the project icons 241 to 246 and buttons 248 and 249 in FIG. 20, respectively.

For example, referring to FIG. 32, when the user A presses the project icon 561 with the mouse 512 or the like, the acceptance unit 52 accepts a selection of the project indicated by the project icon 561 (S122).

The transmitter and receiver 51 of the PC 5 transmits the project ID of the project selected at S122 to the schedule management server 8 (S123). Accordingly, the transmitter and receiver 81 of the schedule management server 8 receives the project ID.

The storing and reading processor 89 of the schedule management server 8 searches the event record management DB 8008 (FIG. 12A) using the project ID received at S123 as a search key, to obtain the corresponding conducted event ID (S124). The storing and reading processor 89 reads all conducted event IDs associated with the project ID received at S123.

The storing and reading processor 89 further searches the conducted event management DB 8009 (FIG. 12B), using each conducted event ID read at S124 as a search key, to read the event start and end information corresponding to the conducted event ID (S125). The event start and end information includes the conducted event ID, the event name, the event start date and time, and the event end date and time.

The transmitter and receiver 81 transmits the conducted event ID, event name, event start date and time, and event end date and time, read at S125 for each conducted event of the selected project, to the PC 5 (S126). The transmitter and receiver 51 of the PC 5 receives the conducted event ID, event name, start date and time, and end date and time.

The display control 54 of the PC 5 controls the display 508 to display a conducted event list screen 570 based on screen data generated by the generator 56 using various data received at S126 (S127). As illustrated in FIG. 33, the conducted event list screen 570 includes event information 571, 572, and 573, etc., each indicating an event that was held. For example, the event information 571 to 573 each include a name of the conducted event, and start date and time and end date and time of the conducted event.

The event information 571 to 573 is an example of record information selection area for receiving a selection of a conducted event subjected to viewing the event record. The conducted event list screen 570 further includes a "CLOSE" button 575 to be pressed to close the conducted event list screen 570, at its lower right. The conducted event list screen 570 further includes a "Action Item" button 577 to be pressed to view the action item, at its lower left. The "Action Item" button 577 is an example of an action item selection area for receiving an instruction to display an action item.

The acceptance unit 52 of the PC 5 accepts selection of a conducted event in the conducted event list screen 570 (S128). Specifically, when the user selects the event information for a particular conducted event, from the conducted event list screen 570, the acceptance unit 52 receives a selection of the particular conducted event. The transmitter and receiver 51 of the PC 5 transmits the conducted event ID of the conducted event selected at S131 to the schedule management server 8 (S129). Accordingly, the transmitter and receiver 81 of the schedule management server 8 receives the conducted event ID.

The storing and reading processor 89 of the schedule management server 8 searches the event record management DB 8008 (FIG. 12A) using the conducted event ID received at S129 as a search key, to obtain event record information associated with the conducted event ID (S130). The event record information includes the content processing ID, type of content processing, start date and time of content processing, and end date and time of content processing.

The storing and reading processor 89 reads out content data, from a storage destination of the content data, using information indicating the storage destination of the content data, which can be obtained from the event record information read at S130 (S131). The transmitter and receiver 81 transmits, to the PC 5, the content processing ID, type of content processing, start date and time of content processing, end date and time of content processing (collectively referred to as "content related information"), and content data (S132). The transmitter and receiver 51 of the PC 5 receives various data (or information). The start date and time of content processing may be referred to as first time information, which indicates the time when generation of content starts. The end date and time of content processing may be referred to as second time information, which indicates the time when generation of content ends. Either the first time information or the second time information, which may be each or collectively referred to as content generation time, may be later used to determine an arrangement of the content data when displayed. Further, using these first and second time information, a total playback time of content may be obtained.

For example, referring to FIG. 12A, the content generation time for the screenshot data may be the time when screenshot data is captured and stored in the memory. The content generation time for the text data of voice may be the time when conversion from voice data to text data completes. The content generation time for the action item data may be the time when image data of action item is captured and stored in the memory.

The display control 54 of the PC 5 controls the display 508 to display the event record screen 580 as illustrated in FIG. 34, which is generated by the generator 56 (S133).

The generator 56 of the PC 5 generates an event record screen 580 as illustrated in FIG. 34, using the content related information (related information) and the content data received at the transmitter and receiver 51 at S132. More specifically, the generator 56 generates the event record screen 580 such that text data (voice text data) are displayed in a text data display area 582 in an order determined by content generation time. Further, the generator 56 generates the event record screen 580 such that images of image data (screenshot) are displayed in a screenshot data display area 583 in an order of content generation time. Further, the generator 56 generates the event record screen 580 such that a playback point 581p is displayed in a playback display area 581, specifically, at a location determined by a playback start time that is set as described below. The audio control 58 of the PC 5 starts to playback the voice data from the playback start time that is previously set, which is represented by the playback point 581p.

Specifically, the audio control 58 of the schedule management server 8 sets the playback start time of voice data. The voice data is an example of content data received at S132. For example, the audio control 58 sets a playback start time of voice data, which is associated with the time when the voice data is generated, as the playback start time of voice data.

As illustrated in FIG. 34, in the event record screen 580, content data, each generated during the event, are displayed, side by side, while being classified by type of content processing.

Specifically, the event record screen 580 includes the playback display area 581 for displaying a playback start time of voice data, the text data display area 582 for displaying text data converted from voice data, and the screenshot data display area 583 for displaying image data of screenshot. The event record screen 580 further includes an "action item" button 584 to be pressed to check the action item, a "meeting materials" button 585 to be pressed to check the meeting materials, and "pagination" button 588 to be pressed to display a pagination display area 589 illustrated in FIG. 37.

The playback display area 581 includes the playback point 581p, which indicates a point where playback of voice data starts, which could be any point selected from a total playback time. The playback display area 581 further includes a slider 581b representing a total playback time. With the position of the playback point 581p on the slider 581b, the user can instantly know which part of voice data has been reproduced. The playback display area 581 may further include a playback time indicator, which indicates a current playback time point (in FIG. 34, "55:00") and a total playback time (in FIG. 34, "1:00:00").

In this example, the playback point 581p and the slider 581b may be collectively referred to as a seek bar. The seek bar is an area for receiving designation on a playback start time of recorded data, while displaying the playback start point of the recorded data. The user is able to instantly know which part of the recorded data is being reproduced, from the beginning to the end, based on the position of the playback point 581p with respect to the slider 581b. The user can move the playback point 581p using any desired input device such as the mouse 512, to instruct to playback the recorded data from any desired playback point.

Still referring to FIG. 34, in the text data display area 582, text data 582a, 582b, 582c, 582d, and 582e are displayed in an order determined by the content generation time. Similarly, in the screenshot data display area 583, screenshot (captured) images 583a, 583b, and 583c are displayed in an order determined by the content generation time.

As the user moves the playback point 581p with the mouse, for example, the acceptance unit 52 detects such movement. The display control 54 changes text data displayed in the text data display area 582 and screenshot image data displayed in the screenshot data display area 583, to text data and screenshot image data each corresponding to a point of time that is indicated by the moved position of the playback point 581p. For example, if the user is looking for some information on a particular topic, the user can easily find out a time period during when such topic has been discussed, using the image data of screenshot or the text data of voice, rather than using the time indicator. For example, assuming that the user wants to have some information that was discussed using a circle graph. In such case, with the image 583b showing the circle graph, the user is able to find out more easily a time during when the circle graph has been discussed, rather than using time information of the playback display area 581 alone. Once the image 583b of the circle graph is found, the user can easily find the text images 582c and 582d, which are displayed side by side with this screenshot image 583b, to check details of discussion. In this example, the images 583a and 583b are each a screenshot image of the entire screen of the display 220. Still referring to FIG. 34, the image 583c is an image of an action item, which has been detected at S71-2. Accordingly, the user can grasp information that the user needs more effectively.

Moreover, with the sharing system 1, records on one or more events related to the same project can be easily shared between project members of the project. Once the user registers project members, information on one or more events being held for a particular project can be shared, without requiring additional setting. In case the project members are changed, the user can modify the project members.

When the acceptance unit 52 of the PC 5 receives selection of the "Action Item" button 577 of the conducted event list screen 570 at S128, the display control 54 controls the display 508 to display an action item screen 590 as illustrated in FIG. 35, generated by the generator 56. As illustrated in FIG. 35, the action item screen 590 includes action item information 591 to 594. For example, the action item information 591 includes an image representing details of the action item identified as described above referring to FIG. 26, the user name selected from the candidate list of FIG. 27, and the due date entered via the screen of FIG. 28. The action item screen 590 further includes a "CLOSE" button 599 to be pressed when the action item screen 590 is closed, at the lower right. The action item screen 590 illustrated in FIG. 35 displays all action items associated with the project ID that has been selected at S122.

When the acceptance unit 52 receives pressing of the "action item" button 584 on the event record screen 580 illustrated in FIG. 34, the display control 54 controls the display 508 to display the action item screen 590 in a substantially similar manner.

FIGS. 30 and 31 illustrate an example case in which the PC 5 is used to view an event record. Similarly, the user may press the icon r2 (FIG. 22) to cause the electronic whiteboard 2, or any other communication terminal, to display records of the previously-held events.

In case the videoconference terminal is used as the communication terminal, the videoconference terminal may be connected via a wired or wireless network to an external display to display various types of screen. Examples of such external display include a projection surface for a projector. In case the car navigation system is used as the communication terminal, the car navigation system may be connected via a wired or wireless network to an external display to display various types of screen. Examples of such external display include a display provided for a smartphone, and a projection surface for a heads-up display.

<Display Control using Pagination>

Figure 36:
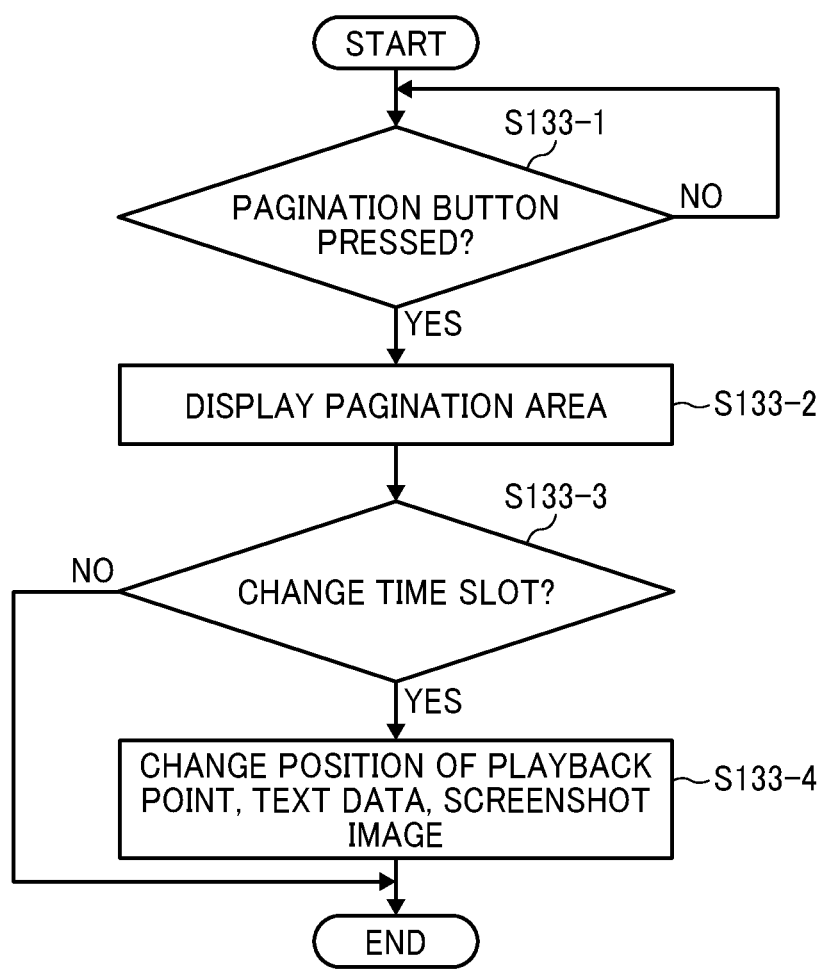
FIG. 36 is a flowchart illustrating operation of controlling display of an event record screen using pagination, according to an embodiment.

Referring to FIGS. 36 to 38, operation of controlling display using pagination is described according to an embodiment. FIG. 36 is a flowchart illustrating example operation of controlling display, using pagination. FIGS. 37 and 38 are each an illustration of an example event record screen displayed by the PC 5, in response to pressing of the "pagination" button 588 illustrated in FIG. 34.

In this disclosure, "pagination" functions as a navigator, which assists a user in moving between pages in case contents are displayed in more than one page. For example, for the webpage, "pagination" corresponds to processing to divide display contents into a plurality of pages, and providing a link to each page. Using the "pagination", the user can easily access a desired content, while the content provider can easily know which content the user is viewing. "Pagination" is also referred to as "page division", "page fee paging" or "paler".

Referring to FIG. 36, when the user presses the "pagination" button 588 illustrated in FIG. 34, the acceptance unit 52 receives the pressing of the "pagination" button 588 ("YES" at S133-1). When the pressing of the "pagination" button 588 is not received, the acceptance unit 52 repeats S133-1 ("NO" at S133-1).

As illustrated in FIG. 37, the display control 54 controls the display 508 to display a pagination display area 589 at a lower part of the event record screen 580 (S133-2). In this pagination display area 589, for example, a total event time (such as a total meeting time) is divided into a plurality of time slots (here, every 5 minutes), and the time slot having the point of time from which playback is started is displayed differently (In FIG. 37, the time slot 589j). In this example, such time slot is bounded by a bold line.

Further, when the user presses an arrow button 590j in the pagination display area 589, the display control 54 changes content to be displayed in each of the text data display area. 582 and the screenshot data display area 583, to content corresponding to the event start time "00:00", which is the beginning of the total playback time for the event. Similarly, the playback point 581p in the playback display area 581 is moved to a position corresponding to the event start time "00:00". When the user presses an arrow button 593j in the pagination display area 589, the display control 54 changes content to be displayed in each of the text data display area 582 and the screenshot data display area 583, to content corresponding to the event end time "1:00:00", which is the end of the total playback time for the event. Similarly, the playback point 581p in the playback display area 581 is moved to a position corresponding to the event end time "1:00:00".

When the user presses an arrow button 591j in the pagination display area 589, the display control 54 changes content to be displayed in each of the text data display area 582 and the screenshot data display area 583, to content corresponding to the playback time that is five minutes before the current playback time. Similarly, the playback point 581p in the playback display area 581 is moved to a position corresponding to the playback time that is five minutes before the current playback time.

When the user presses an arrow button 592j in the pagination display area 589, the display control 54 changes content to be displayed in each of the text data display area 582 and the screenshot data display area 583, to content corresponding to the playback time that is five minutes after the current playback time. Similarly, the playback point 581p in the playback display area 581 is moved to a position corresponding to the playback time that is five minutes after the current playback time.

In FIG. 37, each time slot corresponds to a time period of five minutes. However, a time period for each time slot may be set to any value, such as one minute or ten minutes, which may be previously set by a system administrator or user. Further, a unit of time is not limited to a minute. Assuming that the event lasts a long time period (for example, a day, a month, or a year), each time slot may be displayed based on a unit of day (1/1, 1/2, 1/3, . . . ), a unit of month (January, February, March, . . . ), and a unit of year (2018, 2019, 2020, . . . ). That is, a unit of time period for time slat may be determined based on information regarding a total playback time.

Referring back to FIG. 36, the acceptance unit 52 of the PC 5 determines whether an instruction to change a playback time slot is received (S133-3). For example, when the user selects the playback time slot "10:00" with the pointer p1 using the mouse 512 as illustrated in FIG. 38, the acceptance unit 52 receives an instruction to change the playback time slot ("YES" at S133-3). At S133-4, as illustrated in FIG. 38, the display control 54 causes the text data display area 582 to display, therein, images 582f, 582g, 582h, 582i, and 582j, that respectively correspond to text data that have been generated in the time period as indicated by the selected playback time slot "10:00", from top to bottom in an order of content generation time. Similarly, the display control 54 causes the screenshot data display area 583 to display, therein, images 583d, 583e, and 583f, that respectively correspond to screenshot (captured) data that have been generated in the time period as indicated by the selected playback time slot "10:00", from top to bottom in an order of content generation time. Similarly, the display control 54 moves the playback point 581p in the playback display area 581, to a time point in the total playback time, which is indicated by the beginning of the selected time slot.

Any one of the example operations or example screens described above referring to FIGS. 30 to 38 may not only be performed or displayed by the PC 5, but may be performed or displayed by the communication terminal, such as the electronic whiteboard 2, videoconference terminal 3, or car navigation system 4.

As described above referring to FIG. 34, in one or more embodiments, the text data display area 582 and the screenshot data display area 583 are displayed, side by side, in a temporal order (such as determined by a content generation time). As long as the user can recognize a screenshot image (for example, the image 583b) that represents a topic that the user is looking for, the user is able to easily identify text data (for example, the text data 582c and 582d), which are displayed side by side with the recognized screenshot image, to obtain detailed information on the desired topic.

Still referring to FIG. 34, the display control 54 further displays, in the screenshot data display area 583, the action item image 583c that has been captured at S71-2, with the screenshot images 583a and 583b of the entire display 220. Accordingly, the user is able to instantly know a time when the action item is generated, or what discussions have been made when the action item is generated.

Further, as illustrated in FIGS. 37 and 38, the pagination display area 589 is provided, which allows the user to easily find content data, by changing a playback time point The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the schedule management server 8 may further generate a related information management table illustrated in FIG. 39.

(Related Information Management Table)

FIG. 39 is an illustration of an example data structure of a related information management table. The memory 8000 may further store a related information management DB, which is implemented by the related information management table illustrated in FIG. 39. The related information management table stores, for each set of the project ID and the conducted event ID, related information in which various data items related to an event for a project are associated. Specifically, the related information associates a time when content is generated ("content generation time"), voice data, voice text data, and image data, in association.

The content generation time is represented by an elapsed time counted from the event start date and time, until the time when content is generated during the event. The content generation time can be calculated using the date and time when each content data is generated, and the start date and time of event.

The "voice data" field includes content processing ID, and content processing type. The "voice text data" field and the "image data" field each include content processing ID, content processing type, and a sequence number. The sequence number is assigned to each content processing ID, based on the content generation time. Accordingly, the sequence number indicates a temporal order in which each content processing is being performed during the event. Further, in this example illustrated in FIG. 39, the image data includes screenshot data. The image data may further include the image data of action item.

The related information management table may be referred to when displaying an event record. For example, referring to FIG. 31, the storing and reading processor 90 of the schedule management server 8 may search the related information management table using the conducted event ID received at S129 as a search key, to obtain related information associated with the conducted event ID. The related information includes the content generation time, content processing ID, and type of content processing, by type of content data. In case the content type is text data or image data, the related information further includes a sequence number.

In alternative to the one or more embodiments described above, only one of the sharing assistant server 6 and the schedule management server 8 may only be provided to manage content data generated during the event. In such case, only the content management table of FIG. 8B may be provided. However, depending on how the sharing system 1 is configured, it may be desirable to dispose the sharing assistant server 6 residing on the on-premise environment, and the schedule management server 8 residing on the cloud environment. In such case, processing to manage content during the event may be controlled more effectively on the on-premise environment. On the other hand, processing to view a record, which is carried after ending of the event, may be controlled more effectively on the cloud environment.

In the one or more embodiments described above, it is assumed that the PC 5 generates screen data for display, based on information on content generated during the event that is received from the schedule management server 8. Alternatively, the schedule management server 8 may generate screen data for display at the PC 5. Especially when an information processing apparatus used for viewing the record is a smart phone, with relatively less memory resource, it may be desirable to generate screen data at the schedule management server 8 or any server that are accessible to content-related information.

Further, the arrangement of the text data or screenshot data may not only be limited to the one described above. If preferable, the content data may be displayed starting from the time when the event ends, to the time when the event starts.

Furthermore, the event is not limited to the meeting as described above. Any one of the above-described embodiments may be applicable to the example case when the event is a lecture. In such case, after the lecture has been recorded, a user can review contents of the lecture using the event record screen more effectively. In such case, the action item may correspond to assignment, in case the lecture is given to students.

Furthermore, when displaying one or more items of text data, the text data may be displayed in any desired format, such as in the form of text data or an image of text data.

Each of the functions of the described embodiments may be implemented by one or more processing circuits or circuitry. Processing circuitry includes a programmed processor, as a processor includes circuitry. For example, the processing circuitry is implemented by one or more microprocessors or microcomputers, super computers, and central processing units. A processing circuit also includes devices such as dedicated hardware, an application specific integrated circuit (ASIC), digital signal processor (DSP), field programmable gate array (FPGA), programmable logic device, state machine, and conventional circuit components arranged to perform the recited functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

The invention claimed is:

1. A system, comprising:
    an information processing apparatus including apparatus circuitry configured to
        determine a type of content processing during an event,
        transmit, to a server, audio data and first time information of the audio data in a case that the apparatus circuitry determines the type of content processing to be an audio recording during the event, wherein the first time information indicating a start time and an end time of the audio recording, and
        transmit, to the server, a plurality of screenshots and second time information of each screenshot of the plurality of screenshots in a case that the apparatus circuitry determines the type of content processing to be a screen capture processing, wherein each respective screenshot of the plurality of screenshots is a screenshot of a screen of content displayed by the information processing apparatus during the event and is captured at a corresponding start time and end time of the screen capture processing indicated by the second time information; and the server, comprising server circuitry configured to:
in a case that the information processing apparatus transmits the audio data and the first time information:
receive, from the information processing apparatus, the audio data and the first time information,
obtain a plurality of pieces of text data converted from the audio data, and
store, in a memory, the plurality of pieces of text data in association with the first time information; and
in a case that the information processing apparatus transmits the plurality of screenshots and the second time information:
receive, from the information processing apparatus, the plurality of screenshots and the second time information, and
store, in the memory, the plurality of screenshots in association with the second time information, wherein in a case that the apparatus circuitry performs audio recording and screen capture during the event, the apparatus circuitry is further configured to control a display to simultaneously display
(1) the plurality of pieces of text data at a same time and in temporal order according to the start time and the end time indicated by the first time information associated with the plurality of pieces of text data, and
(2) the plurality of screenshots at a same time and in temporal order according to the start times and the end times indicated by the second time information associated with the plurality of screenshots, the plurality of pieces of text data being simultaneously displayed at screen positions relative to screen positions of the plurality of screenshots according to the start time and the end time indicated by the first time information and the start times and the end times indicated by the second time information.

2. The system of claim 1, wherein the server circuitry is further configured to transmit the plurality of pieces of text data in association with the first time information to the information processing apparatus.

3. The system of claim 1, wherein the server circuitry is further configured to generate screen data for display at the information processing apparatus, based on the plurality of pieces of text data and the first time information, and transmit the screen data to the information processing apparatus.

4. The system of claim 2, wherein the server circuitry is further configured to manage the audio data and the plurality of screenshots according to a corresponding content processing identifier.

5. The system of claim 1, wherein the server circuitry is further configured to access the audio data and the plurality of screenshots via a link to a content management table.

6. The system of claim 1, wherein
the first time information indicates a generation time of the audio data, and
the second time information indicates a generation time of each of the plurality of screenshots.

7. The system of claim 1, wherein
the first time information indicates an acquired time of the audio data, and
the second time information indicates an acquired time of each of the plurality of screenshots.

8. The system of claim 1, wherein the apparatus circuitry is further configured to collect data during the event, the data including at least the audio data and the plurality of screenshots.

9. The system of claim 1, wherein the plurality of screenshots include a drawing that is drawn by a user during an event.

10. The system of claim 1, wherein
the first time information indicates a first time that the audio data is transmitted or received, and
the second time information indicates a second time that a screenshot of the plurality of screenshots is transmitted or received.

11. The system of claim 10, wherein the first time is different from the second time.

* * * * *